US012735440B2

(12) United States Patent
Figueroa et al.

(10) Patent No.: US 12,735,440 B2
(45) **Date of Patent: *Sep. 15, 2026**

(54) PREPARATION OF AMINO-FUNCTIONAL ORGANOSILICON COMPOUNDS

(71) Applicants: Dow Silicones Corporation, Midland, MI (US); Dow Global Technologies LLC, Midland, MI (US)

(72) Inventors: Ruth Figueroa, Midland, MI (US); Jason Fisk, Midland, MI (US); Erich Molitor, Midland, MI (US); David Devore, Midland, MI (US); Mrunmayi Kumbhalkar, Midland, MI (US); Michael Ferritto, Midland, MI (US); Michael Telgenhoff, Midland, MI (US); Brian Rekken, Midland, MI (US); Joseph Neuman, Midland, MI (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 143 days.

This patent is subject to a terminal disclaimer.

(21) Appl. No.: 18/290,849

(22) PCT Filed: Oct. 6, 2022

(86) PCT No.: PCT/US2022/077641

§ 371 (c)(1),
(2) Date: Jan. 22, 2024

(87) PCT Pub. No.: WO2023/060153

PCT Pub. Date: Apr. 13, 2023

(65) Prior Publication Data

US 2025/0353968 A1 Nov. 20, 2025

Related U.S. Application Data

(60) Provisional application No. 63/252,639, filed on Oct. 6, 2021.

(51) Int. Cl.
*C08G 77/26* (2006.01)
*B01J 31/18* (2006.01)
*C07F 7/08* (2006.01)

(52) U.S. Cl.
CPC ........... *C07F 7/0889* (2013.01); *B01J 31/185* (2013.01); *C08G 77/26* (2013.01)

(58) Field of Classification Search
CPC .............................. C08G 77/26; B01J 31/185
See application file for complete search history.

(56) References Cited

U.S. PATENT DOCUMENTS 2,462,635 A 2/1949 Haber
2,676,182 A 4/1954 Daudt et al.
3,243,404 A 3/1966 Martellock
3,284,406 A 11/1966 Nelson
4,041,080 A 8/1977 Gothel et al.
4,374,967 A 2/1983 Brown et al.
4,424,392 A 1/1984 Petty
4,584,355 A 4/1986 Blizzard et al.
4,585,836 A 4/1986 Homan et al.
4,591,622 A 5/1986 Blizzard et al.
4,611,042 A 9/1986 Rivers-Farrell et al.
4,769,498 A 9/1988 Billig et al.
4,772,515 A 9/1988 Hara et al.
4,774,310 A 9/1988 Butler
4,898,961 A 2/1990 Baile et al.
5,010,159 A 4/1991 Bank et al.
5,021,601 A 6/1991 Frances et al.
5,041,675 A 8/1991 Lukas et al.
5,055,618 A 10/1991 Kampmann et al.
5,169,920 A 12/1992 Okawa
5,317,072 A 5/1994 Bokerman et al.
5,387,706 A 2/1995 Rasmussen et al.
5,681,473 A 10/1997 Miller et al.
5,727,893 A 3/1998 Handler
5,739,246 A 4/1998 Graiver et al.
5,756,796 A 5/1998 Davern et al.
5,902,892 A 5/1999 Larson et al.
5,973,208 A 10/1999 Nagareda et al.
6,001,943 A 12/1999 Enami et al.
6,281,285 B1 8/2001 Becker et al.
6,806,339 B2 10/2004 Cray et al.
6,956,087 B2 10/2005 Lai et al.
7,446,231 B2 11/2008 Peterson et al.
7,524,997 B2 4/2009 Kaizik et al.
7,531,698 B2 5/2009 Zhang et al.
7,696,294 B2 4/2010 Asirvatham (Continued)

FOREIGN PATENT DOCUMENTS

CN 106496261 3/2017
CN 106810655 6/2017

(Continued)

OTHER PUBLICATIONS

Ashby, New 3-Isocyanatopropylsilanes, Journal of Chemical and Engineering Data, 1973, vol. 18, No. 2, pp. 238-239.
Grande, "Testing the Functional Tolerance of the Piers-Rubinsztajn Reaction: A new Strategy for Functional Silicones", The Royal Society of Chemistry, 2010.
Iimura, Orally Active Docetaxel Analogue, Synthesis of 10-Deoxy-10-C-morpholinoethyl Docetaxel Analogues, Bioorganic & Medicinal Chemistry Letters, 2001, vol. 11, No. 3, pp. 407-410.
Keikha, "Heterogeneous Fenton-like activity of novel metal-losalophen magnetic nanocomposites: significant anchoring group effect", RSC Advances, 2019, vol. 9, No. 57, pp. 32966-32976.
Kumar, Proline catalyzed direct diastereoselective 6-enolexo aldolization: toward the synthesis of the imino sugar DNJ, Tetrahedron Asymmetry, 2010, vol. 21, pp. 2703-2708.

(Continued)

*Primary Examiner* — Catherine S Branch
*Assistant Examiner* — Huihong Qiao
(74) *Attorney, Agent, or Firm* — Catherine U. Brown

(57) ABSTRACT

An organosilicon compound with amino-functional groups is prepared. A catalyzed reductive amination process for combining an aldehyde-functional organosilicon compound with an amine source and hydrogen produces the amino-functional organosilicon compound.

19 Claims, No Drawings

(56) References Cited

U.S. PATENT DOCUMENTS

| | | | |
|---|---|---|---|
| 7,999,053 B2 | 8/2011 | Sutton et al. | |
| 8,546,508 B2 | 10/2013 | Nabeta et al. | |
| 8,580,073 B2 | 11/2013 | Behl et al. | |
| 8,748,643 B2 | 6/2014 | Priske et al. | |
| 9,127,030 B2 | 9/2015 | Kreidler et al. | |
| 9,567,276 B2 | 2/2017 | Klasovsky et al. | |
| 9,795,952 B2 | 10/2017 | Diebolt et al. | |
| 10,023,516 B2 | 7/2018 | Brammer et al. | |
| 10,155,200 B2 | 12/2018 | Geilen et al. | |
| 10,155,852 B2 | 12/2018 | Enami | |
| 2002/0042491 A1 | 4/2002 | Brader et al. | |
| 2007/0179319 A1 | 8/2007 | Springer et al. | |
| 2007/0289495 A1 | 12/2007 | Cray et al. | |
| 2010/0222611 A1 | 9/2010 | Tulchinsky et al. | |
| 2012/0004436 A1 | 1/2012 | Fritz-Langhals et al. | |
| 2012/0253080 A1* | 10/2012 | Eisenschmid | C07C 45/49 568/451 |
| 2016/0376482 A1 | 12/2016 | Morgeneyer et al. | |
| 2017/0073360 A1 | 3/2017 | Burns et al. | |
| 2020/0140619 A1 | 5/2020 | Swier et al. | |
| 2020/0341395 A1 | 10/2020 | Ookubo et al. | |

FOREIGN PATENT DOCUMENTS

| | | |
|---|---|---|
| CN | 110981901 | 4/2020 |
| EP | 342518 | 11/1989 |
| EP | 0392948 | 10/1990 |
| EP | 2121570 | 11/2009 |
| EP | 3712212 | 9/2020 |
| GB | 1262745 | 2/1972 |
| WO | 8302948 | 9/1983 |
| WO | 9946318 | 9/1999 |
| WO | 2004022541 | 3/2004 |
| WO | 2005077884 | 8/2005 |
| WO | 2006027074 | 3/2006 |
| WO | 2018204068 | 11/2018 |
| WO | 2021108068 | 6/2021 |
| WO | 2021129359 | 7/2021 |
| WO | 2022081444 | 4/2022 |

OTHER PUBLICATIONS

Maasoumeh, "A cobalt Schiff base complex on TiO 2 nanoparticles as an effective synergistic nanocatalyst for aerobic C—H oxidation", RSC Advances, vol. 6, No. 30, 2016, pp. 25034-25046.

Maasoumeh, "A zirconium Schiff base complex immobilized on starch-coated maghemite nanoparticles catalyzes heterogeneous condensation of 1, 2-diamines with 1, 2 dicarbonyl compounds", Springer International Publishing, vol. 41, No. 2, 2015, pp. 205-211.

Maasoumeh, "Starch-coated maghemite nanoparticles functionalized by a novel cobalt Schiff base complex catalyzes selective aerobic benzylic C—H oxidation", RSC Advances, vol. 5, No. 48, 2015, pp. 38460-38469.

Manual of Patent Examining Procedure, 2018, vol. 9.

Murugesan, "Reusable Nickel Nanoparticles-Catalyzed Reductive Amination for Selective Synthesis of Primary Amines", Wiley-VCH, 2019, vol. 58, No. 15, pp. 5064-5068.

Murugesan, Catalytic reductive aminations using molecular hydrogen for synthesis of different kinds of amines, The Royal Society of Chemistry, 2020, vol. 49, pp. 6273-6328.

Noll, Chemistry and Technology of Silicone, Academic Press, 1968, pp. 1-9.

Perry, Amino Disiloxanes for CO2 Capture, American Chemical Society, 2011, vol. 25, pp. 1906-1918.

Pijper "An Enantioselective Synthetic Route toward Second-Generation Light-Driven Rotary Molecular Motors" The Journal of Organic Chemistry, 2010, vol. 75, No. 3, pp. 825-838.

Saam, Preparation of 3-Triethoxysilylpropylamine and 1, 3-Bis(aminopropyl) tetramethyldisiloxane, American Chemical Society, 1959, vol. 24, pp. 119-120.

Sladkova, Effect of the Structure of a Silicon-Containing Nitrile on the Course of its Catalytic Reduction, 1965, No. 6, pp. 1061-1065.

Smith, The Analytical Chemistry of Silicones, John Wiley & Sons, Inc., 1991, vol. 112, pp. 347-381.

Speier, Syntheses of (3-Aminoalkyl)silicon Compounds, Journal of Organic Chemistry, 1971, vol. 36, No. 21, pp. 3121-3126.

Stojanovic, "N, Se-Acetals" Easy Preparation and Application to Radical Mediated EPC Synthesis, Elsevier Science Ltd, 1996, vol. 37, No. 51, pp. 9199-9202.

Surnin, Synthesis and Reactions of Imines of [alpha], [beta]-Ethylenic Silicon-Containing Aldehydes with Complex Hydrides, Flenum Publishing Corporation, 1985, vol. 55, No. 9, pp. 2052-2061.

Cai, "New Tertaphosphorous Ligands for Highly Linear Selective Hydroformylation of Allyl and Vinyl Derivatives", 2012.

Xiaofei, "Pyrrolyl-Based Phosphoramidite/Rh Catalyzed Asymmetric Hydroformylation of 1,1-Disubstituted Olefins".

Rupasinghe, et al., "Degradation of silicone-based materials as a driving force for recyclability", Polym. Int., 2022, 71, pp. 521-531.

* cited by examiner

PREPARATION OF AMINO-FUNCTIONAL ORGANOSILICON COMPOUNDS

CROSS REFERENCE TO RELATED APPLICATIONS

This application is a U.S. national stage filing under 35 U.S.C. § 371 of PCT Application No. PCT/US22/077641 filed on 6 Oct. 2022, which claims the benefit of U.S. Provisional Patent Application No. 63/252,639 filed on 6 Oct. 2021 under 35 U.S.C. § 119(e). PCT Application No. PCT/US22/077641 and U.S. Provisional Patent Application No. 63/252,639 are hereby incorporated by reference.

FIELD

A process for preparing an amino-functional organosilicon compound is disclosed. More particularly, the process for preparing the amino-functional organosilicon compound includes reductive amination of an aldehyde-functional organosilicon compound with an amine source.

INTRODUCTION

Certain amino-functional polyorganosiloxanes are useful, for example, in textile and leather treatment applications. Other amino-functional polyorganosiloxanes, such as amine-terminated polydiorganosiloxanes are useful in personal care applications, such as hair care. Amine-terminated polydiorganosiloxanes may be useful, for example, in hair conditioning applications. Amino-functional polyorganosiloxanes made by condensation may suffer from the drawback of instability as shown by viscosity changes and/or development of an ammonia odor after aging, which is undesirable for personal care applications. Traditionally, primary amino-functional polyorganosiloxanes are expensive to make by equilibration as they require costly starting materials and catalysts and require multiple process steps to complete.

Another method for making amino-functional polyorganosiloxanes uses allylamine, or a derivative that hydrolyzes into allylamine. These are used to do hydrosilylation chemistry with SiH functional polymers to form the amino-functional polyorganosiloxanes; however, this method suffers from the drawback that the amino-functional polyorganosiloxane product may contain at least trace amounts of either SiH or allylamine, either of which would have to be removed before the product can be used in any personal care applications due to toxicity of allylamine and reactivity of the SiH.

Another method of making amino-functional polyorganosiloxanes is by ammonolysis of chloropropyl terminated siloxanes. This costly, multi-step method may suffer from the drawback of leaving residual salt (i.e., ammonium chloride) in the amine-terminated polyorganosiloxane product that may require extensive washing to remove, which is cost ineffective and poorly sustainable. Also, any residual ammonium chloride may produce a foul smell, which is undesirable for personal care applications.

Therefore, there is an unmet need in the organosilicon industry need for a synthetic method to prepare a broad range of amino-functional organosilicon compounds with relatively high purity, high selectivity, and/or low cost.

SUMMARY

A process for preparing an amino-functional organosilicon compound comprises combining, under conditions to catalyze reductive amination reaction, starting materials comprising an aldehyde-functional organosilicon compound, an amine source, hydrogen, and a hydrogenation catalyst, thereby forming a reductive amination reaction product comprising the amino-functional organosilicon compound.

DETAILED DESCRIPTION

In the process for preparing the amino-functional organosilicon compound introduced above, the aldehyde-functional organosilicon compound may be an aldehyde-functional organosilicon compound which is known and may be made by known methods, such as those described in U.S. Pat. No. 4,424,392 to Petty; U.S. Pat. No. 5,021,601 to Frances et al.; U.S. Pat. No. 5,739,246 to Graiver et al.; U.S. Pat. No. 7,696,294 to Asirvatham; and U.S. Pat. No. 7,999,053 to Sutton et al.; European Patent Application Publication EP 0 392 948 A1 to Frances, and PCT Patent Application Publication WO2006027074 to Kühnle et al.

Hydroformylation

Alternatively, the aldehyde-functional organosilicon compound may be prepared by a hydroformylation process. This hydroformylation process comprises 1) combining, under conditions to catalyze hydroformylation reaction, starting materials comprising (A) a gas comprising hydrogen and carbon monoxide, (B) an alkenyl-functional organosilicon compound, and (C) hydroformylation reaction catalyst such as a rhodium/bisphosphite ligand complex catalyst, thereby forming a hydroformylation reaction product comprising the aldehyde-functional organosilicon compound.

The hydroformylation process described herein employs starting materials comprising: (A) a gas comprising hydrogen and carbon monoxide, (B) an alkenyl-functional organosilicon compound, and (C) a rhodium/bisphosphite ligand catalyst. The starting materials may optionally further comprise: (D) a solvent.

(A) Syngas

Starting material (A), the gas used in the hydroformylation process, comprises carbon monoxide (CO) and hydrogen gas ($H_2$). For example, the gas may be syngas. As used herein, "syngas" (from synthesis gas) refers to a gas mixture that contains varying amounts of CO and $H_2$. Production methods are well known and include, for example: (1) steam reforming and partial oxidation of natural gas or liquid hydrocarbons, and (2) the gasification of coal and/or biomass. CO and $H_2$ typically are the main components of syngas, but syngas may contain carbon dioxide and inert gases such as $CH_4$, $N_2$ and Ar. The molar ratio of $H_2$ to CO ($H_2$:CO molar ratio) varies greatly but may range from 1:100 to 100:1, alternatively 1:10 and 10:1. Syngas is commercially available and is often used as a fuel source or as an intermediate for the production of other chemicals. Alternatively, CO and $H_2$ from other sources (i.e., other than syngas) may be used as starting material (A) herein. Alternatively, the $H_2$:CO molar ratio in starting material (A) for use herein may be 3:1 to 1:3, alternatively 2:1 to 1:2, and alternatively 1:1.

(B) Alkenyl-Functional Organosilicon Compound

The alkenyl-functional organosilicon compound has, per molecule, at least one alkenyl group covalently bonded to silicon. Alternatively, the alkenyl-functional organosilicon compound may have, per molecule, more than one alkenyl group covalently bonded to silicon. Starting material (B) may be one alkenyl-functional organosilicon compound. Alternatively, starting material (B) may comprise two or more alkenyl-functional organosilicon compounds that differ from one another. For example, the alkenyl-functional organosilicon compound may comprise one or both of (B1) a silane and (B2) a polyorganosiloxane.

Starting material (B1), the alkenyl-functional silane, may have formula (B1-1): $R^A_xSiR^4_{(4-x)}$, where each $R^A$ is an independently selected alkenyl group of 2 to 8 carbon atoms; each $R^4$ is independently selected from the group consisting of an alkyl group of 1 to 18 carbon atoms and an aryl group of 6 to 18 carbon atoms; and subscript x is 1 to 4. Alternatively, subscript x may be 1 or 2, alternatively 2, and alternatively 1. Alternatively, each $R^4$ may be independently selected from the group consisting of an alkyl group of 1 to 12 carbon atoms and an aryl group of 6 to 12 carbon atoms. Alternatively, each $R^4$ may be independently selected from the group consisting of an alkyl group of 1 to 8 carbon atoms and an aryl group of 6 to 8 carbon atoms. Alternatively, each $R^4$ in formula (B1-1) may be independently selected from the group consisting of an methyl and phenyl.

The alkenyl group for $R^A$ may have terminal alkenyl functionality, e.g., $R^A$ may have formula

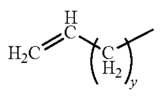

where subscript y is 0 to 6. Alternatively, each $R^A$ may be independently selected from the group consisting of vinyl, allyl, and hexenyl. Alternatively, each $R^A$ may be independently selected from the group consisting of vinyl and allyl. Alternatively, each $R^A$ may be vinyl. Alternatively, each $R^A$ may be allyl.

Suitable alkyl groups for $R^4$ may be linear, branched, cyclic, or combinations of two or more thereof. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 18 carbon atoms), and the alkyl groups are further exemplified by cycloalkyl groups such as cyclopropyl, cyclobutyl, cyclopentyl, and cyclohexyl. Alternatively, the alkyl group for $R^4$ may be selected from the group consisting of methyl, ethyl, propyl and butyl; alternatively methyl, ethyl, and propyl; alternatively methyl and ethyl. Alternatively, the alkyl group for $R^4$ may be methyl.

Suitable aryl groups for $R^4$ may be monocyclic or polycyclic and may have pendant hydrocarbyl groups. For example, the aryl groups for $R^4$ include phenyl, tolyl, xylyl, and naphthyl and further include aralkyl groups such as benzyl, 1-phenylethyl and 2-phenylethyl. Alternatively, the aryl group for $R^4$ may be monocyclic, such as phenyl, tolyl, or benzyl; alternatively the aryl group for $R^4$ may be phenyl.

Suitable alkenyl-functional silanes are exemplified by alkenyl-functional trialkylsilanes such as vinyltrimethylsilane, vinyltriethylsilane, and allyltrimethylsilane. All of these alkenyl-functional silanes are commercially available, e.g., from Gelest Inc. of Morrisville, Pennsylvania, USA.

Alternatively, (B) the alkenyl-functional organosilicon compound may comprise (B2) an alkenyl-functional polyorganosiloxane. Said polyorganosiloxane may be cyclic, linear, branched, resinous, or a combination of two or more thereof. Said polyorganosiloxane may comprise unit formula (B2-1):

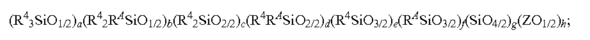

$$(R^4_3SiO_{1/2})_a(R^4_2R^ASiO_{1/2})_b(R^4_2SiO_{2/2})_c(R^4R^ASiO_{2/2})_d(R^ASiO_{3/2})_e(R^4SiO_{3/2})_f(SiO_{4/2})_g(ZO_{1/2})_h;$$

where $R^A$ and $R^4$ are as described above; each Z is independently selected from the group consisting of a hydrogen atom and $R^5$ (where $R^5$ is as described above), subscripts a, b, c, d, e, f, and g represent numbers of each unit in formula (B2-1) and have values such that subscript a≥0, subscript b≥0, subscript c≥0, subscript d≥0, subscript e≥0, subscript f≥0, and subscript g≥0; a quantity (a+b+c+d+e+f+g)≥2, and a quantity (b+d+f)≥1, and subscript h has a value such that 0≤h/(e+f+g)≤1.5. At the same time, the quantity (a+b+c+d+e+f+g) may be ≤10,000. Alternatively, when e=f=g=0, then h≥0. Alternatively, in formula (B-2-1), each $R^4$ may be independently selected from the group consisting of a hydrogen atom, an alkyl group of 1 to 18 carbon atoms and an aryl group of 6 to 18 carbon atoms. Alternatively, each $R^4$ may be independently selected from the group consisting of an alkyl group of 1 to 12 carbon atoms and an aryl group of 6 to 12 carbon atoms. Alternatively, each $R^4$ may be independently selected from the group consisting of an alkyl group of 1 to 8 carbon atoms and an aryl group of 6 to 8 carbon atoms. Alternatively, each $R^4$ may be independently selected from the group consisting of methyl and phenyl. Alternatively, each Z may be hydrogen or an alkyl group of 1 to 6 carbon atoms. Alternatively, each Z may be hydrogen.

Alternatively, (B2) the alkenyl-functional polyorganosiloxane may comprise (B2-2) a linear polydiorganosiloxane having, per molecule, at least one alkenyl group; alternatively at least two alkenyl groups (e.g., when in formula (B2-1) above, subscripts e=f=g=0). For example, said polydiorganosiloxane may comprise unit formula (B2-3): $(R^4_3SiO_{1/2})_a(R^AR^4_2SiO_{1/2})_b(R^4_2SiO_{2/2})_c(R^AR^4SiO_{2/2})_d$, where $R^A$ and $R^4$ are as described above, subscript a is 0, 1, or 2; subscript b is 0, 1, or 2, subscript c≥0, subscript d≥0, with the provisos that a quantity (b+d)≥1, a quantity (a+b)=2, and a quantity (a+b+c+d)≥2. Alternatively, in unit formula (B2-3) the quantity (a+b+c+d) may be at least 3, alternatively at least 4, and alternatively >50. At the same time in unit formula (B2-3), the quantity (a+b+c+d) may be less than or equal to 10,000; alternatively less than or equal to 4,000; alternatively less than or equal to 2,000; alternatively less than or equal to 1,000; alternatively less than or equal to 500; alternatively less than or equal to 250. Alternatively, in unit formula (B2-3) each $R^4$ may be independently selected from the group consisting of alkyl and aryl; alternatively methyl and phenyl. Alternatively, each $R^4$ in unit formula (B2-3) may be an alkyl group; alternatively each $R^4$ may be methyl.

Alternatively, the polydiorganosiloxane of unit formula (B2-3) may be selected from the group consisting of: unit formula (B2-4): $(R^4_2R^ASiO_{1/2})_2(R^4_2SiO_{2/2})_m(R^4R^ASiO_{2/2})$ n, unit formula (B2-5): $(R^4_3SiO_{1/2})_2(R^4_2SiO_{2/2})_o(R^4R^ASiO_{2/2})_p$, or a combination of both (B2-4) and (B2-5).

In formulae (B2-4) and (B2-5), each $R^4$ and $R^A$ are as described above. Subscript m may be 0 or a positive number. Alternatively, subscript m may be at least 2. Alternatively subscript m be 2 to 2,000. Subscript n may be 0 or a positive number. Alternatively, subscript n may be 0 to 2000. Subscript o may be 0 or a positive number. Alternatively, subscript o may be 0 to 2000. Subscript p is at least 2. Alternatively subscript p may be 2 to 2000.

Starting material (B2) may comprise an alkenyl-functional polydiorganosiloxane such as i) bis-dimethylvinylsiloxy-terminated polydimethylsiloxane, ii) bis-dimethylvinylsiloxy-terminated poly(dimethylsiloxane/methylvinylsiloxane), iii) bis-dimethylvinylsiloxyterminated polymethylvinylsiloxane, iv) bis-trimethylsiloxy-terminated poly(dimethylsiloxane/methylvinylsiloxane), v) bis-trimethylsiloxy-terminated polymethylvinylsiloxane, vi) bis-dimethylvinylsiloxy-terminated poly(dimethylsiloxane/methylphenylsiloxane/methylvinylsiloxane), vii) bis-dimethylvinylsiloxy-terminated poly(dimethylsiloxane/methylphenylsiloxane), viii) bis-dimethylvinylsiloxy-terminated poly(dimethylsiloxane/diphenylsiloxane), ix) bis-phenyl,methyl,vinyl-siloxy-terminated polydimethylsiloxane, x) bis-dimethylhexenylsiloxy-terminated polydimethylsiloxane, xi) bis-dimethylhexenylsiloxy-terminated poly(dimethylsiloxane/methylhexenylsiloxane), xii) bis-dimethylhexenylsiloxy-terminated polymethylhexenylsiloxane, xiii) bis-trimethylsiloxy-terminated poly(dimethylsiloxane/methylhexenylsiloxane), xiv) bis-trimethylsiloxy-terminated polymethylhexenylsiloxane, xv) bis-dimethylhexenyl-siloxy terminated poly(dimethylsiloxane/methylphenylsiloxane/methylhexenylsiloxane), xvi) bis-dimethylvinylsiloxy-terminated poly(dimethylsiloxane/methylhexenylsiloxane), xvii) bis-dimethylhexenyl-siloxy-terminated poly(dimethylsiloxane/methylphenylsiloxane), xviii) dimethylhexenyl-siloxy-terminated poly(dimethylsiloxane/diphenylsiloxane), and xix) a combination of two or more of i) to xviii).

Methods of preparing linear alkenyl-functional polydiorganosiloxanes described above for starting material (B2), such as hydrolysis and condensation of the corresponding organohalosilanes and oligomers or equilibration of cyclic polydiorganosiloxanes, are known in the art, see for example U.S. Pat. Nos. 3,284,406; 4,772,515; 5,169,920; 5,317,072; and 6,956,087, which disclose preparing linear polydiorganosiloxanes with alkenyl groups. Examples of linear polydiorganosiloxanes having alkenyl groups are commercially available from, e.g., Gelest Inc. of Morrisville, Pennsylvania, USA under the tradenames DMS-V00, DMS-V03, DMS-V05, DMS-V21, DMS-V22, DMS-V25, DMS-V-31, DMS-V33, DMS-V34, DMS-V35, DMS-V41, DMS-V42, DMS-V43, DMS-V46, DMS-V51, DMS-V52.

Alternatively, (B2) the alkenyl-functional polyorganosiloxane may be cyclic, e.g., when in unit formula (B2-1), subscripts a=b=c=e=f=g=h=0. The cyclic alkenyl-functional polydiorganosiloxane may have unit formula (B2-7): $(R^4R^ASiO_{2/2})_d$, where $R^A$ and $R^4$ are as described above, and subscript d may be 3 to 12, alternatively 3 to 6, and alternatively 4 to 5. Examples of cyclic alkenyl-functional polydiorganosiloxanes include 2,4,6-trimethyl-2,4,6-trivinyl-cyclotrisiloxane, 2,4,6,8-tetramethyl-2,4,6,8-tetravinyl-cyclotetrasiloxane, 2,4,6,8,10-pentamethyl-2,4,6,8,10-pentavinyl-cyclopentasiloxane, and 2,4,6,8,10,12-hexamethyl-2,4,6,8,10,12-hexavinyl-cyclohexasiloxane. These cyclic alkenyl-functional polydiorganosiloxanes are known in the art and are commercially available from, e.g., Sigma-Aldrich of St. Louis, Missouri, USA; Milliken of Spartanburg, South Carolina, USA; and other vendors.

Alternatively, the cyclic alkenyl-functional polydiorganosiloxane may have unit formula (B2-8): $(R^4_2SiO_{2/2})_c(R^4R^ASiO_{2/2})_d$, where $R^4$ and $R^A$ are as described above, subscript c is >0 to 6 and subscript d is 3 to 12. Alternatively, in formula (B2-8), c may be 3 to 6, and d may be 3 to 6.

Alternatively, (B2) the alkenyl-functional polyorganosiloxane may be oligomeric, e.g., when in unit formula (B2-1) above the quantity (a+b+c+d+e+f+g)≤50, alternatively ≤40, alternatively ≤30, alternatively ≤25, alternatively ≤20, alternatively ≤10, alternatively ≤5, alternatively ≤4, alternatively ≤3. The oligomer may be cyclic, linear, branched, or a combination thereof. The cyclic oligomers are as described above as starting material (B2-6).

Examples of linear alkenyl-functional polyorganosiloxane oligomers may have formula (B2-10):

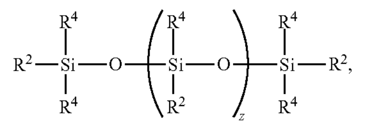

where $R^4$ is as described above, each $R^2$ is independently selected from the group consisting of $R^4$ and $R^A$, with the proviso that at least one $R^2$, per molecule, is $R^A$, and subscript z is 0 to 48. Alternatively, subscript z may be 0 to 4, alternatively 0 or 1; and alternatively 0. Alternatively, when z=0 in formula (B2-10), the alkenyl-functional polyorganosiloxane oligomer may have formula (B2-10a):

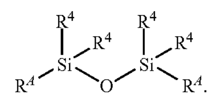

Examples of linear alkenyl-functional polyorganosiloxane oligomers may have include 1,3-divinyl-1,1,3,3-tetramethyldisiloxane; 1,1,1,3,3-pentamethyl-3-vinyl-disiloxane; 1,1,1,3,5,5,5-heptamethyl-3-vinyl-trisiloxane, all of which are commercially available, e.g., from Gelest, Inc. of Morrisville, Pennsylvania, USA or Sigma-Aldrich of St. Louis, Missouri, USA.

Alternatively, the alkenyl-functional polyorganosiloxane oligomer may be branched. The branched oligomer may have general formula (B2-11): $R^ASiR^{12}_3$, where $R^A$ is as described above and each $R^{12}$ is selected from $R^{13}$ and $—OSi(R^{14})_3$; where each $R^{13}$ is a monovalent hydrocarbon group (e.g., an alkyl group or an aryl group as described an exemplified above for $R^4$); where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that 0≤ii≤100. At least two of $R^{12}$ may be $—OSi(R^{14})_3$. Alternatively, all three of $R^{12}$ may be $—OSi(R^{14})_3$.

Alternatively, in formula (B2-11) when each $R^{12}$ is $—OSi(R^{14})_3$, each $R^{14}$ may be $R^{13}$ moieties such that the branched polyorganosiloxane oligomer has the following structure (B2-11a):

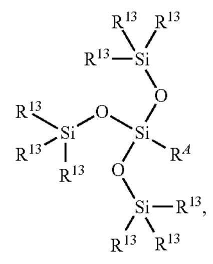

where $R^{13}$ is as described above, and $R^A$ is the alkenyl group as described above. Alternatively, each $R^A$ in formula (B2-11a) may be vinyl and each $R^{13}$ may be methyl.

Alternatively, in formula (B2-11) when each $R^{12}$ is —OSi$(R^{14})_3$, each $R^{14}$ may be —OSi$(R^{15})_3$ moieties such that the branched polyorganosiloxane oligomer has the following structure (B2-11b):

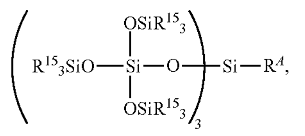

where $R^A$ and $R^{15}$ are as described above. Alternatively, each $R^{15}$ may be an $R^{13}$, as described above, and each $R^{13}$ may be methyl.

Alternatively, in formula (B2-11), when each $R^{12}$ is —OSi$(R^{14})_3$, one $R^{14}$ may be $R^{13}$ in each —OSi$(R^{14})_3$ such that each $R^{12}$ is —OSi$R^{13}(R^{14})_2$. Alternatively, two $R^{14}$ in —OSi$R^{13}(R^{14})_2$ may each be —OSi$(R^{15})_3$ moieties such that the branched polyorganosiloxane oligomer has the following structure (B2-11c):

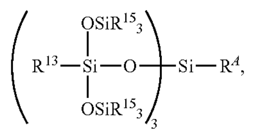

where $R^A$, $R^{13}$, and $R^{15}$ are as described above. Alternatively, each $R^{15}$ may be an $R^{13}$, and each $R^{13}$ may be methyl.

Alternatively, in formula (B2-11), one $R^{12}$ may be $R^{13}$, and two of $R^{12}$ may be —OSi$(R^{14})_3$. When two of $R^{12}$ are —OSi$(R^{14})_3$, and one $R^{14}$ is $R^{13}$ in each —OSi$(R^{14})_3$ then two of $R^{12}$ are —OSi$R^{13}(R^{14})_2$. Alternatively, each $R^{14}$ in —OSi$R^{13}(R^{14})_2$ may be —OSi$(R^{15})_3$ such that the branched polyorganosiloxane oligomer has the following structure (B2-11d):

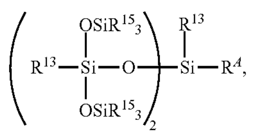

where $R^A$, $R^{13}$, and $R^{15}$ are as described above. Alternatively, each $R^{15}$ may be an $R^{13}$, and each $R^{13}$ may be methyl. Alternatively, the alkenyl-functional branched polyorganosiloxane may have 3 to 16 silicon atoms per molecule, alternatively 4 to 16 silicon atoms per molecule, and alternatively 4 to 10 silicon atoms per molecule. Examples of alkenyl-functional branched polyorganosiloxane oligomers include vinyl-tris(trimethyl)siloxy)silane, which has formula:

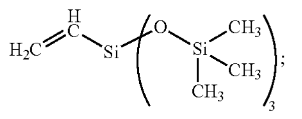

;

methyl-vinyl-di((1,1,1,3,5,5,5-heptamethyltrisiloxan-3-yl)oxy)-silane, which has formula

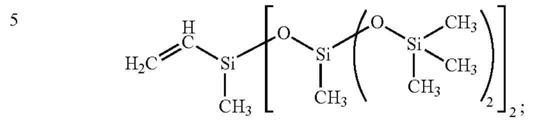

;

vinyl-tris((1,1,1,3,5,5,5-heptamethyltrisiloxan-3-yl)oxy)-silane, which has formula

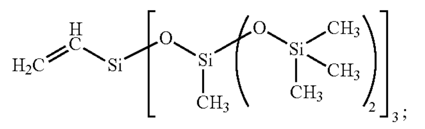

;

and (hex-5-en-1-yl)-tris((1,1,1,3,5,5,5-heptamethyltrisiloxan-3-yl)oxy)-silane, which has formula

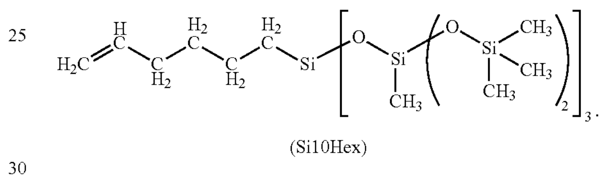

.

(Si10Hex)

Branched alkenyl-functional polyorganosiloxane oligomers described above may be prepared by known methods, such as those disclosed in "Testing the Functional Tolerance of the Piers-Rubinsztajn Reaction: A new Strategy for Functional Silicones" by Grande, et al. Supplementary Material (ESI) for Chemical Communications, © The Royal Society of Chemistry 2010.

Alternatively, (B2) the alkenyl-functional polyorganosiloxane may be branched, such as the branched oligomer described above and/or a branched alkenyl-functional polyorganosiloxane that may have, e.g., more alkenyl groups per molecule and/or more polymer units than the branched oligomer described above (e.g., in formula (B2-1) when the quantity (a+b+c+d+e+f+g)>50). The branched alkenyl-functional polyorganosiloxane may have (in formula (B2-1)) a quantity (e+f+g) sufficient to provide >0 to 5 mol % of trifunctional and/or quadrifunctional units to the branched alkenyl-functional polyorganosiloxane.

For example, the branched alkenyl-functional polyorganosiloxane may comprise a Q branched polyorganosiloxane of unit formula (B2-13): $(R^4_3SiO_{1/2})_q(R^4_2R^A SiO_{1/2})_r(R^4_2SiO_{2/2})_s (SiO_{4/2})_t$, where $R^4$ and $R^A$ are as described above, and subscripts q, r, s, and t have average values such that 2≥q≥0, 4≥r≥0, 995≥s≥4, t=1, (q+r)=4, and (q+r+s+t) has a value sufficient to impart a viscosity >170 mPa·s measured by rotational viscometry (as described below with the test methods) to the branched polyorganosiloxane. Alternatively, viscosity may be >170 mPa·s to 1000 mPa·s, alternatively >170 to 500 mPa·s, alternatively 180 mPa·s to 450 mPa·s, and alternatively 190 mPa·s to 420 mPa·s. Suitable Q branched polyorganosiloxanes for starting material (B2-12) are known in the art and can be made by known methods, exemplified by those disclosed in U.S. Pat. No. 6,806,339 to Cray, et al. and U.S. Patent Publication 2007/0289495 to Cray, et al.

Alternatively, the branched alkenyl-functional polyorganosiloxane may comprise formula (B2-14): $[R^AR^4_2Si—(O—SiR^4_2)_x—O]_{(4-w)}—Si—[O—(R^4_2SiO)_vSiR^4_3]_w$, where $R^A$ and $R^4$ are as described above; and subscripts v, w, and x have values such that 200≥v≥1, 2≥w≥0, and 200≥x≥1. Alternatively, in this formula (B2-14), each $R^4$ is independently selected from the group consisting of methyl and phenyl, and each $R^A$ is independently selected from the group consisting of vinyl, allyl, and hexenyl. Branched polyorganosiloxane suitable for starting material (B2-14) may be prepared by known methods such as heating a mixture comprising a polyorganosilicate resin, and a cyclic polydiorganosiloxane or a linear polydiorganosiloxane, in the presence of a catalyst, such as an acid or phosphazene base, and thereafter neutralizing the catalyst.

Alternatively, the branched alkenyl-functional polyorganosiloxane for starting material (B2-11) may comprise a T branched polyorganosiloxane (silsesquioxane) of unit formula (B2-15): $(R^4_3SiO_{1/2})_{aa}(R^AR^4_2SiO_{1/2})_{bb}(R^4_2SiO_{2/2})_{cc}(R^AR^4SiO_{2/2})_{ee}(R^4SiO_{3/2})_{dd}$, where $R^4$ and $R^A$ are as described above, subscript aa≥0, subscript bb>0, subscript cc is 15 to 995, subscript dd>0, and subscript ee≥0. Subscript aa may be 0 to 10. Alternatively, subscript aa may have a value such that: 12≥aa≥0; alternatively 10≥aa≥0; alternatively 7≥aa≥0; alternatively 5≥aa≥0; and alternatively 3≥aa≥0. Alternatively, subscript bb≥1. Alternatively, subscript bb≥3. Alternatively, subscript bb may have a value such that: 12≥bb≥0; alternatively 12≥bb≥3; alternatively 10≥bb>0; alternatively 7≥bb≥1; alternatively 5≥bb≥2; and alternatively 7≥bb≥3. Alternatively, subscript cc may have a value such that: 800≥cc≥15; and alternatively 400≥cc≥15. Alternatively, subscript ee may have a value such that: 800≥ee≥0; 800≥ee≥15; and alternatively 400≥ee≥15. Alternatively, subscript ee may b 0. Alternatively, a quantity (cc+ee) may have a value such that 995≥(cc+ee)≥15. Alternatively, subscript dd≥1. Alternatively, subscript dd may be 1 to 10. Alternatively, subscript dd may have a value such that: 10≥dd>0; alternatively 5≥dd≥0; and alternatively dd=1. Alternatively, subscript dd may be 1 to 10, alternatively subscript dd may be 1 or 2. Alternatively, when subscript dd=1, then subscript bb may be 3 and subscript cc may be 0. The values for subscript bb may be sufficient to provide the silsesquioxane of unit formula (B2-15) with an alkenyl content of 0.1% to 1%, alternatively 0.2% to 0.6%, based on the weight of the silsesquioxane. Suitable T branched polyorganosiloxanes (silsesquioxanes) for starting material (B2-15) are exemplified by those disclosed in U.S. Pat. No. 4,374,967 to Brown, et al; U.S. Pat. No. 6,001,943 to Enami, et al.; U.S. Pat. No. 8,546,508 to Nabeta, et al.; and U.S. Pat. No. 10,155,852 to Enami.

Alternatively, (B2) the alkenyl-functional polyorganosiloxane may comprise an alkenyl-functional polyorganosilicate resin, which comprises monofunctional units ("M" units) of formula $R^M_3SiO_{1/2}$ and tetrafunctional silicate units ("Q" units) of formula $SiO_{4/2}$, where each $R^M$ is an independently selected monovalent hydrocarbon group; each $R^M$ may be independently selected from the group consisting of $R^4$ and $R^A$ as described above. Alternatively, each $R^M$ may be selected from the group consisting of alkyl, alkenyl, and aryl. Alternatively, each $R^M$ may be selected from methyl, vinyl, and phenyl. Alternatively, at least one-third, alternatively at least two thirds of the $R^M$ groups are methyl groups. Alternatively, the M units may be exemplified by $(Me_3SiO_{1/2})$, $(Me_2PhSiO_{1/2})$, and $(Me_2ViSiO_{1/2})$. The polyorganosilicate resin is soluble in solvents such as those described herein as starting material (D), exemplified by liquid hydrocarbons, such as benzene, ethylbenzene, toluene, xylene, and heptane, or in liquid non-functional organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups, and/or hydrolyzable groups, described by moiety $(ZO_{1/2})$, above, and may comprise neopentamer of formula $Si(OSiR^M_3)_4$, where $R^M$ is as described above, e.g., the neopentamer may be tetrakis(trimethylsiloxy)silane. $^{29}Si$ NMR and $^{13}C$ NMR spectroscopies may be used to measure hydroxyl and alkoxy content and molar ratio of M and Q units, where said ratio is expressed as {M(resin)}/{Q(resin)}, excluding M and Q units from the neopentamer. M/Q ratio represents the molar ratio of the total number of triorganosiloxy groups (M units) of the resinous portion of the polyorganosilicate resin to the total number of silicate groups (Q units) in the resinous portion. M/Q ratio may be 0.5/1 to 1.5/1, alternatively 0.6/1 to 0.9/1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin may be 1,500 Da to 30,000 Da; alternatively 1,500 Da to 15,000 Da; alternatively >3,000 Da to 8,000 Da. Alternatively, Mn of the polyorganosilicate resin may be 3,500 Da to 8,000 Da.

U.S. Pat. No. 8,580,073 at col. 3, line 5 to col. 4, line 31, and U.S. Patent Publication 2016/0376482 at paragraphs to are hereby incorporated by reference for disclosing MQ resins, which are suitable polyorganosilicate resins for use as starting material (B2). The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M units and Q units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX$, where $R^M$ is as described above and X represents a hydroxyl group or a hydrolyzable substituent, e.g., of formula OZ described above. Silanes with four hydrolyzable substituents may have formula $SiX^2_4$, where each $X^2$ is independently selected from the group consisting of halogen, alkoxy, and hydroxyl. Suitable alkali metal silicates include sodium silicate.

The polyorganosilicate resin prepared as described above typically contain silicon bonded hydroxyl groups, e.g., of formula, $HOSiO_{3/2}$. The polyorganosilicate resin may comprise up to 3.5% of silicon bonded hydroxyl groups, as measured by FTIR spectroscopy and/or NMR spectroscopy, as described above. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group. Silanes containing hydrolyzable groups may be added in molar excess of the quantity required to react with the silicon bonded hydroxyl groups on the polyorganosilicate resin.

Alternatively, the polyorganosilicate resin may further comprise 2% or less, alternatively 0.7% or less, and alternatively 0.3% or less, and alternatively 0.3% to 0.8% of units containing hydroxyl groups, e.g., those represented by formula $XSiO_{3/2}$ where $R^M$ is as described above, and X represents a hydrolyzable substituent, e.g., OH. The concentration of silanol groups (where X=OH) present in the polyorganosilicate resin may be determined using FTIR spectroscopy and/or NMR as described above.

For use herein, the polyorganosilicate resin further comprises one or more terminal alkenyl groups per molecule. The polyorganosilicate resin having terminal alkenyl groups may be prepared by reacting the product of Daudt, et al. with an alkenyl group-containing endblocking agent and an endblocking agent free of aliphatic unsaturation, in an amount sufficient to provide from 3 to 30 mole percent of alkenyl groups in the final product. Examples of endblocking agents include, but are not limited to, silazanes, siloxanes, and silanes. Suitable endblocking agents are known in the art and exemplified in U.S. Pat. No. 4,584,355 to Blizzard, et al.; U.S. Pat. No. 4,591,622 to Blizzard, et al.; and U.S. Pat. No. 4,585,836 to Homan, et al. A single endblocking agent or a mixture of such agents may be used to prepare such resin.

Alternatively, the polyorganosilicate resin may comprise unit formula (B2-17): $(R^4{}_3SiO_{1/2})_{mm}(R^4{}_2R^ASiO_{1/2})_{nn}(SiO_{4/2})_{oo}(ZO_{1/2})$, where Z, $R^4$, and $R^A$, and subscript h are as described above and subscripts mm, nn and oo have average values such that mm≥0, nn≥0, oo≥0, and 0.5≤(mm+nn)/oo≤4. Alternatively, 0.6≤(mm+nn)/oo≤4; alternatively 0.7≤(mm+nn)/oo≤4, and alternatively 0.8≤(mm+nn)/oo≤4.

Alternatively, (B2) the alkenyl-functional polyorganosiloxane may comprise (B2-18) an alkenyl-functional silsesquioxane resin, i.e., a resin containing trifunctional (T) units of unit formula: $(R^4{}_3SiO_{1/2})_a(R^4{}_2R^ASiO_{1/2})_b(R^4{}_2SiO_{2/2})_c(R^4R^ASiO_{2/2})_d(R^4SiO_{3/2})_e(R^ASiO_{3/2})_f(ZO_{1/2})_h$; where $R^4$ and $R^A$ are as described above, subscript f>1, 2<(e+f)<10,000; 0<(a+b)/(e+f)<3; 0<(c+d)/(e+f)<3; and 0<h/(e+f)<1.5. Alternatively, the alkenyl-functional silsesquioxane resin may comprise unit formula (B2-19): $(R^4SiO_{3/2})_e(R^ASiO_{3/2})_f(ZO_{1/2})_h$, where $R^4$, $R^A$, Z, and subscripts h, e and f are as described above. Alternatively, the alkenyl-functional silsesquioxane resin may further comprise difunctional (D) units of formulae $(R^4{}_2SiO_{2/2})_c(R^4R^ASiO_{2/2})$ a in addition to the T units described above, i.e., a DT resin, where subscripts c and d are as described above. Alternatively, the alkenyl-functional silsesquioxane resin may further comprise monofunctional (M) units of formulae $(R^4{}_3SiO_{1/2})_a(R^4{}_2R^ASiO_{1/2})_b$, i.e., an MDT resin, where subscripts a and b are as described above for unit formula (B2-1).

Alkenyl-functional silsesquioxane resins are commercially available, for example. RMS-310, which comprises unit formula (B2-20): $(Me_2ViSiO_{1/2})_{25}(PhSiO_{3/2})_{75}$ dissolved in toluene, is commercially available from DSC. Alkenyl-functional silsesquioxane resins may be produced by the hydrolysis and condensation or a mixture of trialkoxy silanes using the methods as set forth in "Chemistry and Technology of Silicone" by Noll, Academic Press, 1968, chapter 5, p 190-245. Alternatively, alkenyl-functional silsesquioxane resins may be produced by the hydrolysis and condensation of a trichlorosilane using the methods as set forth in U.S. Pat. No. 6,281,285 to Becker, et al. and U.S. Pat. No. 5,010,159 to Bank, et al. Alkenyl-functional silsesquioxane resins comprising D units may be prepared by known methods, such as those disclosed in U.S. Patent Application 2020/0140619 and PCT Publication WO2018/204068 to Swier, et al.

Starting material (B) may be any one of the alkenyl-functional organosilicon compounds described above. Alternatively, starting material (B) may comprise a mixture of two or more of the alkenyl-functional organosilicon compounds.

(C) Hydroformylation Reaction Catalyst

Starting material (C), the hydroformylation reaction catalyst for use herein comprises an activated complex of rhodium and a close ended bisphosphite ligand. The bisphosphite ligand may be symmetric or asymmetric. Alternatively, the bisphosphite ligand may be symmetric. The bisphosphite ligand may have formula (C1):

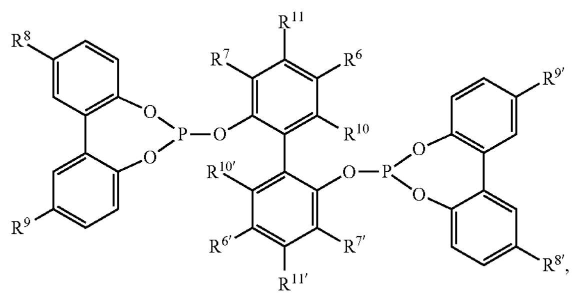

where $R^6$ and $R^{6'}$ are each independently selected from the group consisting of hydrogen, an alkyl group of at least one carbon atom, a cyano group, a halogen group, and an alkoxy group of at least one carbon atom; $R^7$ and $R^{7'}$ are each independently selected from the group consisting of an alkyl group of at least 3 carbon atoms and a group of formula $—SiR^{17}{}_3$, where each $R^{17}$ is an independently selected monovalent hydrocarbon group of 1 to 20 carbon atoms; $R^8$, $R^{8'}$, $R^9$, and $R^{9'}$ are each independently selected from the group consisting of hydrogen, an alkyl group, a cyano group, a halogen group, and an alkoxy group; and $R^{10}$, $R^{10'}$, $R^{11}$, and $R^{11'}$ are each independently selected from the group consisting of hydrogen and an alkyl group. Alternatively, one of $R^7$ and $R^{7'}$ may be hydrogen.

In formula (C1), $R^6$ and $R^{6'}$ may be alkyl groups of least one carbon atom, alternatively 1 to 20 carbon atoms. Suitable alkyl groups for $R^6$ and $R^{6'}$ may be linear, branched, cyclic, or combinations of two or more thereof. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 20 carbon atoms), and the alkyl groups are further exemplified by cycloalkyl groups such as cyclopropyl, cyclobutyl, cyclopentyl, and cyclohexyl. Alternatively, the alkyl group for $R^6$ and $R^{6'}$ may be selected from the group consisting of ethyl, propyl and butyl; alternatively propyl and butyl. Alternatively, the alkyl group for $R^6$ and $R^{6'}$ may be butyl. Alternatively, $R^6$ and $R^{6'}$ may be alkoxy groups, wherein the alkoxy group may have formula $—OR^{6''}$, where $R^{6''}$ is an alkyl group as described above for $R^6$ and $R^{6'}$.

Alternatively, in formula (C1), $R^6$ and $R^{6'}$ may be independently selected from alkyl groups of 1 to 6 carbon atoms and alkoxy groups of 1 to 6 carbon atoms. Alternatively, $R^6$ and $R^{6'}$ may be alkyl groups of 2 to 4 carbon atoms.

Alternatively, $R^6$ and $R^{6'}$ may be alkoxy groups of 1 to 4 carbon atoms. Alternatively, $R^6$ and $R^{6'}$ may be butyl groups, alternatively tert-butyl groups. Alternatively, $R^6$ and $R^{6'}$ may be methoxy groups.

In formula (C1), $R^7$ and $R^{7'}$ may be alkyl groups of least three carbon atoms, alternatively 3 to 20 carbon atoms. Suitable alkyl groups for $R^7$ and $R^{7'}$ may be linear, branched, cyclic, or combinations of two or more thereof. The alkyl groups are exemplified by propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 20 carbon atoms), and the alkyl groups are further exemplified by cycloalkyl groups such as cyclopropyl, cyclobutyl, cyclopentyl, and cyclohexyl. Alternatively, the alkyl group for $R^7$ and $R^{7'}$ may be selected from the group consisting of propyl and butyl. Alternatively, the alkyl group for $R^7$ and $R^{7'}$ may be butyl.

Alternatively, in formula (C1), $R^7$ and $R^{7'}$ may be a silyl group of formula $—SiR^{17}_3$, where each $R^{17}$ is an independently selected monovalent hydrocarbon group of 1 to 20 carbon atoms. The monovalent hydrocarbon group may be an alkyl group of 1 to 20 carbon atoms, as described above for $R^6$ and $R^{6'}$.

Alternatively, in formula (C1), $R^7$ and $R^{7'}$ may each be independently selected alkyl groups, alternatively alkyl groups of 3 to 6 carbon atoms. Alternatively, $R^7$ and $R^{7'}$ may be alkyl groups of 3 to 4 carbon atoms. Alternatively, $R^7$ and $R^{7'}$ may be butyl groups, alternatively tert-butyl groups.

In formula (C1), $R^8$, $R^{8'}$, $R^9$, $R^{9'}$ may be alkyl groups of at least one carbon atom, as described above for $R^6$ and $R^{6'}$. Alternatively, $R^8$ and $R^{8'}$ may be independently selected from the group consisting of hydrogen and alkyl groups of 1 to 6 carbon atoms. Alternatively, $R^8$ and $R^{8'}$ may be hydrogen. Alternatively, in formula (C1), $R^9$, and $R^{9'}$ may be independently selected from the group consisting of hydrogen and alkyl groups of 1 to 6 carbon atoms. Alternatively, $R^9$ and $R^{9'}$ may be hydrogen.

In formula (C1), $R^{10}$ and $R^{10'}$ may be hydrogen atoms or alkyl groups of least one carbon atom, alternatively 1 to 20 carbon atoms. The alkyl groups for $R^{10}$ and $R^{10'}$ may be as described above for $R^6$ and $R^{6'}$. Alternatively, $R^{10}$ and $R^{10'}$ may be methyl. Alternatively, $R^{10}$ and $R^{10'}$ may be hydrogen.

In formula (C1), $R^{11}$ and $R^{11'}$ may be hydrogen atoms or alkyl groups of least one carbon atom, alternatively 1 to 20 carbon atoms. The alkyl groups for $R^{11}$ and $R^{11'}$ may be as described above for $R^6$ and $R^{6'}$. Alternatively, $R^{11}$ and $R^{11'}$ may be hydrogen.

Alternatively, the ligand of formula (C1) may be selected from the group consisting of (C1-1) 6,6'-[[3,3',5,5'-tetrakis(1,1-dimethylethyl)-1,1'-biphenyl]-2,2'-diyl]bis(oxy)]bis-dibenzo[d,f][1,3,2]dioxaphosphepin; (C1-2) 6,6'-[(3,3'-di-tert-butyl-5,5'-dimethoxy-1,1'-biphenyl-2,2'-diyl)bis(oxy)]bis(dibenzo[d,f][1,3,2]dioxaphosphepin); and a combination of both (C1-1) and (C1-2).

Alternatively, the ligand may comprise 6,6'-[[3,3',5,5'-tetrakis(1,1-dimethylethyl)-1,1'-biphenyl]-2,2'-diyl]bis(oxy)]bis-dibenzo[d,f][1,3,2]dioxaphosphepin, as disclosed at col. 11 of U.S. Pat. No. 10,023,516 (see also U.S. Pat. No. 7,446,231, which discloses this compound as Ligand D at col. 22 and U.S. Pat. No. 5,727,893 at col. 20, lines 40-60 as ligand F).

Alternatively, the ligand may comprise biphephos, which is commercially available from Sigma Aldrich and may be prepared as described in U.S. Pat. No. 9,127,030. (See also U.S. Pat. No. 7,446,231 ligand B at col. 21 and U.S. Pat. No. 5,727,893 at col. 20, lines 5-18 as ligand D).

Starting material (C), the rhodium/bisphosphite ligand complex catalyst, may be prepared by methods known in the art, such as those disclosed in U.S. Pat. No. 4,769,498 to Billig, et al. at col. 20, line 50-col. 21, line 40 and U.S. Pat. No. 10,023,516 to Brammer et al. col. 11, line 35-col. 12, line 12 by varying appropriate starting materials. For example, the rhodium/bisphosphite ligand complex may be prepared by a process comprising combining a rhodium precursor and the bisphosphite ligand (C1) described above under conditions to form the complex, which complex may then be introduced into a hydroformylation reaction medium comprising one or both of starting materials (A) and/or (B), described above. Alternatively, the rhodium/bisphosphite ligand complex may be formed in situ by introducing the rhodium catalyst precursor into the reaction medium, and introducing (C1) the bisphosphite ligand into the reaction medium (e.g., before, during, and/or after introduction of the rhodium catalyst precursor), for the in situ formation of the rhodium/bisphosphite ligand complex. The rhodium/bisphosphite ligand complex can be activated by heating and/or exposure to starting material (A) to form the (C) rhodium/bisphosphite ligand complex catalyst. Rhodium catalyst precursors are exemplified by rhodium dicarbonyl acetylacetonate, $Rh_2O_3$, $Rh_4(CO)_{12}$, $Rh_6(CO)_{16}$, and $Rh(NO_3)_3$.

For example, a rhodium precursor, such as rhodium dicarbonyl acetylacetonate, optionally starting material (D), a solvent, and (C1) the bisphosphite ligand may be combined, e.g., by any convenient means such as mixing. The resulting rhodium/bisphosphite ligand complex may be introduced into the reactor, optionally with excess bisphosphite ligand. Alternatively, the rhodium precursor, (D) the solvent, and the bisphosphite ligand may be combined in the reactor with starting material (A) and/or (B), the alkenyl-functional organosilicon compound; and the rhodium/bisphosphite ligand complex may form in situ. The relative amounts of bisphosphite ligand and rhodium precursor are sufficient to provide a molar ratio of bisphosphite ligand/Rh of 10/1 to 1/1, alternatively 5/1 to 1/1, alternatively 3/1 to 1/1, alternatively 2.5/1 to 1.5/1. In addition to the rhodium/bisphosphite ligand complex, excess (e.g., not complexed) bisphosphite ligand may be present in the reaction mixture. The excess bisphosphite ligand may be the same as, or different from, the bisphosphite ligand in the complex.

The amount of (C) the rhodium/bisphosphite ligand complex catalyst (catalyst) is sufficient to catalyze hydroformylation of (B) the alkenyl-functional organosilicon compound. The exact amount of catalyst will depend on various factors including the type of alkenyl-functional organosilicon compound selected for starting material (B), its exact alkenyl content, and the reaction conditions such as temperature and pressure of starting material (A). However, the amount of (C) the catalyst may be sufficient to provide a rhodium metal concentration of at least 0.1 ppm, alternatively 0.15 ppm, alternatively 0.2 ppm, alternatively 0.25 ppm, and alternatively 0.5 ppm, based on the weight of (B) the alkenyl-functional organosilicon compound. At the same time, the amount of (C) the catalyst may be sufficient to provide a rhodium metal concentration of up to 300 ppm, alternatively up to 100 ppm, alternatively up to 20 ppm, and alternatively up to 5 ppm, on the same basis. Alternatively, the amount of (C) the catalyst may be sufficient to provide 0.1 ppm to 300 ppm, alternatively 0.2 ppm to 100 ppm, alternatively, 0.25 ppm to 20 ppm, and alternatively 0.5 ppm to 5 ppm, based on the weight of (B) the alkenyl-functional organosilicon compound.

Solvent

The hydroformylation reaction may run without additional solvents. Alternatively, the hydroformylation reaction may be carried out with a solvent, for example to facilitate mixing and/or delivery of one or more of the starting materials described above, such as the (C) catalyst and/or starting material (B), when, e.g., an alkenyl-functional polyorganosilicate resin is selected for starting material (B). The solvent is exemplified by aliphatic or aromatic hydrocarbons, which can dissolve the starting materials, e.g., toluene, xylene, benzene, hexane, heptane, decane, cyclohexane, or a combination of two or more thereof. Additional solvents include THF, dibutyl ether, diglyme, and Texanol. Without wishing to be bound by theory, it is thought that solvent may be used to reduce the viscosity of the starting materials. The amount of solvent is not critical, however, when present, the amount of solvent may be 5% to 70% based on weight of starting material (B) the alkenyl-functional organosilicon compound.

Hydroformylation Reaction Conditions

In the process described herein, step 1) is performed at relatively low temperature. For example, step 1) may be performed at a temperature of at least 30° C., alternatively at least 50° C., and alternatively at least 70° C. At the same time, the temperature in step 1) may be up to 150° C.; alternatively up to 100° C.; alternatively up to 90° C., and alternatively up to 80° C. Without wishing to be bound by theory, it is thought that lower temperatures, e.g., 30° C. to 90° C., alternatively 40° C. to 90° C., alternatively 50° C. to 90° C., alternatively 60° C. to 90° C., alternatively 70° C. to 90° C., alternatively 80° C. to 90° C., alternatively 30° C. to 60° C., alternatively 50° C. to 60° C. may be desired for achieving high selectivity and ligand stability.

In the process described herein, step 1) may be performed at a pressure of at least 101 kPa (ambient), alternatively at least 206 kPa (30 psi), and alternatively at least 344 kPa (50 psi). At the same time, pressure in step 1) may be up to 6,895 kPa (1,000 psi), alternatively up to 1,379 kPa (200 psi), alternatively up to 1000 kPa (145 psi), and alternatively up to 689 kPa (100 psi). Alternatively, step 1) may be performed at 101 kPa to 6,895 kPa; alternatively 344 kPa to 1,379 kPa; alternatively 101 kPa to 1,000 kPa; and alternatively 344 kPa to 689 kPa. Without wishing to be bound by theory, it is thought that using relatively low pressures, e.g., < to 6,895 kPa in the process herein may be beneficial; the ligands described herein allow for low pressure hydroformylation processes, which have the benefits of lower cost and better safety than high pressure hydroformylation processes.

The hydroformylation process may be carried out in a batch, semi-batch, or continuous mode, using one or more suitable reactors, such as a fixed bed reactor, a fluid bed reactor, a continuous stirred tank reactor (CSTR), or a slurry reactor. The selection of (B) the alkenyl-functional organosilicon compound, and (C) the catalyst, and whether (D) the solvent, is used may impact the size and type of reactor used. One reactor, or two or more different reactors, may be used. The hydroformylation process may be conducted in one or more steps, which may be affected by balancing capital costs and achieving high catalyst selectivity, activity, lifetime, and ease of operability, as well as the reactivity of the particular starting materials and reaction conditions selected, and the desired product.

Alternatively, the hydroformylation process may be performed in a continuous manner. For example, the process used may be as described in U.S. Pat. No. 10,023,516 except that the olefin feed stream and catalyst described therein are replaced with (B) the alkenyl-functional organosilicon compound and (C) the rhodium/bisphosphite ligand complex catalyst, each described herein.

Step 1) of the hydroformylation process forms a reaction fluid comprising the aldehyde-functional organosilicon compound. The reaction fluid may further comprise additional materials, such as those which have either been deliberately employed, or formed in situ, during step 1) of the process. Examples of such materials that can also be present include unreacted (B) alkenyl-functional organosilicon compound, unreacted (A) carbon monoxide and hydrogen gases, and/or in situ formed side products, such as ligand degradation products and adducts thereof, and high boiling liquid aldehyde condensation byproducts, as well as (D) a solvent, if employed. The term "ligand degradation product" includes but is not limited to any and all compounds resulting from one or more chemical transformations of at least one of the ligand molecules used in the process.

The hydroformylation process may further comprise one or more additional steps such as: 2) recovering (C) the rhodium/bisphosphite ligand complex catalyst from the reaction fluid comprising the aldehyde-functional organosilicon compound. Recovering (C) the rhodium/bisphosphite ligand complex catalyst may be performed by methods known in the art, including but not limited to adsorption and/or membrane separation (e.g., nanofiltration). Suitable recovery methods are as described, for example, in U.S. Pat. No. 5,681,473 to Miller, et al.; U.S. Pat. No. 8,748,643 to Priske, et al.; and U.S. Pat. No. 10,155,200 to Geilen, et al.

However, one benefit of the process described herein is that (C) the catalyst need not be removed and recycled. Due to the low level of Rh needed, it may be more cost effective not to recover and recycle (C) the catalyst; and the aldehyde-functional organosilicon compound produced by the process may be stable even when the catalyst is not removed. Therefore, alternatively, the process described above may be performed without step 2).

Alternatively, the hydroformylation process may further comprise 3) purification of the reaction product. For example, the aldehyde-functional organosilicon compound may be isolated from the additional materials, described above, by any convenient means such as stripping and/or distillation, optionally with reduced pressure.

Aldehyde-Functional Organosilicon Compound

The aldehyde-functional organosilicon compound is useful as a starting material in the process for preparing an amino-functional organosilicon compound. Starting material (E) is the aldehyde-functional organosilicon compound, which has, per molecule, at least one aldehyde-functional group covalently bonded to silicon. Alternatively, the aldehyde-functional organosilicon compound may have, per molecule, more than one aldehyde-functional group covalently bonded to silicon. The aldehyde-functional group covalently bonded to silicon may have formula:

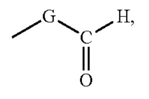

where G is a divalent hydrocarbon group free of aliphatic unsaturation that has 2 to 8 carbon atoms. G may be linear or branched. Examples of divalent hydrocarbyl groups for G include alkane-diyl groups of empirical formula $—C_rH_{2r}—$, where subscript r is 2 to 8. The alkane-diyl group may be a linear alkane-diyl, e.g., $—CH_2—CH_2—$, $—CH_2—CH_2—$ $CH_2$—, —$CH_2$—$CH_2$—$CH_2$—$CH_2$—, or —$CH_2$—$CH_2$—$CH_2$—$CH_2$—$CH_2$—$CH_2$—, or a branched alkane-diyl, e.g.,

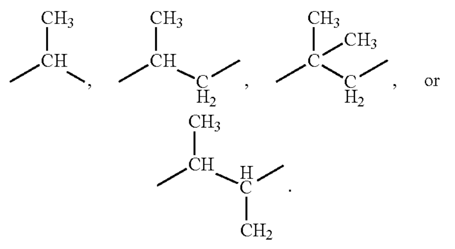

Alternatively, each G may be an alkane-diyl group of 2 to 6 carbon atoms; alternatively of 2, 3, or 6 carbon atoms. The aldehyde-functional organosilicon compound may be one aldehyde-functional organosilicon compound. Alternatively, two or more aldehyde-functional organosilicon compounds that differ from one another may be used in the process described herein. For example, the aldehyde-functional organosilicon compound may comprise one or both of an aldehyde-functional silane and an aldehyde-functional polyorganosiloxane.

The aldehyde-functional organosilicon compound may comprise (E1) an aldehyde-functional silane of formula (E1-1): $R^{Ald}{}_xSiR^4{}_{(4-x)}$, where each $R^{Ald}$ is an independently selected group of the formula

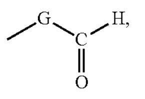

as described above; and $R^4$ and subscript x are as described above, e.g., each $R^4$ is independently selected from the group consisting of an alkyl group of 1 to 18 carbon atoms and an aryl group of 6 to 18 carbon atoms; and subscript x is 1 to 4.

Suitable aldehyde-functional silanes are exemplified by aldehyde-functional trialkylsilanes such as (propyl-aldehyde)-trimethylsilane, (propyl-aldehyde)-triethylsilane, and (butyl-aldehyde) trimethylsilane.

Alternatively, the aldehyde-functional organosilicon compound may comprise (E2) an aldehyde-functional polyorganosiloxane. Said aldehyde-functional polyorganosiloxane may be cyclic, linear, branched, resinous, or a combination of two or more thereof. Said aldehyde-functional polyorganosiloxane may comprise unit formula (E2-1):

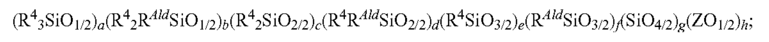

$$(R^4{}_3SiO_{1/2})_a(R^4{}_2R^{Ald}SiO_{1/2})_b(R^4{}_2SiO_{2/2})_c(R^4R^{Ald}SiO_{2/2})_d(R^4SiO_{3/2})_e(R^{Ald}SiO_{3/2})_f(SiO_{4/2})_g(ZO_{1/2})_h;$$

where each $R^{Ald}$ is an independently selected aldehyde group of the formula

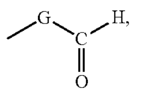

as described above, and G, $R^4$, Z, and subscripts a, b, c, d, e, f, g, and h are as described above.

Alternatively, (E2) the aldehyde-functional polyorganosiloxane may comprise (E2-2) a linear polydiorganosiloxane having, per molecule, at least one aldehyde-functional group; alternatively at least two aldehyde-functional groups (e.g., when in the formula (E2-1) for the aldehyde-functional polyorganosiloxane above, subscripts e=f=g=0). For example, said polydiorganosiloxane may comprise unit formula (E2-3): $(R^4{}_3SiO_{1/2})_a(R^{Ald}R^4{}_2SiO_{1/2})_b(R^4{}_2SiO_{2/2})_c(R^{Ald}R^4SiO_{2/2})_d$, where $R^{Ald}$ and $R^4$ are as described above, subscript a is 0, 1, or 2; subscript b is 0, 1, or 2, subscript c≥0, subscript d≥0, with the provisos that a quantity (b+d)≥1, a quantity (a+b)=2, and a quantity (a+b+c+d)≥2. Alternatively, in the unit formula (E2-3) for the linear aldehyde-functional polyorganosiloxane, above, the quantity (a+b+c+d) may be at least 3, alternatively at least 4, and alternatively >50. At the same time in said formula, the quantity (a+b+c+d) may be less than or equal to 10,000; alternatively less than or equal to 4,000; alternatively less than or equal to 2,000; alternatively less than or equal to 1,000; alternatively less than or equal to 500; alternatively less than or equal to 250. Alternatively, in the unit formula for the linear aldehyde-functional polyorganosiloxane, each $R^4$ may be independently selected from the group consisting of alkyl and aryl; alternatively methyl and phenyl. Alternatively, each $R^4$ in said formula may be an alkyl group; alternatively each $R^4$ may be methyl.

Alternatively, the linear aldehyde-functional polydiorganosiloxane of unit formula (E2-3) may be selected from the group consisting of: unit formula (E2-4): $(R^4{}_2R^{Ald}SiO_{1/2})_2(R^4{}_2SiO_{2/2})_m(R^4R^{Ald}SiO_{2/2})$ n, unit formula (E2-5): $(R^4{}_3SiO_{1/2})_2(R^4{}_2SiO_{2/2})_o(R^4R^{Ald}SiO_{2/2})_p$, or a combination of both (E2-4) and (E2-5).

In formulae (E2-4) and (E2-5), each $R^4$ and $R^{Ald}$ are as described above. Subscript m may be 0 or a positive number. Alternatively, subscript m may be at least 2. Alternatively subscript m be 2 to 2,000. Subscript n may be 0 or a positive number. Alternatively, subscript n may be 0 to 2000. Subscript o may be 0 or a positive number. Alternatively, subscript o may be 0 to 2000. Subscript p is at least 2. Alternatively subscript p may be 2 to 2000.

Starting material (E2) may comprise an aldehyde-functional polydiorganosiloxane such as i) bis-dimethyl(propyl-aldehyde)siloxy-terminated polydimethylsiloxane, ii) bis-dimethyl(propyl-aldehyde)siloxy-terminated poly(dimethylsiloxane/methyl(propyl-aldehyde)siloxane), iii) bis-dimethyl(propyl-aldehyde)siloxy-terminated polymethyl(propyl-aldehyde)siloxane, iv) bis-trimethylsiloxy-terminated poly(dimethylsiloxane/methyl(propyl-aldehyde)siloxane), v) bis-trimethylsiloxy-terminated polymethyl(propyl-aldehyde)siloxane, vi) bis-dimethyl(propyl-aldehyde)siloxy-terminated poly(dimethylsiloxane/methylphenylsiloxane/methyl(propyl-aldehyde)siloxane), vii) bis-dimethyl(propyl-aldehyde)siloxy-terminated poly(dimethylsiloxane/methylphenylsiloxane), viii) bis-dimethyl(propyl-aldehyde)siloxy-terminated poly(dimethylsiloxane/diphenylsiloxane), ix) bis-phenyl,methyl,(propyl-aldehyde)-siloxy-terminated polydimethylsiloxane, x) bis-dimethyl(heptyl-aldehyde)siloxy-terminated polydimethylsiloxane, xi) bis-dimethyl(heptyl-aldehyde)siloxy-terminated poly(dimethylsiloxane/methyl(heptyl-aldehyde)siloxane), xii) bis-dimethyl(heptyl-aldehyde)siloxy-terminated polymethyl(heptyl-aldehyde)siloxane, xiii) bis-trimethylsiloxy-terminated poly(dimethylsiloxane/methyl (heptyl-aldehyde)siloxane), xiv) bis-trimethylsiloxy-terminated polymethyl(heptyl-aldehyde)siloxane, xv) bis-dimethyl(heptyl-aldehyde)-siloxy terminated poly (dimethylsiloxane/methylphenylsiloxane/methyl(heptyl-aldehyde)siloxane), xvi) bis-dimethyl(propyl-aldehyde) siloxy-terminated poly(dimethylsiloxane/methyl(heptyl-aldehyde)siloxane), xvii) bis-dimethyl(heptyl-aldehyde)-siloxy-terminated poly(dimethylsiloxane/ methylphenylsiloxane), xviii) dimethyl(heptyl-aldehyde)-siloxy-terminated poly(dimethylsiloxane/diphenylsiloxane), and xix) a combination of two or more of i) to xviii).

Alternatively, (E2) the aldehyde-functional polyorganosiloxane may be cyclic, e.g., when in unit formula (E2-1), subscripts a=b=c=e=f=g=h=0. The (E2-6) cyclic aldehyde-functional polydiorganosiloxane may have unit formula (E2-7): $(R^4R^{Ald}SiO_{2/2})_d$, where $R^{Ald}$ and $R^4$ are as described above, and subscript d may be 3 to 12, alternatively 3 to 6, and alternatively 4 to 5. Examples of cyclic aldehyde-functional polydiorganosiloxanes include 2,4,6-trimethyl-2, 4,6-tri (propyl-aldehyde)-cyclotrisiloxane, 2,4,6,8-tetramethyl-2,4,6,8-tetra(propyl-aldehyde)-cyclotetrasiloxane, 2,4, 6,8,10-pentamethyl-2,4,6,8,10-penta (propyl-aldehyde)-cyclopentasiloxane, and 2,4,6,8,10,12-hexamethyl-2,4,6,8, 10,12-hexa (propyl-aldehyde)-cyclohexasiloxane.

Alternatively, (E2-6) the cyclic aldehyde-functional polydiorganosiloxane may have unit formula (E2-8): $(R^4_2SiO_{2/2})_c(R^4R^{Ald}SiO_{2/2})_d$, where $R^4$ and $R^{Ald}$ are as described above, subscript c is >0 to 6 and subscript d is 3 to 12. Alternatively, in formula (E2-8), a quantity (c+d) may be 3 to 12. Alternatively, in formula (E2-8), c may be 3 to 6, and d may be 3 to 6.

Alternatively, (E2) the aldehyde-functional polyorganosiloxane may be (E2-9) oligomeric, e.g., when in unit formula (E2-1) above the quantity $(a+b+c+d+e+f+g)\leq 50$, alternatively ≤40, alternatively ≤30, alternatively ≤25, alternatively ≤20, alternatively ≤10, alternatively ≤5, alternatively ≤4, alternatively ≤3. The oligomer may be cyclic, linear, branched, or a combination thereof. The cyclic oligomers are as described above as starting material (E2-6).

Examples of linear aldehyde-functional polyorganosiloxane oligomers may have formula (E2-10):

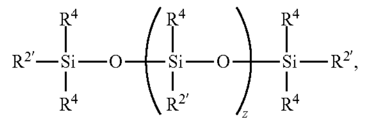

where $R^4$ is as described above, each $R^{2'}$ is independently selected from the group consisting of $R^4$ and $R^{Ald}$, with the proviso that at least one $R^{2'}$, per molecule, is $R^{Ald}$, and subscript z is 0 to 48. Alternatively, subscript z may be 0 to 4; alternatively 0 to 1; and alternatively 0. Alternatively, when z=0 in formula (E2-10), the aldehyde-functional polyorganosiloxane oligomer may have formula (E2-10a):

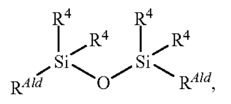

where $R^4$ and $R^{Ald}$ are as described above. Examples of linear aldehyde-functional polyorganosiloxane oligomers include 1,3-di(propyl-aldehyde)-1,1,3,3-tetramethyldisiloxane; 1,1,1,3,3-pentamethyl-3-(propyl-aldehyde)-disiloxane; and 1,1,1,3,5,5,5-heptamethyl-3-(propyl-aldehyde)-trisiloxane.

Alternatively, the aldehyde-functional polyorganosiloxane oligomer may be branched. The branched oligomer may have general formula (E2-11): $R^{Ald}SiR^{12}_3$, where $R^{Ald}$ is as described above and each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that $0\leq ii\leq 100$. At least two of $R^{12}$ may be $—OSi(R^{14})_3$. Alternatively, all three of $R^{12}$ may be $—OSi(R^{14})_3$.

Alternatively, in formula (E2-11) when each $R^{12}$ is $—OSi(R^{14})_3$, each $R^{14}$ may be $R^{13}$ moieties such that the branched polyorganosiloxane oligomer has the following structure (E2-11a):

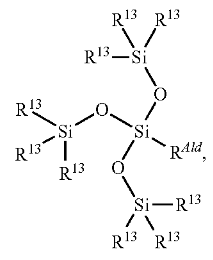

where $R^{13}$ is as described above, and $R^{Ald}$ is the aldehyde group as described above. Alternatively, each $R^{Ald}$ in formula (E2-11a) may be propanal and each $R^{13}$ may be methyl.

Alternatively, in formula (E2-11) when each $R^{12}$ is $—OSi(R^{14})_3$, each $R^{14}$ may be $—OSi(R^{15})_3$ moieties such that the branched polyorganosiloxane oligomer has the following structure:

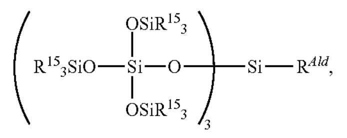

where $R^{Ald}$ and $R^{15}$ are as described above. Alternatively, each $R^{15}$ may be an $R^{13}$, as described above, and each $R^{13}$ may be methyl.

Alternatively, in formula (E2-11), when each $R^{12}$ is $—OSi(R^{14})_3$, one $R^{14}$ may be $R^{13}$ in each $—OSi(R^{14})_3$ such that each $R^{12}$ is $—OSiR^{13}(R^{14})_2$. Alternatively, two $R^{14}$ in $—OSiR^{13}(R^{14})_2$ may each be $—OSi(R^{15})_3$ moieties such that the branched aldehyde-functional polyorganosiloxane oligomer has the following structure:

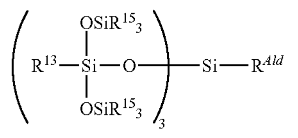

where $R^{Ald}$, $R^{13}$, and $R^{15}$ are as described above. Alternatively, each $R^{15}$ may be an $R^{13}$, and each $R^{13}$ may be methyl.

Alternatively, in formula (B2-11), one $R^{12}$ may be $R^{13}$, and two of $R^{12}$ may be $—OSi(R^{14})_3$. When two of $R^{12}$ are $—OSi(R^{14})_3$, and one $R^{14}$ is $R^{13}$ in each $—OSi(R^{14})_3$ then two of $R^{12}$ are $—OSiR^{13}(R^{14})_2$. Alternatively, each $R^{14}$ in $—OSiR^{13}(R^{14})_2$ may be $—OSi(R^{15})_3$ such that the branched polyorganosiloxane oligomer has the following structure:

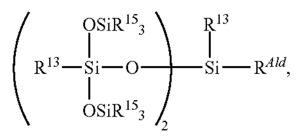

where $R^{Ald}$, $R^{13}$, and $R^{15}$ are as described above. Alternatively, each $R^{15}$ may be an $R^{13}$, and each $R^{13}$ may be methyl. Alternatively, the aldehyde-functional branched polyorganosiloxane may have 3 to 16 silicon atoms per molecule, alternatively 4 to 16 silicon atoms per molecule, and alternatively 4 to 10 silicon atoms per molecule. Examples of aldehyde-functional branched polyorganosiloxane oligomers include 3-(3,3,3-trimethyl-1-$\lambda^2$-disiloxaneyl)propanal (which can also be named propyl-aldehyde-tris(trimethyl) siloxy)silane), which has formula:

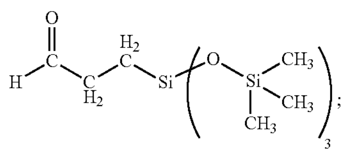

3-(1,3,5,5,5-pentamethyl-1$\lambda^3$,3$\lambda^3$-trisiloxaneyl)propanal (which can also be named methyl-(propyl-aldehyde)-di((1, 1,1,3,5,5,5-heptamethyltrisiloxan-3-yl)oxy)-silane), which has formula

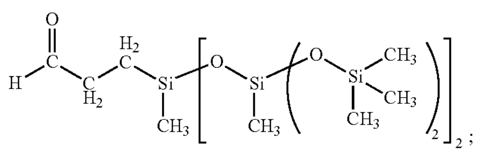

3-(3,5,5,5-tetramethyl-1$\lambda^2$,3$\lambda^3$-trisiloxaneyl)propanal (which can also be named (propyl-aldehyde)-tris((1,1,1,3,5, 5,5-heptamethyltrisiloxan-3-yl)oxy)-silane), which has formula

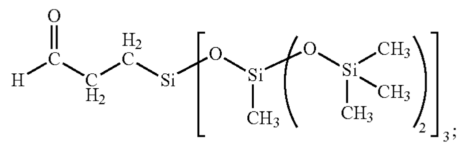

and 7-(3,5,5,5-tetramethyl-1$\lambda^2$,3$\lambda^3$-trisiloxaneyl) heptanal (which can also be named (heptyl-aldehyde)-tris((1,1,1,3,5, 5,5-heptamethyltrisiloxan-3-yl)oxy)-silane), which has formula

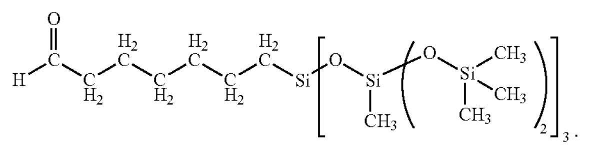

Alternatively, (E2) the aldehyde-functional polyorganosiloxane may be branched, such as the branched oligomer described above and/or a branched aldehyde-functional polyorganosiloxane that may have, e.g., more aldehyde groups per molecule and/or more polymer units than the branched oligomer described above (e.g., in formula (E2-1) when the quantity (a+b+c+d+e+f+g)>50). The branched aldehyde-functional polyorganosiloxane may have (in formula (E2-1)) a quantity (e+f+g) sufficient to provide >0 to 5 mol % of trifunctional and/or quadrifunctional units to the branched aldehyde-functional polyorganosiloxane.

For example, the branched aldehyde-functional polyorganosiloxane may comprise a Q branched polyorganosiloxane of unit formula (E2-13): $(R^4_3SiO_{1/2})_q(R^4_2R^{Ald}SiO_{1/2})_r(R^4_2SiO_{2/2})_s\ (SiO_{4/2})_t$, where $R^4$ and $R^{Ald}$ are as described above, and subscripts q, r, s, and t have average values such that 2≥q≥0, 4≥r≥0, 995≥s≥4, t=1, (q+r)=4, and (q+r+s+t) has a value sufficient to impart a viscosity >170 mPa·s measured by rotational viscometry (as described below with the test methods) to the branched polyorganosiloxane. Alternatively, viscosity may be >170 mPa·s to 1000 mPa·s, alternatively >170 to 500 mPa·s, alternatively 180 mPa·s to 450 mPa·s, and alternatively 190 mPa·s to 420 mPa·s.

Alternatively, the branched aldehyde-functional polyorganosiloxane may comprise formula (E2-14): $[R^{Ald}R^4_2Si—(O—SiR^4_2)_x—O]_{(4-w)}—Si—[O—(R^4_2SiO)_vSiR^4_3]_w$, where $R^{Ald}$ and $R^4$ are as described above; and subscripts v, w, and x have values such that 200≥v≥1, 2≥w≥0, and 200≥x≥1. Alternatively, in this formula (E2-14), each $R^4$ is independently selected from the group consisting of methyl and phenyl, and each $R^{Ald}$ has the formula above, wherein G has 2, 3, or 6 carbon atoms.

Alternatively, the branched aldehyde-functional polyorganosiloxane for starting material (E2-11) may comprise a T branched polyorganosiloxane (silsesquioxane) of unit formula (E2-15): $(R^4_3SiO_{1/2})_{aa}(R^{Ald}R^4_2SiO_{1/2})_{bb}(R^4_2SiO_{2/2})_{cc}(R^{Ald}R^4SiO_{2/2})_{ee}(R^4SiO_{3/2})_{dd}$, where $R^4$ and $R^{Ald}$ are as described above, subscript aa≥0, subscript bb>0, subscript cc is 15 to 995, subscript dd>0, and subscript ee≥0. Subscript aa may be 0 to 10. Alternatively, subscript aa may have a value such that: 12≥aa≥0; alternatively 10≥aa≥0; alternatively 7≥aa≥0; alternatively 5≥aa≥0; and alternatively 3≥aa≥0. Alternatively, subscript bb≥1. Alternatively, subscript bb≥3. Alternatively, subscript bb may have a value such that: 12≥bb>0; alternatively 12≥bb≥3; alternatively 10≥bb>0; alternatively 7≥bb>1; alternatively 5≥bb≥2; and alternatively 7≥bb≥3. Alternatively, subscript cc may have a value such that: 800≥cc≥15; and alternatively 400≥cc≥15. Alternatively, subscript ee may have a value such that: 800≥ee≥0; 800≥ee≥15; and alternatively 400≥ee≥15. Alternatively, subscript ee may b 0. Alternatively, a quantity (cc+ee) may have a value such that 995≥(cc+ee)≥15. Alternatively, subscript dd≥1. Alternatively, subscript dd may be 1 to 10. Alternatively, subscript dd may have a value such that: 10≥dd>0; alternatively 5≥dd>0; and alternatively dd=1. Alternatively, subscript dd may be 1 to 10, alternatively subscript dd may be 1 or 2. Alternatively, when subscript dd=1, then subscript bb may be 3 and subscript cc may be 0. The values for subscript bb may be sufficient to provide the silsesquioxane of unit formula (E2-15) with an aldehyde content of 0.1% to 1%, alternatively 0.2% to 0.6%, based on the weight of the silsesquioxane.

Alternatively, (E2) the aldehyde-functional polyorganosiloxane may comprise an aldehyde-functional polyorganosiloxane resin, such as an aldehyde-functional polyorganosilicate resin and/or an aldehyde-functional silsesquioxane resin. Such resins may be prepared, for example, by hydroformylating an alkenyl-functional polyorganosiloxane resin, as described above. The aldehyde-functional polyorganosilicate resin comprises monofunctional units ("M'" units) of formula $R^{M'}_3SiO_{1/2}$ and tetrafunctional silicate units ("Q" units) of formula $SiO_{4/2}$, where each $R^{M'}$ may be independently selected from the group consisting of $R^4$ and $R^{Ald}$ as described above. Alternatively, each $R^{M'}$ may be selected from the group consisting of an alkyl group, an aldehyde-functional group of the formula shown above, and an aryl group. Alternatively, each $R^{M'}$ may be selected from methyl, (propyl-aldehyde) and phenyl. Alternatively, at least one-third, alternatively at least two thirds of the $R^{M'}$ groups are methyl groups. Alternatively, the M' units may be exemplified by ($MesSiO_{1/2}$), ($Me_2PhSiO_{1/2}$), and ($Me_2R^{Ald}SiO_{1/2}$). The polyorganosilicate resin is soluble in solvents such as those described herein as starting material (D), exemplified by liquid hydrocarbons, such as benzene, ethylbenzene, toluene, xylene, and heptane, or in liquid non-functional organosilicon compounds such as low viscosity linear and cyclic polydiorganosiloxanes.

When prepared, the polyorganosilicate resin comprises the M' and Q units described above, and the polyorganosiloxane further comprises units with silicon bonded hydroxyl groups, and/or hydrolyzable groups, described by moiety ($ZO_{1/2}$), above, and may comprise neopentamer of formula $Si(OSiR^{M'}_3)_4$, where $R^{M'}$ is as described above, e.g., the neopentamer may be tetrakis(trimethylsiloxy)silane. $^{29}Si$ NMR and $^{13}C$ NMR spectroscopies may be used to measure hydroxyl and alkoxy content and molar ratio of M' and Q units, where said ratio is expressed as {M'(resin)}/{Q(resin)}, excluding M' and Q units from the neopentamer. M'/Q ratio represents the molar ratio of the total number of triorganosiloxy groups (M' units) of the resinous portion of the polyorganosilicate resin to the total number of silicate groups (Q units) in the resinous portion. M'/Q ratio may be 0.5/1 to 1.5/1, alternatively 0.6/1 to 0.9/1.

The Mn of the polyorganosilicate resin depends on various factors including the types of hydrocarbon groups represented by $R^{M'}$ that are present. The Mn of the polyorganosilicate resin refers to the number average molecular weight measured using GPC, when the peak representing the neopentamer is excluded from the measurement. The Mn of the polyorganosilicate resin may be 1,500 Da to 30,000 Da, alternatively 1,500 Da to 15,000 Da; alternatively >3,000 Da to 8,000 Da. Alternatively, Mn of the polyorganosilicate resin may be 3,500 Da to 8,000 Da.

Alternatively, the polyorganosilicate resin may comprise unit formula (E2-17): $(R^4_3SiO_{1/2})_{mm}(R^4_2R^{Ald}SiO_{1/2})_{nn}(SiO_{4/2})_{oo}(ZO_{1/2})_h$, where Z, $R^4$, and $R^{Ald}$, and subscript h are as described above and subscripts mm, nn and oo have average values such that mm≥0, nn>0, oo>0, and 0.5≤(mm+nn)/oo≤4. Alternatively, 0.6≤(mm+nn)/oo≤4; alternatively 0.7≤(mm+nn)/oo≤4, and alternatively 0.8≤(mm+nn)/oo≤4.

Alternatively, (E2) the aldehyde-functional polyorganosiloxane may comprise (E2-18) an aldehyde-functional silsesquioxane resin, i.e., a resin containing trifunctional (T') units of unit formula: $(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(ZO_{1/2})_h$; where $R^4$ and $R^{Ald}$ are as described above, subscript f>1, 2<(e+f)<10,000; 0<(a+b)/(e+f)<3; 0<(c+d)/(e+f)<3; and 0<h/(e+f)<1.5. Alternatively, the aldehyde-functional silsesquioxane resin may comprise unit formula (E2-19): $(R^4SiO_{3/2})_e(R^{Ald}SiO_{3/2})_f(ZO_{1/2})$, where $R^4$, $R^{Ald}$, Z, and subscripts h, e and f are as described above. Alternatively, the alkenyl-functional silsesquioxane resin may further comprise difunctional (D') units of formulae $(R^4_2SiO_{2/2})_c(R^4R^{Ald}SiO_{2/2})$ a in addition to the T units described above, i.e., a D'T' resin, where subscripts c and d are as described above. Alternatively, the alkenyl-functional silsesquioxane resin may further comprise monofunctional (M') units of formulae $(R^4_3SiO_{1/2})_a(R^4_2R^{Ald}SiO_{1/2})_b$, i.e., an M'D'T' resin, where subscripts a and b are as described above for unit formula (E2-1).

Starting material (E) may be any one of the aldehyde-functional organosilicon compounds described above. Alternatively, starting material (E) may comprise a mixture of two or more of the aldehyde-functional organosilicon compounds.

Preparing the Amino-Functional Organosilicon Compound

The process for preparing the amino-functional organosilicon compound may comprise:

I) combining, under conditions to catalyze hydrogenation reaction, starting materials comprising
   (E) the aldehyde-functional organosilicon compound described above,
   (F) an amine source,
   (G) a hydrogenation catalyst,
   (H) hydrogen, and
   optionally (J) a solvent; thereby forming a reductive amination reaction product comprising the amino-functional organosilicon compound.

The process may optionally further comprise, before step I), 1) combining, under conditions to catalyze hydroformylation reaction, starting materials comprising (A) the gas comprising hydrogen and carbon monoxide, (B) the alkenyl-functional organosilicon compound, and (C) the rhodium/bisphosphite ligand complex catalyst, thereby forming a hydroformylation reaction product comprising the aldehyde-functional organosilicon compound as described above. The process may optionally further comprise, before step I) and after step 1), step 2) recovering (C) the rhodium/bisphosphite ligand complex catalyst from the reaction product comprising the aldehyde-functional organosilicon compound. However, step 2) is optional and may be unnecessary. For example, when hydroformylation is used to prepare (E) the aldehyde-functional organosilicon compound, the hydroformylation reaction catalyst may be unnecessary to remove because, without wishing to be bound by theory, it is thought that the amount of catalyst is not cost effective to remove and/or the selection and amount of catalyst do not detrimentally impact the reductive amination reaction. The process may optionally further comprise, before step I) and after step 1), 3) purifying the reaction product; thereby isolating the aldehyde-functional organosilicon compound from the additional materials, as described above. However, this step 3) is optional, and may be unnecessary, for example, when a solvent is used for hydroformylation reaction to prepare (E) the aldehyde-functional organosilicon compound and the same solvent will be used as starting material (J).

The process may optionally further comprise, before step I), pre-treating (G) the hydrogenation catalyst. Pre-treating may be performed to activate the catalyst and/or increase the activity of the catalyst. Pre-treating may be performed by any convenient means, such as exposing the hydrogenation catalyst to hydrogen before beginning the reaction. For example, a packed bed of hydrogenation catalyst may be purged with hydrogen before introducing (E) the aldehyde-functional organosilicon compound and (F) the amine source.

(F) Amine Source

The amine source used herein may comprise (F1) a primary amine, (F2) ammonia, (F3) a polyetheramine, (F4) a diamine, or a combination of two or more of (F1), (F2), (F3), and (F4). The primary amine may have formula: $R^{18}NH_2$, where $R^{18}$ is an alkyl group of 1 to 18 carbon atoms. Suitable alkyl groups for $R^{18}$ may be linear, branched, cyclic, or combinations of two or more thereof. The alkyl groups are exemplified by methyl, ethyl, propyl (including n-propyl and/or isopropyl), butyl (including n-butyl, tert-butyl, sec-butyl, and/or isobutyl); pentyl, hexyl, heptyl, octyl, decyl, dodecyl, undecyl, and octadecyl (and branched isomers having 5 to 18 carbon atoms), and the alkyl groups are further exemplified by cycloalkyl groups such as cyclopropyl, cyclobutyl, cyclopentyl, and cyclohexyl. Alternatively, the alkyl group for $R^{18}$ may be selected from the group consisting of ethyl, propyl and butyl; alternatively ethyl and propyl; alternatively propyl and butyl. Alternatively, the alkyl group for $R^{18}$ may be propyl. Primary amines are known in the art and are commercially available. For example, ethyl amine, propyl amine, n-butyl amine, and isobutyl amine are available from various sources, such as Acros Organics or Sigma Aldrich, Inc. of St. Louis, Missouri, USA. Alternatively, (F) the amine source may comprise (F2) ammonia, which has formula $NH_3$, e.g., anhydrous ammonia. Ammonia is known in the art and commercially available from various sources, including Air Products of Allentown, Pennsylvania, USA.

Alternatively, (F), the amine source, may comprise (F3) a polyetheramine.

Polyetheramines are known in the art and are commercially available, e.g., under the tradename JEFFAMINE™ M series, from Huntsman Corporation of The Woodlands, Texas, USA. The polyetheramine may have unit formula $(H_2N)(C_2H_4O)_{jj}(C_3H_6O)_{kk}(H)$, where subscripts jj and kk represent average numbers of ethylene oxide and propylene oxide units (respectively) per molecule, $jj \geq 0$, $kk \geq 0$, and a quantity (jj+kk) is a value sufficient to give the polyetheramine a molecular weight of 600 g/mol to 3000 g/mol, alternatively 600 g/mol to 1000 g/mol.

Alternatively, (F), the amine source, may comprise (F4) a diamine. The diamine may have formula $H_2N\text{-}D\text{-}NH_2$, where D represents a divalent hydrocarbyl group. Examples of divalent hydrocarbyl groups for D include an alkane-diyl group, an arylene group such as phenylene, or an alkylarylene group such as:

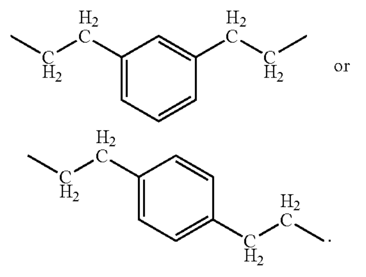

Examples of alkane-diyl groups for D may have empirical formula $—C_rH_{2r}—$, where subscript r is 2 to 6. The alkane-diyl group may be a linear alkane-diyl, e.g., $—CH_2—CH_2—$, $—CH_2—CH_2—CH_2—$, $—CH_2—CH_2—CH_2—CH_2—$, or $—CH_2—CH_2—CH_2—CH_2—CH_2—CH_2—$, or a branched alkane-diyl, e.g.,

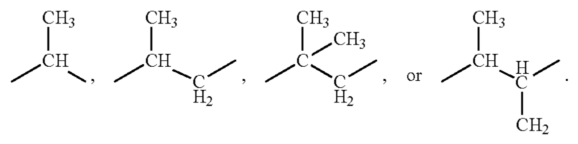

Alternatively, each D may be an alkane-diyl group of 2, 3, or 6 carbon atoms. Alternatively, (F4) the diamine may be ethylene diamine. Diamines such as ethylene diamine are commercially available from various sources, such as Alfa Aesar and Acros Organics.

One amine source may be used herein. Alternatively, (F) the amine source may comprise a combination of two or more of the amine sources as described above, e.g., two or more species of (F1) the primary amine; a combination of (F1) the primary amine and (F2) ammonia; or a combination of (F2) ammonia and (F3) the polyetheramine. The amine source may be used in a superstoichiometric amount of amine functionality with respect to the aldehyde-functionality of (E) the aldehyde-functional organosilicon compound. For example, when starting material (F) is a primary amine or a diamine, as described above, the amount may be sufficient to provide 10:1 to 1:1 molar ratio of amine groups:aldehyde groups. Alternatively, when starting material (F) is ammonia, the amount may be sufficient to provide a >1:1, alternatively ≥5:1, alternatively 10:1 to 40:1 molar ratio of ammonia:aldehyde groups.

(G) Hydrogenation Catalyst

The hydrogenation catalyst used in the process for preparing the amino-functional organosilicon compound may be a heterogeneous hydrogenation catalyst, a homogenous hydrogenation catalyst, or a combination thereof. Alternatively, the hydrogenation catalyst may be a heterogeneous hydrogenation catalyst. Suitable heterogeneous hydrogenation catalysts comprise a metal selected from the group consisting of cobalt (Co), copper (Cu), iron (Fe), nickel (Ni), iridium (Ir), palladium (Pd), platinum (Pt), rhodium (Rh), ruthenium (Ru), and a combination of two or more thereof. Alternatively, the hydrogenation catalyst may comprise Co, Cu, Ni, Pd, Pt, Ru, or a combination of two or more thereof. Alternatively, the hydrogenation catalyst may comprise Co, Cu, Ni, Pd, or a combination of two or more thereof. Alternatively, the hydrogenation catalyst may comprise Co, Cu, Ni, or a combination of two or more thereof. The hydrogenation catalyst may include a support, such as alumina ($Al_2O_3$), silica ($SiO_2$), silicon carbide (SiC), or carbon (C). Alternatively, the hydrogenation catalyst may be selected from the group consisting of Rh/C, Raney nickel, Raney copper, Raney cobalt, Ru/C, $Ru/Al_2O_3$, Pd/C, $Pd/Al_2O_3$, $Pd/CaCO_3$, Cu/C, $Cu/Al_2O_3$, $Cu/SiO_2$, Cu/SiC, Cu/C, a nickel catalyst on a support described above, and a combination of two or more thereof.

Alternatively, heterogeneous hydrogenation catalysts for hydrogenation of an imine intermediate formed via reaction of the aldehyde group of (E) the aldehyde-functional organosilicon compound and the amine group of (F) the amine source may include a support material on which copper, chromium, nickel, rhodium, or two or more thereof are applied as active components. Exemplary catalysts include copper at 0.3 to 15%; nickel at 0.3% to 15%, and chromium at 0.05% to 3.5%. The support material may be, for example, porous silicon dioxide or aluminium oxide. Barium may optionally be added to the support material. Chromium free hydrogenation catalysts may alternatively be used. For example a $Ni/Al_2O_3$ or $Co/Al_2O_3$ may be used, or a copper oxide/zinc oxide containing catalyst, which further comprises potassium, nickel, and/or cobalt; and additionally an alkali metal. Suitable hydrogenation catalysts are disclosed for example, in U.S. Pat. No. 7,524,997 or 9,567,276 and the references cited therein. Alternatively, heterogeneous hydrogenation catalysts may be commercially available, such as Rh/C catalyst, which is available from Sigma-Aldrich; Ni-5256P, which is available from BASF; and Co-179, which is also commercially available.

Other examples of suitable heterogeneous hydrogenation catalysts for use herein include Raney Nickel such as Raney Nickel 2400, Ni-3288, Raney Copper, Hysat 401 salt (Cu), ruthenium on carbon (Ru/C), rhodium on carbon (Rh/C), platinum on carbon (Pt/C), copper on silicon carbide (Cu/SiC).

Alternatively, a homogeneous hydrogenation reaction catalyst may be used herein. The homogeneous hydrogenation catalyst may be a metal complex, where the metal may be selected from the group consisting of Co, Fe, Ir, Rh, and Ru. Examples of suitable homogeneous hydrogenation catalysts are exemplified by $[RhCl(PPh_3)_3]$ (Wilkinson's catalyst); $[Rh(NBD)(PR'_3)_2]+ClO_4$— (where R' is an alkyl group, e.g. Et); $[RuCl_2$ (diphosphine)(1,2-diamine)] (Noyori catalysts); $RuCl_2$(TRIPHOS) (where TRIPHOS=PhP $[(CH_2CH_2PPh_2)_2]$; Ru(II)(dppp)(glycine) complexes (where dppp=1,3-bis(diphenylphosphino) propane); $RuCl_2(PPh_3)_3$; $RuCl_2(CO)_2(PPh_3)_2$; $IrH_3(PPh_3)_3$; $[Ir(H_2)(CH_3COO)(PPh_3)_3]$; cis-[Ru—Cl2(ampy)(PP)] [where ampy=2-(aminomethyl)pyridine; and PP=1,4-bis-(diphenylphosphino) butane, 1,1'-ferrocenediyl-bis(diphenylphosphine)]; Pincer RuCl(CNNR)(PP) complexes [where PP=1,3-bis(diphenylphosphino) propane, 1,4-bis(diphenylphosphino) butane, 1,1'-ferrocenediyl-bis(diphenylphosphine); and HCNNR=4-substituted-aminomethyl-benzo[h]quinoline; R=Me, Ph]; $[RuCl_2$(dppb)(ampy)] (where dppb=1,4-Bis(diphenylphosphino) butane, ampy=2-aminomethyl pyridine); [Fe(PNP-MeiPr)(CO)(H)(Br)]; $[Fe(PNPMe\text{-}iPr)(H)_2(CO)]$; and a combination thereof.

The amount of hydrogenation catalyst used in the process depends on various factors including whether the process will be run in a batch or continuous mode, the selection of aldehyde-functional organosilicon compound, whether a heterogeneous or homogeneous hydrogenation catalyst is selected, and reaction conditions such as temperature and pressure. However, when the process is run in a batch mode the amount of catalyst may be <1 weight % to 50 weight %, alternatively 5 weight % to 30 weight %, based on weight of the aldehyde-functional organosilicon compound. Alternatively, the amount of catalyst may be at least 1, alternatively at least 4, alternatively at least 6.5, and alternatively at least 8, weight %; while at the same time the amount of catalyst may be up to 50, alternatively up to 20, alternatively up to 14, alternatively up to 13, alternatively up to 10, and alternatively up to 9, weight %, on the same basis. Alternatively, when the process will be run in a continuous mode, e.g., by packing a reactor with a heterogeneous hydrogenation catalyst, the amount of the hydrogenation catalyst may be sufficient to provide a reactor volume (filled with hydrogenation catalyst) to achieve a space time of 10 $hr^{-1}$, or catalyst surface area sufficient to achieve 10 kg/hr substrate per $m^2$ of catalyst.

(H) Hydrogen

Hydrogen is known in the art and commercially available from various sources, e.g., Air Products. Hydrogen may be used in a superstoichiometric amount with respect to the aldehyde-functionality of (E) the aldehyde-functional organosilicon compound to permit complete reaction.

(J) Solvent

A solvent (J) that may optionally be used in the process for preparing the amino-functional organosilicon compound may be selected from those solvents that are neutral to the reaction. The following are specific examples of such solvents: monohydric alcohols such as methanol, ethanol, and isopropyl alcohol; dioxane, ethers such as THF; aliphatic hydrocarbons, such as hexane, heptane, and paraffinic solvents; and aromatic hydrocarbons such as benzene, toluene, and xylene; chlorinated hydrocarbons, and water. These solvents can be used individually or in combinations of two or more. The amount of solvent is not critical and may depend on various factors such as the type and amount of each starting material to be used. For example, more solvent may be used when the aldehyde-functional organosilicon compound is a resin as opposed to an oligomer. However, the amount of solvent may be 0 to 99% based on combined weights of all starting materials.

(K) Adsorbent

In step I) of the process, an adsorbent may optionally be added to remove water generated as a side product during the reaction. Examples of suitable adsorbents may be inorganic particulates. The adsorbent may have a particle size of 10 micrometers or less, alternatively 5 micrometers or less. The adsorbent may have average pore size sufficient to adsorb water, for example 10 Å (Angstroms) or less, alternatively 5 Å or less, and alternatively 3 Å or less. Examples of adsorbents include zeolites such as chabasite, mordenite, and analcite; molecular sieves such as alkali metal alumino silicates, silica gel, silica-magnesia gel, activated carbon, activated alumina, calcium oxide, and combinations thereof.

Examples of commercially available drying agents include dry molecular sieves, such as 3 Å (Angstrom) molecular sieves, which are commercially available from Grace Davidson under the trademark SYLOSIV™ and from Zeochem of Louisville, Kentucky, U.S.A. under the trade name PURMOL™, and 4 Å molecular sieves such as Doucil zeolite 4A available from Ineos Silicas of Warrington, England. Other useful molecular sieves include MOLSIV™ ADSORBENT TYPE 13X, 3 A, 4 A, and 5 A, all of which are commercially available from UOP of Illinois, U.S.A.; SILIPORITE™ NK 30AP and 65xP from Atofina of Philadelphia, Pennsylvania, U.S.A.; and molecular sieves available from W.R. Grace of Maryland, U.S.A. Other suitable drying agents include $MgSO_4$. The amount of adsorbent is not critical and will depend on various factors including the amount of carbinol-groups in starting material (C).

The reductive amination reaction can be performed using pressurized hydrogen. Hydrogen (gauge) pressure may be 10 psig (68.9 kPa) to 3000 psig (20,685 kPa), alternatively 10 psig to 2000 psig (13,790 kPa), alternatively 10 psig to 1500 psig (10,342 kPa), alternatively 200 psig (1379 kPa) to 1200 psig (8274 kPa). The reaction may be carried out at a temperature of 0 to 200° C. Alternatively, a temperature of 50 to 150° C. may be suitable for shortening the reaction time. Alternatively, the hydrogen (gauge) pressure used may be at least 25, alternatively at least 50, alternatively at least 100, alternatively at least 150, and alternatively at least 164, psig; while at the same time the hydrogen gauge pressure may be up to 800, alternatively up to 400, alternatively up to 300, alternatively up to 200, and alternatively up to 194, psig. The temperature for reaction may be at least 40, alternatively at least 50, alternatively at least 65, alternatively at least 80, ° C., while at the same time the temperature may be up to 200, alternatively up to 150, alternatively up to 120, ° C.

The reaction can be carried out as a batch process or as a continuous process. In a batch process, the reaction time depends on various factors including the amount of the catalyst and reaction temperatures, however, step I) of the process for preparing the amino-functional organosilicon compound may be performed for 1 minute to 24 hours. Alternatively, the reaction may be performed for at least 1 minute, alternatively at least 2 minutes, alternatively at least 1 hour, alternatively at least 2 hours, alternatively at least 3 hours, alternatively at least 3.3 hours, alternatively at least 3.7 hours, alternatively at least 4 hours, alternatively at least 4.5 hours, alternatively at least 5.5 hours, and alternatively at least 6 hours; while at the same time, the reaction may be performed for up to 24 hours, alternatively up to 23 hours, alternatively up to 22.5 hours, alternatively up to 22 hours, alternatively up to 17.5 hours, alternatively up to 17 hours, and alternatively up to 16.5 hours.

Alternatively, in a batch process, the terminal point of a reaction can be considered to be the time during which the decrease in reactor pressure is no longer observed after the reaction is continued for an additional 1 to 2 hours. If reactor pressure decreases in the course of the reaction, it may be desirable to repeat the introduction of hydrogen and amine source, and to maintain it under increased pressure to shorten the reaction time. Alternatively, the reactor can be re-pressurized with hydrogen and the amine source 1 or more times to achieve sufficient supply of hydrogen and amine source for reaction of the aldehyde functionality while maintaining reasonable reactor pressures.

After completion of the reaction, the hydrogenation catalyst may be separated in a pressurized inert (e.g., nitrogenous) atmosphere by any convenient means, such as filtration or adsorption, e.g., with diatomaceous earth or activated carbon, settling, centrifugation, by maintaining the catalyst in a structured packing or other fixed structure, or a combination thereof.

The amino-functional organosilicon compound prepared as described above has, per molecule, at least one amino-functional group covalently bonded to silicon. Alternatively, the amino-functional organosilicon compound may have, per molecule, more than one amino-functional group covalently bonded to silicon. The amino-functional group covalently bonded to silicon, $R^N$, may have formula:

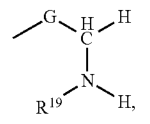

where G is a divalent hydrocarbon group free of aliphatic unsaturation that has 2 to 8 carbon atoms, as described and exemplified above, and $R^{19}$ is selected from the group consisting of $R^{18}$ (which is an alkyl group as described above), H, a group of formula $DNH_2$, where D is a divalent hydrocarbyl group as described above, and a polyether group, e.g., of unit formula $—(C_2H_4O)_{jj}(C_3H_6O)_{kk}(H)$, where subscripts jj and kk are as described above. The amino-functional organosilicon compound can have any one of the formulas above for (E) the aldehyde-functional organosilicon compound, wherein at least one $R^{Ald}$ is preplaced with the group $R^N$.

EXAMPLES

These examples are provided to illustrate the invention to one of ordinary skill in the art and should not be construed to limit the scope of the invention set forth in the claims. Starting materials used in the examples are described below in Table 1.

TABLE 1

Starting Materials

| Type | Name/Chemical Description | Source |
|---|---|---|
| Solvent | Methanol/$CH_3OH$ | Sigma-Aldrich |
| Solvent | Toluene, PHR1317/$C_7H_8$ | Sigma-Aldrich |
| Solvent | Heptane/$C_7H_{16}$ | Sigma-Aldrich |
| Solvent | Isopropanol/$(CH_3)_2CHOH$ | Sigma-Aldrich |
| Hydrogenation Catalyst | Rh/C/Rhodium on carbon | Sigma-Aldrich |
| Hydrogenation Catalyst | Ni-5256P catalyst/Nickel catalyst | BASF |
| Hydrogenation Catalyst | Co-0179/Cobalt catalyst | BASF |
| Hydroformylation Catalyst Precursor | (Acetylacetonato) dicarbonylrhodium(I)/ Rh(acac)(CO)2 | Commercially available |
| Ligand 1 | 6,6'-[[3,3',5,5'-tetrakis(1,1-dimethylethyl)-1,1'-biphenyl]-2,2'-diyl]bis(oxy)]bis-dibenzo[d,f][1,3,2]dioxaphosphepin | TDCC |
| Vinyl functional siloxane | DVTMS/1,3-divinyltetramethyldisiloxane | DSC |
| Vinyl functional siloxane | $MD^{Vi}M$, vinylmethylbis(trimethylsiloxy)silane/ $\{(CH_3)_3SiO_{1/2}\}_2$ $\{(CH_3)(CH_2{=}CH)SiO_{2/2}\}$ | DSC |
| Vinyl functional siloxane | $M^{vi}D_7M^{vi}$/3,3'-(1,1,3,3,5,5,7,7,9,9,11,11,13,13,15,15,17,17-octadecamethylnonasiloxane-1,17-diyl)dipropanal | DSC |
| Vinyl functional siloxane | $M^{vi}D_{328}M^{vi}$/Bis-vinyldimethylsiloxy-terminated polydimethylsiloxane with DP = 328 | DSC |
| Vinyl functional siloxane | $M^{vi}D_{558}M^{vi}$/Bis-vinyldimethylsiloxy-terminated polydimethylsiloxane with DP = 558 | DSC |
| Vinyl functional siloxane | 1,1,1,5,5,5-hexamethyl-3-((trimethylsilyl)oxy)-3-vinyltrisiloxane | DSC |
| Vinyl functional siloxane | trimethylsiloxy, dimethylvinylsiloxy, phenylsiloxy silsesquioxane resin with unit | DSC |

TABLE 1-continued

| Starting Materials | | |
|---|---|---|
| Type | Name/Chemical Description | Source |
| | formula $M_{0.24}M^{Vi}_{0.14}T^{Ph}_{0.62}$ where the subscripts represent mole fractions in the resin, and the resin has Mn = 938 g/mol and Mw = 1053 g/mol | |
| Amine Source | Ammonia/$NH_3$ | commercially available |
| Amine Source | n-butylamine/$(C_4H_9)NH_2$ | Sigma-Aldrich |
| Amine Source | JEFFAMINE ™ M1000/Polyethylene glycol (PEG) based monoamine with molecular weight 1,000 g/mol | Huntsman |
| Amine Source | JEFFAMINE ™ M600/Polypropylene glycol (PPG) based monoamine with molecular weight 600 g/mol | Huntsman |
| Amine Source | Ethylene diamine/$H_2NCH_2CH_2NH_2$ | Sigma-Aldrich |
| Dialdehyde-siloxane A | 3,3'-(1,1,3,3-tetramethyldisiloxane-1,3-diyl)dipropanal/C10H22O3Si2 | Example 1, below. |
| $MD^{Pr\text{-}ald}M$ | 3-(1,1,1,3,5,5,5-heptamethyltrisiloxan-3-yl)propanal/C10H26O3Si3 | Example 30, below. |
| $M^{Pr\text{-}ald}D_7M^{Pr\text{-}ald}$ | Propylaldehyde terminated PDMS (DP = 7)/ bis(propyl-aldehyde)-terminated polydimethylsiloxane, $M^{Pr\text{-}ald}D_7M^{Pr\text{-}ald}$ | Example 36, below |
| $M^{Pr\text{-}ald}D_{558}M^{Pr\text{-}ald}$ | Propylaldehyde terminated PDMS (DP = 560)/ bis(propyl-aldehyde)-terminated polydimethylsiloxane, $M^{Pr\text{-}ald}D_{558}M^{Pr\text{-}ald}$ | Example 26, below. |
| $M^{Pr\text{-}ald}D_{328}M^{Pr\text{-}ald}$ | Propylaldehyde terminated PDMS (DP = 330)/ bis(propyl-aldehyde)-terminated polydimethylsiloxane, $M^{Pr\text{-}ald}D_{328}M^{Pr\text{-}ald}$ | Example 28, below. |
| $M_3T^{Propanaldehyde}$ | 3-(1,1,1,5,5,5-hexamethyl-3-((trimethylsilyl)oxy)trisiloxan-3-yl)propanal | See Example (in paragraph [0169] below. |
| $M_{0.24}M^{Propanaldehyde}_{0.139}T^{Ph}_{0.52}$ | Propylaldehyde-functional phenylsilsesquioxane resin | See Example (in paragraph [00174] below. |

In this Example 1, 3,3'-(1,1,3,3-tetramethyldisiloxane-1,3-diyl)dipropanal of formula

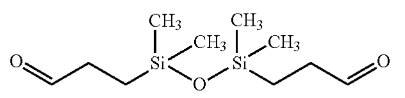

was synthesized as follows. In a nitrogen filled glovebox, Rh(acac)(CO)2 (25.2 mg), Ligand 1 (150.5 mg) and toluene (17.07 g) were added into a 30 mL glass vial with a magnetic stir bar. The mixture was stirred on a stir plate until a homogeneous solution formed. This catalyst solution was transferred to an air-tight syringe with a metal valve and subsequently removed from the glove box. In a ventilated fume hood, 1,3-divinyltetramethyldisiloxane (1000 g) was loaded to a 2 L Autoclave reactor. The reactor was sealed and loaded into the holder. The reactor was pressurized with nitrogen up to 100 psig (689.5 kPa) via the dip-tube and was carefully relieved through a valve connected to the head-space. This step was repeated three times for inertion of reactor headspace. The reactor was then pressure tested by pressurizing to 300 psig (2068.4 kPa) with nitrogen. After the pressure was released, the catalyst solution was added to the reactor via the sample loading port. The reactor was pressurized with syngas to 100 psig (689.5 kPa) and then released for three times prior to being pressurized to 80 psig (551.6 kPa) via the dip-tube. Reaction temperature was set to 50° C. until gas uptake slowed then set temp to 80° C. Agitation rate was set to 800 RPM. The intermediate cylinder containing syngas and the reactor were connected when the desired temperature was reached. The pressure was set to 100 psig (689.5 kPa). The reaction progress was monitored by a data logger which measured the pressure in the 300 mL intermediate cylinder as it supplied syngas to the reactor via a pressure reducing regulator. >98% conversion was observed after 22.5 hours. The n/i ratio was determined by $^1H$ NMR analysis of the final product.

In this Example 2, 120 g of the 3,3'-(1,1,3,3-tetramethyl-disiloxane-1,3-diyl)dipropanal prepared as described in Example 1 was loaded in a 2 L Autoclave reactor with methanol (120 g) and 5 wt % Rh/C catalyst (18 g). The reactor was sealed and the headspace was inerted with nitrogen. Ammonia (398 g, 24 equivalence) was added and the reactor was pressurized with hydrogen to 519 psig (3578.4 kPa). The reactor was heated to 90° C. and hydrogen was added until pressure was 100 psig (689.5 kPa) higher than reactor pressure at reaction temperature. The reaction pressure was observed to be 900 psig (6205.3 kPa). Reductive amination was carried out at 90° C., 810 RPM for 4 hours. The reactor was cooled and vented. The reaction product was collected and filtered to remove catalyst, and the solvent was removed using a rotary evaporator to collect 116.0 g of product. This product was analyzed using GC-FID, $^1H$, $^{13}C$, and $^{29}Si$ NMR.

In this Example 3, 120 g of the 3,3'-(1,1,3,3-tetramethyl-disiloxane-1,3-diyl)dipropanal prepared as described in Example 1 was loaded into a 2 L Autoclave reactor with toluene (120 g) and 5 wt % Rh/C catalyst (18 g). The reactor was sealed and the headspace was inerted with nitrogen. Ammonia (398 g, 24 equivalence) was added and the reactor was pressurized with hydrogen to 354 psig (2440.7 kPa). The reactor was heated to 90° C. and hydrogen was added until pressure was 100 psig (689.5 kPa) higher than reactor pressure at reaction temperature. The reaction pressure was observed to be 1021 psig (7039.5 kPa). Reductive amination was carried out at 90° C., 802 RPM for 4 hours. The reactor was cooled and vented. The reaction product was collected and filtered to remove catalyst, and the solvent was removed using a rotary evaporator to collect 110.9 g of product. This product was analyzed using GC-FID, $^{1}H$, $^{13}C$, and $^{29}Si$ NMR.

In this Example 4, 120 g of the 3,3'-(1,1,3,3-tetramethyldisiloxane-1,3-diyl)dipropanal prepared as described in Example 1 was loaded in a 2 L Autoclave reactor with heptane solvent (120 g) and 5 wt % Rh/C catalyst (18 g). The reactor was sealed and the headspace was inerted with nitrogen. Ammonia (398 g, 24 equivalence) was added and the reactor was pressurized with hydrogen to 338 psig (2330.4 kPa). The reactor was heated to 90° C. and hydrogen was added until pressure was 100 psig (689.5 kPa) higher than reactor pressure at reaction temperature. The reaction pressure was observed to be 1044 psig (7198.1 kPa). Reductive amination was carried out at 90° C., 800 RPM for 4 hours. The reactor was cooled and vented. The reaction product was collected and filtered to remove catalyst, and the solvent was removed using a rotary evaporator to collect 102.2 g of product. This product was analyzed using GC-FID, $^{1}H$, $^{13}C$, and $^{29}Si$ NMR.

In this Example 5, 140 g of 3,3'-(1,1,3,3-tetramethyldisiloxane-1,3-diyl)dipropanal prepared as described in Example 1 was loaded in a 2 L Autoclave reactor with methanol (140 g) and Ni-5256P catalyst (21.0 g). The reactor was sealed and the headspace was inerted with nitrogen. Ammonia (580.5 g, 30 equivalence) was added and the reactor was pressurized with hydrogen to 650 psig (4481.6 kPa). The reactor was heated to 90° C., and hydrogen was added until pressure was 100 psig (689.5 kPa) higher than reactor pressure at reaction temperature. The reaction pressure was observed to be 850 psig (5860.5 kPa). Reductive amination was carried out at 90° C., 780 RPM for 4 hours. The reactor was cooled and vented. The reaction product was collected and filtered to remove catalyst, and the solvent was removed using a rotary evaporator to collect 131.6 g of concentrated product. The concentrated product was 64.4 wt % 3,3'-(1,1,3,3-tetramethyldisiloxane-1,3-diyl)bis(propan-1-amine) as assayed using GC-FID. The 3,3'-(1,1,3,3-tetramethyldisiloxane-1,3-diyl)bis(propan-1-amine) had formula:

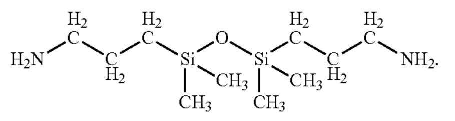

In this Example 6, 18 g of the 3,3'-(1,1,3,3-tetramethyldisiloxane-1,3-diyl)dipropanal prepared as described in Example 1 was loaded in a 300 mL Autoclave reactor with toluene solvent (18 g) and Ni-5256P catalyst (4.1 g). The reactor was sealed and the headspace was inerted with nitrogen. Ammonia (74.6 g, 30 equivalence) was added, and the reactor was pressurized with hydrogen to 550 psig (3792.1 kPa). The reactor was heated to 90° C. and hydrogen was added until pressure was 100 psig (689.5 kPa) higher than reactor pressure at reaction temperature. The reaction pressure was observed to be 940 psig (6481.1 kPa). Reductive amination was carried out at 90° C., 825 RPM for 4 hours. The reactor was cooled and vented. The reaction product was collected and filtered to remove catalyst, and the solvent was removed using a rotary evaporator to collect 17.0 g of concentrated product. The concentrated product was 59.7 wt % 3,3'-(1,1,3,3-tetramethyldisiloxane-1,3-diyl)bis(propan-1-amine) as assayed using GC-FID.

In this Example 7, a reductive amination experiment was carried out in a 300 mL Autoclave reactor with Co-0179 at 110° C., 800 RPM for 4 h. 3,3'-(1,1,3,3-tetramethyldisiloxane-1,3-diyl)dipropanal (16 g) prepared as described in Example 1 was loaded with methanol (16 g) and the Co catalyst (4.9 g). The reactor was sealed, and the headspace was inerted with nitrogen. Ammonia (74.6 g, 30 equivalence) was added, and the reactor was pressurized with hydrogen to 600 psig (4136.8 kPa). The reactor was heated to 90° C., and hydrogen was added until pressure was 100 psig (689.5 kPa) higher than reactor pressure at reaction temperature. The reaction pressure was observed to be 1200 psig (8273.7 kPa). The reactor was cooled and vented. The reaction product was collected and filtered to remove catalyst, and the solvent was removed using a rotary evaporator to collect 16.0 g of concentrated product. The concentrated product was 65.7 wt % 3,3'-(1,1,3,3-tetramethyldisiloxane-1,3-diyl)bis(propan-1-amine) as assayed using GC-FID.

Examples 2 to 7 showed that reductive amination could be successfully performed using different catalysts under the conditions tested.

Effect of Ammonia Equivalence was studied in the following Examples 8 to 14. Reductive amination reactions were performed in 300 mL and 2 L Autoclave reactors with 5 wt % Rh/C at 90° C.

In this Example 8, 5 g of 3,3'-(1,1,3,3-tetramethyldisiloxane-1,3-diyl)dipropanal prepared as described in Example 1 was loaded in a 300 mL Autoclave reactor with methanol (35.6 g) and 5 wt % Rh/C catalyst (1.5 g). The reactor was sealed and the headspace was inerted with nitrogen. Ammonia (41.5 g, 60 equivalence) was added, and the reactor was pressurized with hydrogen to 600 psig (4136.9 kPa). The reactor was heated to 90° C., and hydrogen was added until pressure was 100 psig (689.5 kPa) higher than reactor pressure at reaction temperature. The reaction pressure was observed to be 810 psig (5584.8 kPa). Reductive amination was carried out at 90° C., 840 RPM for 2 hours. The reactor was cooled and vented. The reaction product was collected and filtered to remove catalyst, and the solvent was removed using a rotary evaporator.

In this Example 9, 10 g of 3,3'-(1,1,3,3-tetramethyldisiloxane-1,3-diyl)dipropanal prepared as described in Example 1 was loaded in a 300 mL Autoclave reactor with methanol (2.5 g) and 5 wt % Rh/C catalyst (2.9 g). The reactor was sealed, and the headspace was inerted with nitrogen. Ammonia (41.5 g, 30 equivalence) was added, and the reactor was pressurized with hydrogen to 680 psig (4688.4 kPa). The reactor was heated to 90° C., and hydrogen was added until pressure was 100 psig (689.5 kPa) higher than reactor pressure at reaction temperature. The reaction pressure was observed to be 980 psig (6756.9 kPa). Reductive amination was carried out at 90° C., 830 RPM for 2 hours. The reactor was cooled and vented. The reaction product was collected and filtered to remove catalyst, and the solvent was removed using a rotary evaporator.

In this Example 10, 120 g of 3,3'-(1,1,3,3-tetramethyldisiloxane-1,3-diyl)dipropanal prepared as described in Example 1 was loaded in a 2 L Autoclave reactor with methanol (120 g) and 5 wt % Rh/C catalyst (18 g). The reactor was sealed, and the headspace was inerted with nitrogen. Ammonia (398 g, 24 equivalence) was added, and the reactor was pressurized with hydrogen to 519 psig (3578.4 kPa). The reactor was heated to 90° C. and hydrogen was added until pressure was 100 psig (689.5 kPa) higher than reactor pressure at reaction temperature. The reaction pressure was observed to be 900 psig (6205.3 kPa). Reductive amination was carried out at 90° C., 810 RPM for 4 hours. The reactor was cooled and vented. The reaction product was collected and filtered to remove catalyst, and the solvent was removed using a rotary evaporator.

Examples 8 to 10 showed that with decreasing $NH_3$ equivalence, GC-FID area % for the desired product, 3,3'-(1,1,3,3-tetramethyldisiloxane-1,3-diyl)bis(propan-1-amine), decreased, whereas that of the dimer side product, (bis(3-(3-(3-aminopropyl)-1,1,3,3-tetramethyldisiloxaneyl)propyl)amine), increased, using a Rh/C hydrogenation catalyst under the conditions tested. These results are shown below in Table 2. The Desired Product in Table 2 refers to 3,3'-(1,1,3,3-tetramethyldisiloxane-1,3-diyl)bis(propan-1-amine).

TABLE 2

Effect of ammonia equivalence on product distribution

| Example | Dialdehyde siloxane A amount (g) | Dialdehyde siloxane A wt % in MeOH | $NH_3$ eq. | Desired Product GC-FID Area % | Dimer side product GC-FID Area % |
|---|---|---|---|---|---|
| Example 8 | 5 | 12 | 60 | 79.8 | 8.0 |
| Example 9 | 10 | 88 | 30 | 67.1 | 12.8 |
| Example 10 | 120 | 50 | 24 | 60.1 | 22.3 |

Reductive amination reactions were also performed with Ni-5256P catalyst at varying ammonia equivalence in 2 L Autoclave reactors at 90° C., as follows.

In this Example 11, 279.8 g of 3,3'-(1,1,3,3-tetramethyldisiloxane-1,3-diyl)dipropanal prepared as described in Example 1 was loaded in the reactor with methanol (279.8 g) and Ni-5256P catalyst (63 g). Reductive amination chemistry was performed with ammonia (386.7 g, 10 equivalence). The reactor was pressurized with hydrogen to 576 psig (3971.4 kPa). The reactor was heated to 90° C., and hydrogen was added until pressure was 100 psig (689.5 kPa) higher than reactor pressure at reaction temperature. The reaction pressure was observed to be 610 psig (4205.8 kPa). Reductive amination was carried out at 90° C., 847 RPM for 16.5 hours. The reactor was cooled and vented. The reaction product was collected and filtered to remove catalyst, and the solvent was removed by a rotary evaporator. The concentrated product was 68.6 wt % 3,3'-(1,1,3,3-tetramethyldisiloxane-1,3-diyl)bis(propan-1-amine) as assayed using GC-FID.

In this Example 12, 186.3 g of 3,3'-(1,1,3,3-tetramethyldisiloxane-1,3-diyl)dipropanal prepared as described in Example 1 was loaded into the reactor with methanol and Ni-5256P catalyst (41.9 g). Reductive amination chemistry was performed with ammonia (514.8 g, 20 equivalence). The reactor was pressurized with hydrogen to 576 psig (3971.4 kPa). The reactor was heated to 90° C., and hydrogen was added until pressure was 100 psig (689.5 kPa) higher than reactor pressure at reaction temperature. The reaction pressure was observed to be 680 psig (4688.4 kPa). Reductive amination was carried out at 90° C., 839 RPM for 17 hours. The reactor was cooled and vented. The reaction product was collected and filtered to remove catalyst, and the solvent was removed by a rotary evaporator. The concentrated product was 68.5 wt % 3,3'-(1,1,3,3-tetramethyldisiloxane-1,3-diyl)bis(propan-1-amine) as assayed using GC-FID.

In this Example 13, 139.6 g of 3,3'-(1,1,3,3-tetramethyldisiloxane-1,3-diyl)dipropanal prepared as described in Example 1 was loaded into the reactor with methanol (139.6 g) and Ni-5256P catalyst (31.4 g). Reductive amination chemistry was performed with ammonia (578.8 g, 30 equivalence). The reactor was pressurized with hydrogen to 562 psig (3874.9 kPa). The reactor was heated to 90° C., and hydrogen was added until pressure was 100 psig (689.5 kPa) higher than reactor pressure at reaction temperature. The reaction pressure was observed to be 820 psig (5653.7 kPa). Reductive amination was carried out at 90° C., 832 RPM for 17 hours. The reactor was cooled and vented. The reaction product was collected and filtered to remove catalyst, and the solvent was removed by a rotary evaporator. The concentrated product was 70.1 wt % 3,3'-(1,1,3,3-tetramethyldisiloxane-1,3-diyl)bis(propan-1-amine) as assayed using GC-FID.

In this Example 14, 111.6 g of 3,3'-(1,1,3,3-tetramethyldisiloxane-1,3-diyl)dipropanal prepared as described in Example 1 was loaded with methanol (111.6 g) and Ni-5256P catalyst (25.11 g). Reductive amination chemistry was performed with ammonia (616.9 g, 40 equivalence). The reactor was pressurized with hydrogen to 550 psig (3792.1 kPa). The reactor was heated to 90° C., and hydrogen was added until pressure was 100 psig (689.5 kPa) higher than reactor pressure at reaction temperature. The reaction pressure was observed to be 920 psig (6343.2 kPa). Reductive amination was carried out at 90° C., 815 RPM for 17.5 hours. The reactor was cooled and vented. The reaction product was collected and filtered to remove catalyst, and the solvent was removed by a rotary evaporator. The concentrated product was 69.6 wt % 3,3'-(1,1,3,3-tetramethyldisiloxane-1,3-diyl)bis(propan-1-amine) as assayed using GC-FID. Examples 11 to 14 showed that little difference selectivity to 3,3'-(1,1,3,3-tetramethyldisiloxane-1,3-diyl)bis(propan-1-amine) was observed when varying the equivalence of ammonia using the Ni catalyst under the conditions tested. Good selectivity was obtained across a broad range of ammonia concentrations.

In this Example 15, 13 g of 3,3'-(1,1,3,3-tetramethyldisiloxane-1,3-diyl)dipropanal prepared as described in Example 1 was loaded in a 300 mL Autoclave reactor with methanol (52 g) and Ni-5256P catalyst (2.0 g). The reactor was sealed, and the headspace was inerted with nitrogen. Ammonia (53.9 g, 30 equivalence) was added, and the reactor was pressurized with hydrogen to 554 psig (3819.7 kPa). The reactor was heated to 90° C., and hydrogen was added until pressure was 100 psig (689.5 kPa) higher than reactor pressure at reaction temperature. The reaction pressure was observed to be 724 psig (4991.8 kPa). Reductive amination was carried out at 90° C., 828 RPM for 4 hours. The reactor was cooled and vented. The reaction product was collected and filtered to remove catalyst, and the solvent was removed using a rotary evaporator to collect 12.8 g of concentrated product. The concentrated product was 70.3 wt % 3,3'-(1,1,3,3-tetramethyldisiloxane-1,3-diyl)bis(propan-1-amine) as assayed using GC-FID.

In this Example 16, 140 g of 3,3'-(1,1,3,3-tetramethyldisiloxane-1,3-diyl)dipropanal prepared as described in Example 1 was loaded in a 2 L Autoclave reactor with methanol (140 g) and Ni-5256P catalyst (21.0 g, BASF). The reactor was sealed, and the headspace was inerted with nitrogen. Ammonia (580.5 g, 30 equivalence) was added, and the reactor was pressurized with hydrogen to 648 psig (4467.8 kPa). The reactor was heated to 90° C., and hydrogen was added until pressure was 100 psig (689.5 kPa) higher than reactor pressure at reaction temperature. The reaction pressure was observed to be 845 psig (5826.1 kPa). Reductive amination was carried out at 90° C., 820 RPM for 4 hours. The reactor was cooled and vented. The reaction product was collected and filtered to remove catalyst, and the solvent was removed using a rotary evaporator to collect 131.3 g of concentrated product. The concentrated product was 69.8 wt % 3,3'-(1,1,3,3-tetramethyldisiloxane-1,3-diyl) bis(propan-1-amine) as assayed using GC-FID.

In this Example 17, 19 g of 3,3'-(1,1,3,3-tetramethyldisiloxane-1,3-diyl)dipropanal prepared as described in Example 1 was loaded in a 300 mL Autoclave reactor with methanol (4.8 g) and Ni-5256P (2.9 g). The reactor was sealed and the headspace was inerted with nitrogen. Ammonia (78.8 g, 30 equivalence) was added, and the reactor was pressurized with hydrogen to 566 psig (3902.4 kPa). The reactor was heated to 90° C., and hydrogen was added until pressure was 100 psig (689.5 kPa) higher than reactor pressure at reaction temperature. The reaction pressure was observed to be 970 psig (6687.9 kPa). Reductive amination was carried out at 90° C., 823 RPM for 4 hours. The reactor was cooled and vented. The reaction product was collected and filtered to remove catalyst, and the solvent was removed using a rotary evaporator to collect 19.4 g of concentrated product. The concentrated product was 64.0 wt % 3,3'-(1,1,3,3-tetramethyldisiloxane-1,3-diyl)bis(propan-1-amine) as assayed using GC-FID.

Examples 15 to 17 were performed varying the amount of solvent. A high amount of the desired product, 3,3'-(1,1,3,3-tetramethyldisiloxane-1,3-diyl)bis(propan-1-amine), formed in each example. However, Examples 16 to 18 showed that a higher proportion of methanol solvent (in Examples 15 and 16) resulted in somewhat better selectivity to 3,3'-(1,1,3,3-tetramethyldisiloxane-1,3-diyl)bis(propan-1-amine) than a lower proportion of solvent (in Example 17), under the conditions tested.

In this Example 18, Example 17 was repeated with the same results.

In this Example 19, 19 g of 3,3'-(1,1,3,3-tetramethyldisiloxane-1,3-diyl)dipropanal prepared as described in Example 1 was loaded in a 300 mL Autoclave reactor with methanol (4.8 g) and Ni-5256P (2.9 g). The reactor was sealed, and the headspace was inerted with nitrogen. Ammonia (78.8 g, 30 equivalence) was added, and the reactor was pressurized with hydrogen to 660 psig (4550.5 kPa). The reactor was heated to 120° C., and hydrogen was added until pressure was 100 psig (689.5 kPa) higher than reactor pressure at reaction temperature. The reaction pressure was observed to be 1200 psig (8273.7 kPa). Reductive amination was carried out at 120° C., 822 RPM for 4 hours. The reactor was cooled and vented. The reaction product was collected and filtered to remove catalyst, and the solvent was removed using a rotary evaporator to collect 18.7 g of concentrated product. The concentrated product was 66.7 wt % 3,3'-(1,1,3,3-tetramethyldisiloxane-1,3-diyl)bis(propan-1-amine) as assayed using GC-FID.

Varying reaction temperature was studied in Examples 18 and 19. These examples showed that varying reaction temperature from 90 to 120° C. had little effect on selectivity; both samples had good selectivity to 3,3'-(1,1,3,3-tetramethyldisiloxane-1,3-diyl)bis(propan-1-amine) under the conditions tested.

Reductive amination experiments with 5 wt % Rh/C were designed to screen solvents in a 2 L Autoclave reactor equipped with a cooling coil. All experiments were performed at 90° C. with 3,3'-(1,1,3,3-tetramethyldisiloxane-1,3-diyl)dipropanal prepared as described in Example 1 (dialdehyde) and solvent in amounts to provide a 1:1 mass ratio of dialdehyde and solvent. The crude product was collected after reactor cool down and venting ammonia and hydrogen, and the solvent was stripped using a rotary evaporator. The product masses are listed in Table 3. Each of these products was purified using a Vigreux distillation step to obtain a main cut containing 3,3'-(1,1,3,3-tetramethyldisiloxane-1,3-diyl)bis(propan-1-amine).

TABLE 3

Experimental details of solvent screen for reductive amination over Rh/C

| Example | Dialdehyde amount (g) | Solvent | $NH_3$ eq. | Catalyst:Alde. mass ratio | Product mass post solvent stripping (g) |
|---|---|---|---|---|---|
| 20 | 120 | MeOH | 24 | 0.15 | 116.0 |
| 21 | 120 | Toluene | 24 | 0.15 | 110.9 |
| 22 | 120 | Heptane | 24 | 0.15 | 102.2 |

A 12" Vigreux fractionating distillation setup was used to separate the lights and bottoms cut and obtain the main 3,3'-(1,1,3,3-tetramethyldisiloxane-1,3-diyl)bis(propan-1-amine) cut from each of these products in Examples 20-22. For Example 20, the 116.0 g product was loaded in the reboiler (250 mL, three-necked round bottom flask). The reboiler temperature was set up to 150° C. and <1 torr (<0.13 kPa) vacuum was applied to the setup. The cuts-lights (1.2 g), main (41.1 g), and bottoms (65.5 g) were obtained from distillation. Similar results were obtained for the distillation of other two products. GC-FID analyses on the main cuts showed 3,3'-(1,1,3,3-tetramethyldisiloxane-1,3-diyl)bis (propan-1-amine) with 95 area %.

The combined main cuts from these three distillations (126.8 g) was further purified using packed column distillation. A 1" internal diameter, 20" long vacuum-jacketed column was filled with 0.16" Pro-Pak random packing. The reflux splitter and condenser were mounted atop the packed column. The reboiler (250 mL, three-necked round bottom flask) was heated up to 140° C. and condenser maintained at 22° C. Reflux ratio was set at 5:1 and vacuum was applied to <5 torr (<0.67 kPa). High purity 3,3'-(1,1,3,3-tetramethyldisiloxane-1,3-diyl)bis(propan-1-amine) (91.8 g, 99.4 GC-FID area %) was collected at overhead temperature of 117° C. and a pressure of ~3 Torr (0.4 kPa).

Three reactions (Example 23, 24, and 25 were carried out in a 2 L Autoclave reactor. In each, 140 g of 3,3'-(1,1,3,3-tetramethyldisiloxane-1,3-diyl)dipropanal prepared as described in Example 1 was loaded with methanol (140 g) and Ni-5256P (31.5 g). Reductive amination reaction was performed with ammonia (580.5 g, 30 equivalence). The reactor was pressurized with hydrogen to 600 psig (4136.9 kPa). The reactor was heated to 90° C., and hydrogen was added until pressure was 100 psig (689.5 kPa) higher than reactor pressure at reaction temperature. The reaction pressure was observed to be 1000 psig (6894.8 kPa). The reaction was run for 3 hours at 90° C. Ammonia was vented off after the reactor cooled down to room temperature. The reactor was then pressurized with 800 psig (5515.8 kPa) hydrogen and hydrogenation was carried at 110° C. The reactor was cooled and vented. The reaction product was collected and filtered to remove catalyst, and the solvent was removed using a rotary evaporator. GC-FID analyses on the concentrated products showed an average of 63 wt % 3,3'-(1,1,3,3-tetramethyldisiloxane-1,3-diyl)bis(propan-1-amine) purity. Two replicate reactions were performed. The concentrated products from these three reactions were combined and purified using short path distillation.

A typical short path distillation setup was employed to separate the lights and heavies cut and obtain the main 3,3'-(1,1,3,3-tetramethyldisiloxane-1,3-diyl)bis(propan-1-amine) cut. A total of 379 g of concentrated product from these three reactions was fed to the reboiler (500 mL, three-necked round bottom flask). The reboiler was set to 150° C. and maintained at <1 torr (<0.13 kPa) vacuum. A 10.5 g lights cut was collected before switching to a new distillate receiver for main cut. The main cut (259 g) was analyzed using GC-FID and showed 90.3 wt % 3,3'-(1,1,3,3-tetramethyldisiloxane-1,3-diyl)bis(propan-1-amine) purity. The bottoms cut (94.4 g) contained high boilers and leached Ni catalyst.

The main cut (259 g) from short path distillation was the feed to the reboiler (500 mL, three-necked round bottom flask) for packed column distillation. A 1" internal diameter, 20" long vacuum-jacketed column was filled with 0.16" Pro-Pak random packing. A multi-receiver system was used to collect several lights cuts. The process conditions for packed column distillation were: heating mantle supplied with constant power of 85 W, vacuum <1 torr (<0.13 kPa), reflux ratio-5:1. A 102 g sample of 99.6 wt % pure 3,3'-(1,1,3,3-tetramethyldisiloxane-1,3-diyl)bis(propan-1-amine) (GC-FID assay) was obtained from this distillation.

In this Example 26, a bis(propylaldehyde-terminated) polydimethylsiloxane with a DP of 560 and formula

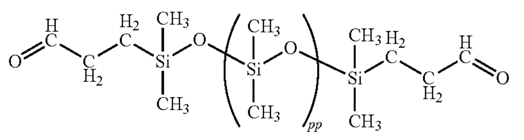

where subscript pp represents the average number of difunctional siloxane units per molecule and has a value of 558, was prepared as follows. In a nitrogen filled glovebox, $Rh(acac)(CO)_2$ (90.6 mg, 0.350 mmol), Ligand 1 (550 mg, 0.656 mmol) and toluene (51.43 g, 558 mmol) were added into a 120 mL glass bottle with a magnetic stir bar. The mixture was stirred on a stir plate until a homogeneous solution formed. A portion of this solution (1.45 g) was transferred to an air-tight syringe with a metal valve and subsequently removed from the glove box. In a ventilated fume hood, Bis-dimethylvinylsiloxy-terminated polydimethylsiloxane with an average of 558 dimethylsiloxy (D) units per molecule ($M^{Vi}{}_2D_{558}$,) (195.3 g, 4.68 mmol) was loaded to a 300-mL Parr-reactor. The reactor was sealed and loaded into the holder. The reactor was pressurized with nitrogen up to 100 psi (689.5 kPa) via the dip-tube and was carefully relieved through a valve connected to the headspace for three times. The reactor was then pressure tested by pressurizing to 300 psi (2068.4 kPa) with nitrogen. After the pressure was released, the catalyst solution was added to the reactor via the sample loading port. The reactor was pressurized with syngas to 100 psi (689.5 kPa) and then released for three times prior to being pressurized 80 psi (551.6 kPa) via the dip-tube. Reaction temperature was set to 90° C. Agitation rate was set to 600 RPM. The intermediate cylinder containing syngas and the reactor were connected when the desired temperature was reached. The pressure was set to 100 psi (689.5 kPa). The reaction progress was monitored by a data logger which measured the pressure in the 300 ml intermediate cylinder as it supplied syngas to the reactor via a pressure reducing regulator. The reaction was run for four hours. The resulting product contained bis(propylaldehyde-terminated) polydimethylsiloxane with a DP of 560. The product was characterized by $^1H$ and $^{29}Si$ NMR.

In this Example 27, a bis(3-aminopropyl)-terminated poly (dimethylsiloxane) with a DP of 560 of formula:

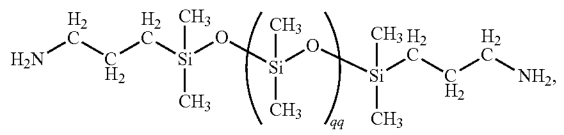

where subscript qq was 558 was prepared as follows. To a 300 mL Autoclave reactor was loaded terminal dipropionaldehyde siloxane, (Poly[oxy(dimethylsilylene)], α-[dimethyl (3-oxopropyl)silyl]-ω-[[dimethyl(3-oxopropyl)silyl]oxy] or $(C_2H_6OSi)_nC_{10}H_{22}O_3Si_2$ where n=560) prepared as described in Example 26 (90.0 g), toluene (63.7 g), and 5 wt % Rh/C (4.5 g). The reactor was sealed, and the headspace was inerted with nitrogen. The mixture was agitated at 800 rpm and ammonia (9.2 g) was added and the mixture stirred for 30 minutes. The reactor was pressurized to 250 psig (1723.7 kPa) with hydrogen and heated to 60° C. The reactor pressure was 340 psig (2344.2 kPa). The pressure of the reactor was increased to 716 psig (4936.7 kPa) with hydrogen, and the reaction was run for 4 hours with continuous hydrogen addition. The reactor was cooled and vented. The reaction product was collected and filtered to remove catalyst, and the solvent was removed by rotary evaporator to collect 83.9 g of product. The product was characterized by $^{29}Si$ analysis, GPC, and viscosity. The octamethylcyclotetrasiloxane content was measured by GC analysis.

In this Example 28, a dipropionaldehyde siloxane of formula

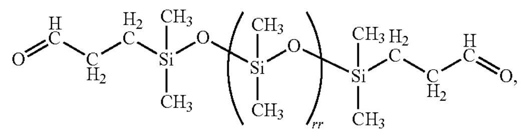

where subscript rr represents average number of difunctional siloxane units per molecule and has a value of 328, (Poly [oxy(dimethylsilylene)], α-[dimethyl(3-oxopropyl)silyl]-ω-[[dimethyl(3-oxopropyl)silyl]oxy] or $(C_2H_6OSi)_nC_{10}H_{22}O_3Si_2$ where n=328) was prepared as follows. In a nitrogen filled glovebox, $Rh(acac)(CO)_2$ (90.6 mg, 0.350 mmol), Ligand 1 (550 mg, 0.656 mmol) and toluene (51.43 g, 558 mmol) were added into a 120 mL glass bottle with a magnetic stir bar. The mixture was stirred on a stir plate until a homogeneous solution formed. A portion of this solution (1.5 g) was transferred to an air-tight syringe with a metal valve and subsequently removed from the glove box. In a ventilated fume hood, Bis-dimethylvinylsiloxy-terminated polydimethylsiloxane with an average of 328 dimethylsiloxy(D) units per molecule ($M^{Vi}{}_2D_{328}$) (196 g, 7.95 mmol) was loaded to a 300-mL Parr-reactor. The reactor was sealed and loaded into the holder. The reactor was pressurized with nitrogen up to 100 psi (689.5 kPa) via the dip-tube and was carefully relieved through a valve connected to the headspace for three times. The reactor was then pressure tested by pressurizing to 300 psi (2068.4 kPa) with nitrogen. After the pressure was released, the catalyst solution was added to the reactor via the sample loading port. The reactor was pressurized with syngas to 100 psi (689.5 kPa) and then released for three times prior to being pressurized 80 psi (551.6 kPa) via the dip-tube. Reaction temperature was set to 90° C. Agitation rate was set to 600 RPM. The intermediate cylinder containing syngas and the reactor were connected when the desired temperature was reached. The pressure was set to 100 psi (689.5 kPa). The reaction progress was monitored by a data logger which measured the pressure in the 300 ml intermediate cylinder as it supplied syngas to the reactor via a pressure reducing regulator. The reaction was run for four hours. The resulting product contained bis(propylaldehyde-terminated) polydimethylsiloxane with a DP of 330. The product was characterized by $^{1}H$ and $^{29}Si$ NMR.

In this Example 29, a bis(3-aminopropyl)-terminated poly (dimethylsiloxane) Poly[oxy(dimethylsilylene)], α-[(3-aminopropyl)dimethylsilyl]-ω-[[(3-aminopropyl)dimethylsilyl] oxy] or $(C_2H_6OSi)_nC_{10}H_{28}N_2OSi_2$ where n=approximately 330 of formula

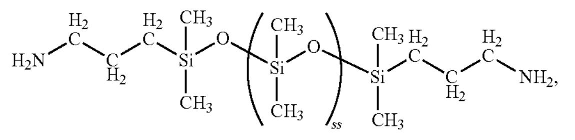

where subscript ss represents average number of difunctional siloxane units per molecule and has a value of 328, was prepared as follows. To a 300 mL Autoclave reactor was loaded 90.6 g of the dipropionaldehyde siloxane prepared as described in Example 28, toluene (60.3 g), and 5 wt % Rh/C (4.5 g). The reactor was sealed, and the headspace was inerted with nitrogen. The mixture was agitated at 800 rpm and ammonia (14.9 g) was added, and the mixture stirred for 30 minutes. The reactor was pressurized to 233 psig (1606.5 kPa) with hydrogen and heated to 60° C. The reactor pressure was 317 psig (2185.6 kPa). The pressure of the reactor was increased to 728 psig (5019.4 kPa) with hydrogen, and the reaction was run for 4 hours with continuous hydrogen addition. The reactor was cooled and vented. The reaction product was collected and filtered to remove catalyst, and the solvent was removed by a rotary evaporator to collect 83.4 g of product. The product was characterized by $^{29}Si$ NMR analysis, GPC, and viscosity. The octamethylcyclotetrasiloxane content was measured by GC analysis.

In this Example 30, 3-(1,1,1,3,5,5,5-heptamethyltrisiloxan-3-yl)propanal was prepared as follows. In a nitrogen filled glovebox, $Rh(acac)(CO)_2$ (13.6 mg, 0.0525 mmol), Ligand 1 (84.5 mg, 0.101 mmol) and toluene (10.0 g, 108.5 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, vinylmethylbis(trimethylsiloxy)silane ($MD^{Vi}M$) (1000 g, 4.02 mol) was loaded to a 2-L Autoclave-reactor. The reactor was sealed and loaded into the holder. The reactor was pressurized with nitrogen up to 100 psi (689.5 kPa) via the dip-tube and was carefully relieved through a valve connected to the headspace for three times. The reactor was then pressure tested by pressurizing to 300 psi (2068.4 kPa) with nitrogen. After the pressure was released, the catalyst solution was added to the reactor via the sample loading port. The reactor was pressurized with syngas to 100 psi (689.5 kPa) and then released for three times prior to being pressurized 80 psi (551.6 kPa) via the dip-tube. Reaction temperature was set to 75° C. Agitation rate was set to 800 RPM The intermediate cylinder containing syngas and the reactor were connected when the desired temperature was reached. The pressure was set to 100 psi (689.5 kPa). The reaction progress was monitored by a data logger which measured the pressure in the intermediate cylinder as it supplied syngas to the reactor via a pressure reducing regulator. The resulting product contained 3-(1,1,1,3,5,5,5-heptamethyltrisiloxan-3-yl)propanal ($MD^{Pr\text{-}ald}M$). A portion of the crude 3-(1,1,1,3,5,5,5-heptamethyltrisiloxan-3-yl)propanal ($MD^{Pr\text{-}ald}M$) was purified by vacuum distillation. A vacuum distillation set-up was equipped with a 12 inch (30.48 cm) Vigreux column connected to a 500 3-neck round bottom flask equipped with a PTFE coated magnetic stir bar, an electric heating mantle controlled by a J-CHEM™ controller on the internal temperature measured with a thermoprobe and a 250 mL pre-tared collection flask. A vacuum manifold was connected to the system which included a vacuum gauge and a nitrogen line to adjust the pressure and break vacuum. Water cooling was used on the distillate condenser and a dry-ice trap was in place between the distillation system and the diaphragm vacuum pump to trap lower boiling components. A thermometer was in place to measure the temperature of the overhead vapors. A distillation was conducted by loading crude 3-(1,1,1,3,5,5,5-heptamethyltrisiloxan-3-yl)propanal ($MD^{Pr\text{-}ald}M$) (341.5 g) to the 500 mL reboiler. The distillation was conducted at 2 torr (266.6 Pa) pressure. A lights cut (13 g) was collected at a pot temperature of 76° C. and an overhead temperature of 66° C. The main fraction containing purified 3-(1,1,1,3,5,5,5-heptamethyltrisiloxan-3-yl)propanal ($MD^{Pr\text{-}ald}M$) (243 g) was collected at a pot temperature of 80-85° C. and an overhead temperature of 67-69° C. Bottoms material of 55 g was also recovered.

In this Example 31, N-(3-(1,1,1,3,5,5,5-heptamethyltrisiloxan-3-yl)propyl) butan-1-amine was synthesized as follows. To a 300 mL Autoclave reactor was loaded 12.0 g 3-(1,1,1,3,5,5,5-heptamethyltrisiloxan-3-yl)propanal prepared as described in Example 30, toluene (48.5 g), n-butylamine (3.8 g) and 5 wt % Rh/C (1.4 g). The reactor was sealed, and the headspace was inerted with nitrogen. The mixture was agitated at 800 rpm for 5 minutes. The reactor was pressurized to 463 psig (3192.3 kPa) with hydrogen and heated to 60° C. The reactor pressure was 452 psig (3116.4 kPa). The pressure of the reactor was increased to 651 psig (4488.5 kPa) with hydrogen, and the reaction was run for 4 hours with continuous hydrogen addition. The reactor was cooled and vented. The reaction product was collected, and the reactor was rinsed with toluene to collect 75.2 g of material. A portion of the material was filtered through a syringe filter, stripped of solvent, and characterized by gas chromatography and by $^{1}H$ and $^{13}C$ NMR analysis, which confirmed the presence of N-(3-(1,1,1,3,5,5,5-heptamethyltrisiloxan-3-yl)propyl) butan-1-amine.

In this Example 32, 3-(1,1,1,3,5,5,5-heptamethyltrisiloxan-3-yl) propan-1-amine and N-(3-(1,1,1,3,5,5,5-heptamethyltrisiloxan-3-yl)propyl) butan-1-amine was synthesized as follows. To a 300 mL Autoclave reactor was loaded 11.7 g of 3-(1,1,1,3,5,5,5-heptamethyltrisiloxan-3-yl)propanal prepared as described in Example 30, toluene (48.4 g), n-butylamine (3.9 g, 1.25 eq) and 5 wt % Rh/C (1.2 g). The reactor was sealed, and the headspace was inerted with nitrogen. To the mixture was added ammonia (18.3 g, 25 eq.), and the reactor pressure was 114 psig (786 kPa). The mixture was agitated at 800 rpm for 7 minutes. To the reactor was loaded hydrogen to 480 psig (3309.5 kPa), and the hydrogen addition was stopped. The reactor was heated to 60° C. at which point the reaction pressure was 580 psig (3999 kPa). The pressure of the reactor was increased to 798 psig (5502 kPa) with hydrogen, and the reaction was run for 4 hours with continuous hydrogen addition. The reactor was cooled and vented. The reaction product was collected, and the reactor was rinsed with toluene to collect 109.6 g of liquid. A portion of the liquid was filtered through a syringe filter, stripped of solvent, and characterized gas chromatography and by $^{1}H$ and $^{13}C$ NMR analysis, which showed: 67.4 GC/FID area % 3-(1,1,1,3,5,5,5-heptamethyltrisiloxan-3-yl) propan-1-amine 18.6 GC/FID area % N-(3-(1,1,1,3,5,5,5-heptamethyltrisiloxan-3-yl)propyl) butan-1-amine.

In this Example 33, 3-(1,1,1,3,5,5,5-heptamethyltrisiloxan-3-yl) propan-1-amine was synthesized as follows. To a 300 mL Autoclave reactor was loaded 3-(1,1,1,3,5,5,5-heptamethyltrisiloxan-3-yl)propanal (12.1 g), toluene (48.4 g), and 5 wt % Rh/C (1.3 g). The reactor was sealed, and the headspace was inerted with nitrogen. Agitation at 800 rpm was started, and to the mixture was added ammonia (19.9 g, 26.9 eq.) and the reactor pressure was 117 psig (806.7 kPa). To the reaction was loaded hydrogen to 444 psig (3061.3 kPa), and the hydrogen addition valve closed. The reactor was heated to 60° C. at which point the reaction pressure was 610 psig (4205.8 kPa). The reactor was pressurized to 463 psig (3192.3 kPa) with hydrogen and heated to 60° C. The pressure of the reactor was increased to 816 psig (5626.1 kPa) with hydrogen, and the reaction was run for 4.5 hours with continuous hydrogen addition. The reactor was cooled and vented. The reaction product was collected to yield 60.6 g of liquid. A portion of the liquid was filtered through a syringe filter, stripped of solvent, and characterized gas chromatography and by $^{1}H$ and $^{13}C$ NMR and GC/FID analysis confirmed the presence of 3-(1,1,1,3,5,5,5-heptamethyltrisiloxan-3-yl) propan-1-amine in the reaction product.

In this Example 34, N-(3-(1,1,1,3,5,5,5-heptamethyltrisiloxan-3-yl)propyl)-58,61-dimethyl-2,5,8,11,14,17,20,23,26,29,32,35,38,41,44,47,50,53,56,59,62-henicosaoxapentahexacontan-64-amine (MDM-M1000) was prepared as follows. To a 300 mL Autoclave reactor was loaded 3-(1,1,1,3,5,5,5-heptamethyltrisiloxan-3-yl)propanal (21.1 g), isopropanol (41.4 g), Jeffamine™ M1000 (77.1 g), and 5 wt % Rh/C (1.0 g). The reactor was sealed, and the headspace was inerted with nitrogen. The mixture was agitated at 900 rpm, and the reactor was pressurized to 105 psig (724 kPa) with hydrogen and heated to 60° C. Hydrogen was fed to a reactor pressure of 315 psig (2171.9 kPa), and the reaction was run for 4 hours with continuous hydrogen addition. The reactor was cooled and sampled. Additional 5 wt % Rh/C catalyst (1.0 g) was added, and the reaction was continued 4 hours at 60° C. and 315 psig (2171.9 kPa) hydrogen pressure. The reactor was cooled and vented. The reaction product was filtered to remove catalyst, and the solvent was removed under vacuum using a rotary evaporator to obtain 82.6 g of product. The product was analyzed $^{1}H$, $^{29}Si$, and $^{13}C$ NMR analysis.

In this Example 35, N-(3-(1,1,1,3,5,5,5-heptamethyltrisiloxan-3-yl)propyl)-7,10,13,16,19,22,25,28-octamethyl-2,5,8,11,14,17,20,23,26,29-decaoxadotriacontan-31-amine (MDM-M600) was prepared as follows. To a 300 mL Autoclave reactor was loaded 3-(1,1,1,3,5,5,5-heptamethyltrisiloxan-3-yl)propanal (25.0 g), isopropanol (50.0 g), Jeffamine™ M600 (54.7 g) and 5 wt % Rh/C (1.3 g). The reactor was sealed, and the headspace was inerted with nitrogen. The mixture was agitated at 900 rpm for 10 minutes, and the reactor was pressurized to 102 psig (703.3 kPa) with hydrogen and heated to 60° C. Hydrogen was fed to a reactor pressure of 309 psig (2130.5 kPa) and the reaction was run for 4 hours with continuous hydrogen addition. The reaction mixture was cooled and vented. The reaction product was filtered to remove catalyst and the solvent was removed under vacuum using a rotary evaporator to obtain 67.9 g of product. The product was analyzed $^{1}H$, $^{29}Si$, and $^{13}C$ NMR analysis.

In this Example 36, 3,3'-(1,1,3,3,5,5,7,7,9,9,11,11,13,13,15,15,17,17-octadecamethylnonasiloxane-1,17-diyl)dipropanal ($M^{Pr-ald}D_7M^{Pr-ald}$) was prepared as follows. In a nitrogen filled glovebox, $Rh(acac)(CO)_2$ (9.3 mg, 0.0359 mmol), Ligand 1 (58.1 mg, 0.069 mmol) and heptane (10.0 g, 99.8 mmol) were added into a 30 mL glass vial with a magnetic stir bar. The mixture was stirred on a stir plate until a homogeneous solution formed. This solution was transferred to an air-tight syringe with a metal valve and subsequently removed from the glove box. In a ventilated fume hood, 3,3'-(1,1,3,3,5,5,7,7,9,9,11,11,13,13,15,15,17,17-octadecamethylnonasiloxane-1,17-diyl)divinyl ($M^{Vi}D_7M^{Vi}$) (700 g, 1.027 mol) was loaded to a 2-L Autoclave-reactor. The reactor was sealed and loaded into the holder. The reactor was pressurized with nitrogen up to 100 psi (689.5 kPa) via the dip-tube and was carefully relieved through a valve connected to the headspace for three times. The reactor was then pressure tested by pressurizing to 300 psi (2068.4 kPa) with nitrogen. After the pressure was released, the catalyst solution was added to the reactor via the sample loading port. The reactor was pressurized with syngas to 100 psi (689.5 kPa) and then released for three times prior to being pressurized 80 psi (551.6 kPa) via the dip-tube. Reaction temperature was set to 70° C. Agitation rate was set to 800 RPM The intermediate cylinder containing syngas and the reactor were connected when the desired temperature was reached. The pressure was set to 100 psi (689.5 kPa). The reaction progress was monitored by a data logger which measured the pressure in the intermediate cylinder as it supplied syngas to the reactor via a pressure reducing regulator. The resulting product contained 3,3'-(1,1,3,3,5,5,7,7,9,9,11,11,13,13,15,15,17,17-octadecamethylnonasiloxane-1,17-diyl)dipropanal ($M^{Pr-ald}D_7M^{Pr-ald}$).

In this Example 37, N,N'-((1,1,3,3,5,5,7,7,9,9,11,11,13,13,15,15,17,17-octadecamethylnonasiloxane-1,17-diyl)bis(propane-3,1-diyl))bis(58,61-dimethyl-2,5,8,11,14,17,20,23,26,29,32,35,38,41,44,47,50,53,56,59,62-henicosaoxapentahexacontan-64-amine) was prepared as follows. To a 300 mL Autoclave reactor was loaded 29.9 g of 3,3'-(1,1,3,3,5,5,7,7,9,9,11,11,13,13,15,15,17,17-octadecamethylnonasiloxane-1,17-diyl)dipropanal ($M^{Pr-ald}D_7M^{Pr-ald}$), isopropanol (54.9 g), Jeffamine™ M1000 (79.8 g) and 5 wt % Rh/C (3.3 g). The reactor was sealed, and the headspace was inerted with nitrogen. The mixture was agitated at 900 rpm and the reactor was pressurized to 113 psig (779.1 kPa) with hydrogen and heated to 60° C. Additional hydrogen was fed to a reactor to reach a pressure of 315 psig (2171.9 kPa), and the reaction was run for 5 hours with continuous hydrogen addition. The hydrogen pressure was increased to 400 psig (2757.9 kPa), and the reaction was continued 23 hours. The reaction mixture was cooled, and the reactor was vented. The reaction product was filtered to remove catalyst, and the solvent was removed under vacuum using a rotary evaporator to obtain 94.4 g of product. The product was analyzed $^{1}H$, $^{29}Si$, and $^{13}C$ NMR analysis.

In this Example 38, a bis(3-aminopropyl)-terminated poly (dimethylsiloxane) with a DP of 560 of formula:

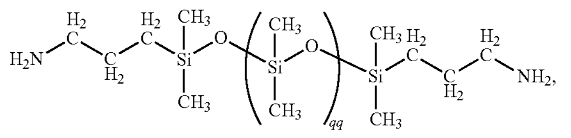

where subscript qq was 558 was prepared as follows. To a glass vessel was loaded terminal dipropionaldehyde siloxane, (Poly[oxy(dimethylsilylene)], α-[dimethyl(3-oxopropyl)silyl]-ω-[[dimethyl(3-oxopropyl)silyl]oxy] or $(C_2H_6OSi)_nC_{10}H_{22}O_3Si_2$ where n=558) prepared as described in Example 26 (70.0 g) and toluene (71.0 g) to form a solution. To this solution was loaded n-butylamine (0.51 g, 2.1 eq.) and mixed thoroughly. The mixture became cloudy. $MgSO_4$ (3.0 g) was added and mixed, and the mixture was held for 16 hours. The mixture was filtered to remove $MgSO_4$ and provide 140 g of clear liquid. The liquid was analyzed by $^1H$ NMR to confirm the presence of the butyl imine.

To a 300 mL Autoclave reactor was loaded terminal diimine siloxane, (Poly[oxy(dimethylsilylene)], α-[dimethyl (3-(butylimino)propylsilyl]-ω-[[dimethyl(3-(butylimino) propylsilyl]oxy] or $(C_2H_6OSi)_nC_{18}H_{40}O_3N_2Si_2$ where n=558) solution prepared in this Example 38 (140 g) and 5 wt % Rh/C (3.5 g). The reactor was sealed, and the headspace was inerted with nitrogen. The mixture was agitated at 800 rpm and ammonia (7.1 g) was added and the mixture stirred for 13 minutes. The reactor was pressurized to 259 psig (1785.7 kPa) with hydrogen and heated to 60° C. The reactor pressure was 290 psig (1999.5 kPa). The pressure of the reactor was increased to 790 psig (5446.9 kPa) with hydrogen, and the reaction was run for 4 hours with continuous hydrogen addition. The reactor was cooled and vented. The reaction product was collected and filtered to remove catalyst, and the solvent was removed by rotary evaporator to collect 70.7 g of product. The product was characterized by $^{29}Si$ and $^1H$ NMR analysis.

In this Example 39, (Poly[oxy(dimethylsilylene)], α-[dimethyl(3-oxopropyl)silyl]-ω-[[dimethyl(3-oxopropyl)silyl] oxy] with DP of 203, or $(C_2H_6OSi)_nC_{10}H_{22}O_3Si_2$ where n=201, was prepared by hydroformylation reaction of bis-vinyl-terminated polydimethylsiloxane with DP of 203, using a procedure as described above.

In this Example 40, siloxane with a DP of 203 of formula:

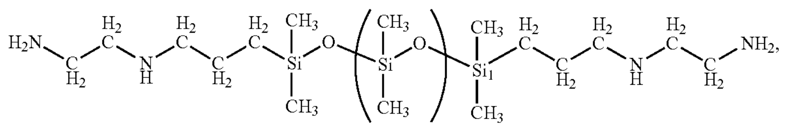

where subscript qq was 201 was prepared as follows. In a nitrogen glovebox, 5.000 g of the (Poly[oxy(dimethylsilylene)], α-[dimethyl(3-oxopropyl)silyl]-ω-[[dimethyl(3-oxopropyl)silyl]oxy] or $(C_2H_6OSi)_nC_{10}H_{22}O_3Si_2$ where n=201 from Example 39, 88 μL of ethylene diamine (Sigma Aldrich), 0.2508 g of 5% Rh/C (Sigma Aldrich), and 18.723 g of 2-propanol (anhydrous; Sigma Aldrich) were added to a 60 mL wide mouth vial. The vial was inverted and shaken until visibly homogeneous, then transported to a fume hood where the viscous slurry was dumped into a 100 mL Parr reactor bottom. Once the reactor was sealed and all connections made, nitrogen was used to inert the reactor and conduct a leak check at 550 psig (3792.1 kPa). The reactor was determined to be leak free and the reactor was heated to 90° C.; temperature was achieved within ten minutes. Hydrogen was added 30 minutes after the start of heating/stirring. A stable reactor pressure of 30 psig (206.8 kPa) was noted and the hydrogen mass flow controller was set to maintain 430 psig (400 psig $H_2$) (2964.8 kPa, (2757.9 kPa $H_2$)). The reactor maintained stirring and heating for a period of 2 hours before cooling and venting. After cooling the reactor and purging the headspace with nitrogen, the reactor was opened in the fume hood, and 21.13 g of reaction material was collected in a glass vial. The collected material was filtered through a 2 inch (5.08 cm) plug of powdered Celite to remove the catalyst and the vial/column were rinsed twice with ~12 mL of propanol. An aliquot of filtered material was concentrated for preliminary proton, carbon and silicon NMR analysis. The rest was later concentrated and placed under high vacuum to remove residual propanol, stirring slowly while being heated to 60° C. After a day under vacuum the sample weighed 2.4082 g, though NMR analysis indicated the presence of the siloxane with DP of 203 shown above and some residual propanol.

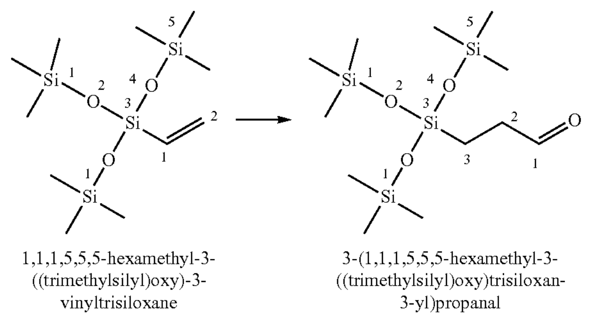

1,1,1,5,5,5-hexamethyl-3-((trimethylsilyl)oxy)-3-vinyltrisiloxane 3-(1,1,1,5,5,5-hexamethyl-3-((trimethylsilyl)oxy)trisiloxan-3-yl)propanal In this Example 41, 3-(1,1,1,5,5,5-hexamethyl-3-((trimethylsilyl)oxy)trisiloxan-3-yl)propanal of formula (above) was synthesized as follows. In a nitrogen filled glovebox, $Rh(acac)(CO)_2$ (31.6 mg), Ligand 1 (165.2 mg) and toluene (40.02 g) were combined to form a homogeneous solution. A portion of this catalyst solution (2.88 g) was transferred to an air-tight syringe with a metal valve and subsequently removed from the glove box. In a ventilated fume hood, 1,1,1,5,5,5-hexamethyl-3-((trimethylsilyl)oxy)-3-vinyltrisiloxane (180 g) was loaded to a 300 mL pressure reactor. The reactor was sealed. While stirring at 600 RPM, the reactor was pressurized with nitrogen up to 100 psig via the dip-tube and was carefully relieved through a valve connected to the headspace. This step was repeated three times for inertion of reactor headspace. The reactor was then pressure tested by pressurizing to 300 psig with nitrogen. After the pressure was released, the catalyst solution was added to the reactor via the sample loading port. The reactor was pressurized with syngas to 100 psig and then released for three times prior to being pressurized to 100 psig via the dip-tube. The intermediate cylinder containing syngas and the reactor were connected. Reaction temperature was set to 65° C. and later increased to 70° C. The agitation rate was set to 600 RPM. The pressure was set to 100 psig. The reaction progress was monitored by a data logger which measured the pressure in the 300 mL intermediate cylinder as it supplied syngas to the reactor via a pressure reducing regulator. After 18 hours 2.5 g additional catalyst solution was added. After additional 24 hours reaction time >99% conversion was observed. n/i ratio was determined by $^1$H NMR analysis of the final product to be 4.5 to 1.

In this Example 42, synthesis of 3-(1,1,1,5,5,5-hexamethyl-3-((trimethylsilyl)oxy)trisiloxan-3-yl) propan-1-amine was performed as follows:

In a nitrogen purged glovebox the aldehyde comprising formula,

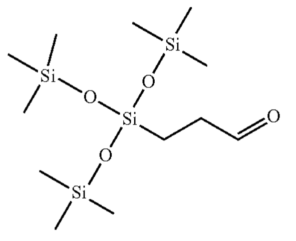 [SMILES: C[Si](C)(C)O[Si](CCC=O)(O[Si](C)(C)C)O[Si](C)(C)C]

prepared as described above in Example 41, with an approximate linear to branch ratio of 4:1 (6 g) and 5% Ru/C (0.3 g, 5 wt. %) were added to a glass vial, then diluted with methanol (28 mL). The mixture was shaken and transferred to an open Parr reactor. The reactor was sealed, then connected to the associated heating/cooling/stirring/venting/thermocouple/pressure transducer/knock out pot. Low pressure nitrogen (~35 psig) was used to pressurize/vent cycle the reactor three times and high pressure (~550 psig) nitrogen was subsequently used to leak check the reactor and associated fittings. The reactor was considered leak free if a pressure drop of less than 3 psig/min was observed. The time between addition of 30 minutes was defined by the time between the beginning of heating (immediately after ammonia addition finished) and the first hydrogen addition. Generally, the reactor was at heating setpoint 5-10 minutes after ammonia addition ended. The reactor timer started when hydrogen was added and the reactor-maintained pressure/temperature, added hydrogen as necessary until the run timer elapsed. The reaction temperatures are reaction setpoints, the first of 60° C. refers to temperature maintained between ammonia addition (~60 equiv.) until after hydrogen addition and the second one of 105° C. refers to temperature setpoint established after hydrogen pressure was achieved at the initial setpoint.

After 2 hours, the reactor shut off the heating and began cooling. Cooling occurred via an internal cooling coil fed with DI water and continued until below 30° C. or the operator began depressurizing the reactor. When reactor pressure was below 10 psig, low pressure nitrogen was used to sweep the reactor and purge into the vent line for five minutes. At this time the reactor was disconnected and opened for manual collection of the reaction reaction product. The reaction product was collected in the fume hood and additional reaction solvent was used if the reaction product was not easily transferred. A solvent rinse of the same or greater volume was used to clean the reactor and alternative solvents may have been used for subsequent washes.

The reaction product was filtered through Celite™, then concentrated under reduced pressure for NMR analysis. Samples were prepared with 150-200 mg of material in ~0.5 g of benzene-$d_6$; for silicon spectra acquisition, samples were prepared at higher concentration with benzene-$d_6$ solutions of 0.04M CrAcAc. If the concentrated sample by rotoevaporation was not clear (e.g., contained residual catalyst) or the NMR peaks were broad, then the sample may have been filtered and transferred to NMR tube. The 3-(1,1,1,5,5,5-hexamethyl-3-((trimethylsilyl)oxy)trisiloxan-3-yl) propan-1-amine formation was confirmed by NMR.

In this example 43, 3-(1,1,1,5,5,5-hexamethyl-3-((trimethylsilyl)oxy)trisiloxan-3-yl)-N-methylpropan-1-amine was prepared using a similar procedure to the one in Example 42 on where, two different batches of 3-(1,1,1,5,5,5-hexamethyl-3-((trimethylsilyl)oxy)trisiloxan-3-yl)propanal with a linear to branch isomers ratios of 4:1 and 5:1 were used (determined by proton NMR). In a nitrogen purged glovebox, the aldehyde (50 g) and Ni 5256 (5 g, 10 wt %) were added to a glass vial and then combined with a solution of methylamine (35.3 g, 8 equiv, 33 wt % in ethanol). Additional solvent was not added. The resulting solution was stirred in the glovebox for an unspecified length of time (generally <10 minutes) and transferred to the open Parr reactor. Three reaction batches were run of 50 g of starting aldehyde each in a 300-mL reactor. All three were analyzed by NMR and GC before combination and concentration. After concentration ~125 g of crude reaction product was collected, which was analyzed before distillation. The crude sample was a light sea green color.

The crude reaction product was filtered and distilled using a packed bed with Propak distillation packing (2.5 cm×29 cm) to give 57.06 g of the main product cut at 0.5 torr and 75-80° C. overhead temperature. NMR analysis confirmed the presence of 3-(1,1,1,5,5,5-hexamethyl-3-((trimethylsilyl)oxy)trisiloxan-3-yl)-N-methylpropan-1-amine.

In this Example 44, T-phenyl resin propanal of formula, $M_{0.24}M^{Propanaldehyde}{}_{0.14}T^{Ph}{}_{0.62}$ was synthesized as follows. In a nitrogen filled glovebox, $Rh(acac)(CO)_2$ (48.0 mg), Ligand 1 (311.9 mg) and toluene (59.9 g) were combined to form a homogeneous catalyst solution. A portion of this catalyst solution (5.8 g) was transferred to an air-tight syringe with a metal valve and subsequently removed from the glove box. In a ventilated fume hood, $M_{0.24}M^{Vi}{}_{0.14}T^{Ph}{}_{0.62}$ (90 g) dissolved in toluene (90 g) was loaded to a 300 mL pressure reactor. The reactor was sealed. While stirring at 600 RPM, the reactor was pressurized with nitrogen up to 100 psig via the dip-tube and was carefully relieved through a valve connected to the headspace. This step was repeated three times for inertion of reactor headspace. The reactor was then pressure tested by pressurizing to 300 psig with nitrogen. After the pressure was released, the catalyst solution was added to the reactor via the sample loading port. The reactor was pressurized with syngas to 100 psig and then released for three times prior to being pressurized to 100 psig via the dip-tube. Reaction temperature was set to 70° C. The agitation rate was set to 600 RPM. The intermediate cylinder containing syngas and the reactor were connected when the desired temperature was reached. The pressure was set to 100 psig. The reaction progress was monitored by a data logger which measured the pressure in the 300 mL intermediate cylinder as it supplied syngas to the reactor via a pressure reducing regulator. >99% conversion was observed after 16 hours determined by $^1$H NMR analysis of the final product. The toluene was removed to leave the T-phenyl resin propanal of formula, $M_{0.24}M^{Propanaldehyde}_{0.14}T^{Ph}_{0.62}$ product as a viscous liquid.

Synthesis of $M_{0.24}M^{Propylamine}_{0.139}T^{Ph}_{0.52}$

In this Example 45, 25.8 g of $M_{0.24}M^{Propanaldehyde}_{0.14}T^{Ph}_{0.62}$ as described in Example 44 was loaded to a glass round bottom flask. THF solvent (51.6 g) was added to form a solution. N-butylamine (2.55 g, 1.1 eq.) was added to the solution while stirring with a PTFE coated magnetic stir bar. $MgSO_4$ was added to adsorb water from the solution. The $MgSO_4$ was removed by filtration to result in a solution containing the corresponding N-butyl imine functional phenylsilsesquioxane resin. The imine containing solution was loaded in a 300 mL Autoclave reactor with 5% Ru/C catalyst (2.6 g). The reactor was sealed, and the headspace was inerted with nitrogen. Ammonia (8.3 g, ~15 equivalence) was added, and the reactor was pressurized with hydrogen to 530 psig. The reactor was heated to 80° C., and hydrogen was added until the pressure was 880 psig. Reductive amination was carried out at 80° C., 880 psig, 800 RPM for 18.5 hours. The reactor was cooled and vented. The reductive amination reaction product was collected and filtered to remove catalyst, and the solvent was removed using a rotary evaporator to collect 27.2 g of concentrated reaction product. The concentrated product contained a propylamine-functional phenylsilsesquioxane resin of unit formula $M_{0.24}M^{Propylamine}_{0.14}T^{Ph}_{0.62}$ as determined by $^{1}H$ and $^{13}C$ NMR.

INDUSTRIAL APPLICABILITY

The working examples above show that a variety of aldehyde-functional organosilicon compounds can be successfully used to form amino-functional organosilicon compounds using the process described herein. The process described herein is flexible in that a wide variety of polymeric polyorganosiloxanes and organosilicon small molecules, with pendant and/or terminal amino-functional groups can be prepared. In addition, the process may have one or more of the following benefits: low cost, simple process, low temperature of 150° C. or less (less likely to degrade sensitive molecules, lower capital cost, and safer), minimal side products, and nearly complete recovery of heterogeneous catalyst. In addition, the process described herein may provide one or more of the additional benefits of generating high purity amino-functional organosilicon compounds with very little or no side reactions taking place, and has easy work up (e.g., simple filtration to recover heterogeneous catalyst and distillation) to recover the amino-functional organosilicon compound. The process may also provide low or no salt side product streams, shorter reaction times and/or lower cyclic siloxane by-product generation than conventional condensation reaction processes. Furthermore, the hydroformylation and reductive amination can be done in one single reactor without necessity to isolate intermediates, and may have minimal process steps.

Without wishing to be bound by theory, it is thought that another advantage of the present invention is that the amino-functional organosilicon compound produced has a high proportion of linear amino-functional groups, and that this is because aldehyde-functional organosilicon compounds having branched aldehyde moieties will react and degrade during the process described herein, such that they can be easily removed. Furthermore, the amino-functional organosilicon compound produced may have reduced cyclic siloxane (e.g., octamethylcyclotetrasiloxane, D4) content as compared to amino-functional organosilicon compounds produced via condensation chemistry using carboxylic acid catalysts or equilibration chemistry using base catalysts.

DEFINITIONS AND USAGE OF TERMS

All amounts, ratios, and percentages herein are by weight, unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The abbreviations used herein have the definitions in Table Z.

TABLE Z

Abbreviations

| Abbreviation | Definitions |
|---|---|
| AcAc or acac | acetyl acetonate |
| ° C. | degrees Celsius |
| cm | centimeter |
| D | Difunctional siloxy unit, trimethylsiloxy unit of formula $Me_2SiO_{2/2}$ |
| $D^{Pr-ald}$ | Difunctional siloxy unit, propylaldehyde, methylsiloxy unit of formula (Pr-ald)(Me)$SiO_{2/2}$ |
| DP | degree of polymerization |
| DSC | Dow Silicones Corporation of Midland, Michigan, USA |
| $D^{vi}$ | Difunctional siloxy unit, vinylmethylsiloxy unit of formula (Vi)(Me)$SiO_{2/2}$ |
| Et | ethyl |
| FTIR | Fourier transform infra-red |
| g | gram |
| GPC | gel permeation chromatography |
| h | hour |
| kPa | kiloPascals |
| L | liter |
| M | Monofunctional siloxy unit, trimethylsiloxy unit of formula $R_3SiO_{1/2}$ or $Me_3SiO_{1/2}$ |
| $M^{Pr-ald}$ | Monofunctional siloxy unit, propyladehyde, dimethylsiloxy unit of formula (Pr-ald)($Me_2$)$SiO_{1/2}$ |
| $M^{vi}$ | Monofunctional siloxy unit, vinyldimethylsiloxy unit of formula (Vi)($Me_2$)$SiO_{1/2}$ |
| Me | methyl |
| mg | milligram |
| min | minute |
| mL or ml | milliliter |
| mm | millimeter |
| mmol | millimole |
| Mn | number average molecular weight measured by GPC |
| mol | mole |
| Mw | weight average molecular weight measured by GPC |
| mPa · s | milliPascal seconds |
| NBD | norbornadiene |
| NMR | nuclear magnetic resonance |
| Pa | Pascal |
| Ph | phenyl |
| ppm | parts per million by weight |
| Pr | propyl |
| Pr-ald | propyl-aldehyde |
| psi | pounds per square inch |
| Q | tetrafunctional siloxy unit of formula $SiO_{4/2}$ |
| RPM or rpm | revolutions per minute |
| RT | room temperature of 25 ± 5° C. |
| TDCC | The Dow Chemical Company of Midland, Michigan, USA |
| THF | tetrahydrofuran |

TABLE Z-continued

| Abbreviations | |
|---|---|
| Abbreviation | Definitions |
| µm | micrometer |
| Vi | vinyl |

The following test methods were used herein. FTIR: The concentration of silanol groups present in the polyorganosiloxane resins (e.g., polyorganosilicate resins and/or silsesquioxane resins) was determined using FTIR spectroscopy according to ASTM Standard E-168-16. GPC: The molecular weight distribution of the polyorganosiloxanes was determined by GPC using an Agilent Technologies 1260 Infinity chromatograph and toluene as a solvent. The instrument was equipped with three columns, a PL gel 5 µm 7.5×50 mm guard column and two PLgel 5 µm Mixed-C 7.5×300 mm columns. Calibration was made using polystyrene standards. Samples were made by dissolving polyorganosiloxanes in toluene (~1 mg/mL) and then immediately analyzing the solution by GPC (1 mL/min flow, 35° C. column temperature, 25-minute run time). $^{29}$Si NMR: Alkenyl content of starting material (B) can be measured by the technique described in "The Analytical Chemistry of Silicones" ed. A. Lee Smith, Vol. 112 in Chemical Analysis, John Wiley & Sons, Inc. (1991). Viscosity: Viscosity may be measured at 25° C. at 0.1 to 50 RPM on a Brookfield DV-III cone & plate viscometer with #CP-52 spindle, e.g., for polymers (such as certain (B2) alkenyl-functional polyorganosiloxanes and (E2) aldehyde-functional polyorganosiloxanes) with viscosity of 120 mPa·s to 250,000 mPa·s. One skilled in the art would recognize that as viscosity increases, rotation rate decreases and would be able to select appropriate spindle and rotation rate.

The aldehyde-functional organosilicon compounds, and reductive amination reaction product mixtures, in the examples above, were analyzed by $^1$H, $^{13}$C NMR and $^{29}$Si NMR, GC/MS,GPC and viscosity. The conversion and yield in the examples above were mainly based on $^1$H NMR data.

EMBODIMENTS OF THE INVENTION

In a first embodiment, a process for preparing an amino-functional organosilicon compound comprises:

1) combining, under conditions to catalyze hydroformylation reaction, starting materials comprising
   (A) a gas comprising hydrogen and carbon monoxide,
   (B) an alkenyl-functional organosilicon compound, and
   (C) a rhodium/bisphosphite ligand complex catalyst, where the bisphosphite ligand has formula

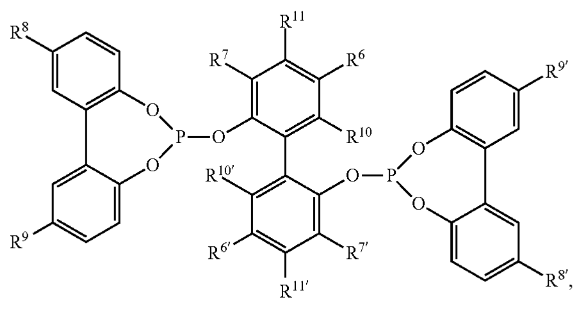

where
   $R^6$ and $R^{6'}$ are each independently selected from the group consisting of hydrogen, an alkyl group of 1 to 20 carbon atoms, a cyano group, a halogen group, and an alkoxy group of 1 to 20 carbon atoms;
   $R^7$ and $R^{7'}$ are each independently selected from the group consisting of an alkyl group of 3 to 20 carbon atoms, and a group of formula —$SiR^{17}_3$, where each $R^{17}$ is an independently selected monovalent hydrocarbon group of 1 to 20 carbon atoms;
   $R^8$, $R^{8'}$, $R^9$, and $R^{9'}$ are each independently selected from the group consisting of hydrogen, an alkyl group, a cyano group, a halogen group, and an alkoxy group, and
   $R^{10}R^{10'}$, $R^{11}$, and $R^{11'}$ are each independently selected from the group consisting of hydrogen or and alkyl group; thereby forming a hydroformylation reaction product comprising (E) an aldehyde-functional organosilicon compound; and 2) combining, under conditions to catalyze reductive amination reaction, starting materials comprising (E) the aldehyde-functional organosilicon compound, (F) an amine source, (G) a hydrogenation catalyst, (H) hydrogen, optionally (J) a solvent, and optionally (K) an adsorbent, thereby forming a reaction product comprising the amino-functional organosilicon compound.

In a second embodiment, in the process of the first embodiment, starting material (B) comprises an alkenyl-functional silane of formula (B1): $R^A_xSiR^4_{(4-x)}$, where each $R^A$ is an independently selected alkenyl group of 2 to 8 carbon atoms; each $R^4$ is independently selected from the group consisting of an alkyl group of 1 to 18 carbon atoms and an aryl group of 6 to 18 carbon atoms; and subscript x is 1 to 4.

In a third embodiment, in the process of the first embodiment or the second embodiment, the alkenyl-functional organosilicon compound comprises an alkenyl-functional polyorganosiloxane of unit formula: $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(SiO_{4/2})_g(ZO_{1/2})_h$; where each $R^A$ is an independently selected alkenyl group of 2 to 8 carbon atoms, and each $R^4$ is independently selected from the group consisting of an alkyl group of 1 to 18 carbon atoms and an aryl group of 6 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in formula (B2-1) and have values such that subscript a≥0, subscript b≥0, subscript c≥0, subscript d≥0, subscript e≥0, subscript f≥0, subscript g≥0; and subscript h has a value such that 0≤h/(e+f+g)≤1.5, 10,000≥(a+b+c+d+e+f+g)≥2, and a quantity (b+d+f)≥1.

In a fourth embodiment, in the process of the third embodiment, the alkenyl-functional polyorganosiloxane is cyclic and has a unit formula selected from the group consisting of: $(R^4R^ASiO_{2/2})_d$, where subscript d is 3 to 12; $(R^4_2SiO_{2/2})_c(R^4R^ASiO_{2/2})_d$, where c is >0 to 6 and d is 3 to 12; and a combination thereof.

In a fifth embodiment, in the process of the third embodiment, the alkenyl-functional polyorganosiloxane is linear and comprises unit formula (B3):

$(R^4_3SiO_{1/2})_a(R^4_2R^ASiO_{1/2})_b(R^4_2SiO_{2/2})_c(R^4R^ASiO_{2/2})$ d, where a quantity (a+b)=2, a quantity (b+d)≥1, and a quantity (a+b+c+d)≥2.

In a sixth embodiment, in the process of the third embodiment, the alkenyl-functional polyorganosiloxane is an alkenyl-functional polyorganosilicate resin comprising unit formula: $(R^4_3SiO_{1/2})_{mm}(R^4_2R^ASiO_{1/2})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo≥0, and 0.5≤(mm+nn)/oo≤4.

In a seventh embodiment, in the process of the third embodiment, the alkenyl-functional polyorganosiloxane is an alkenyl-functional silsesquioxane resin comprising unit formula: $(R^4_3SiO_{1/2})_a(R^4_2R^ASiO_{1/2})_b(R^4_2SiO_{2/2})_c(R^4R^ASiO_{2/2})_d(R^4SiO_{3/2})_e(R^ASiO_{3/2})_f(ZO_{1/2})_h$; where f>1, 2<(e+f)<10,000; 0<(a+b)/(e+f)<3; 0<(c+d)/(e+f)<3; and 0<h/(e+f)<1.5.

In an eighth embodiment, in the process of the third embodiment, subscript b=2, and a=c=d=e=f=h=0, and the alkenyl-functional organosilicon compound comprises

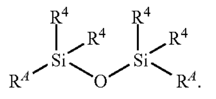

In a ninth embodiment, in the process of any one of the third to eighth embodiments, each $R^A$ is independently selected from the group consisting of vinyl, allyl, and hexenyl.

In a tenth embodiment, in the process of any one of the third to ninth embodiments, each $R^4$ is independently selected from the group consisting of methyl and phenyl.

In an eleventh embodiment, in the process of any one of the first to tenth embodiments, in the bisphosphite ligand, $R^6$ and $R^{6'}$ are each selected from the group consisting of a methoxy group and a t-butyl group, $R^7$ and $R^{7'}$ are each a t-butyl group, and $R^8$, $R^{8'}$, $R^9$, $R^{9'}$, $R^{10}R^{10'}$, $R^{11}$, and $R^{11'}$ are each hydrogen.

In a twelfth embodiment, in the process of any one of the first to eleventh embodiments, starting material (C) is present in an amount sufficient to provide 0.1 ppm to 300 ppm Rh based on combined weights of starting materials (A), (B), and (C).

In a thirteenth embodiment, in the process of any one of the first to twelfth embodiments, starting material (C) has a molar ratio of bisphosphite ligand/Rh of 1/1 to 10/1.

In a fourteenth embodiment, in the process of any one of the first to thirteenth embodiments, the conditions in step 1) are selected from the group consisting of: i) a temperature of 30° C. to 150° C.; ii) a pressure of 101 kPa to 6,895 kPa; iii) a molar ratio of $CO/H_2$ in the syngas of 3/1 to 1/3; and iv) a combination of two or more of conditions i), ii) and iii).

In a fifteenth embodiment, in the process of any one of the first to fourteenth embodiments, (C) the rhodium/bisphosphite ligand complex catalyst is formed by combining a rhodium precursor and the bisphosphite ligand to form a rhodium/bisphosphite ligand complex and combining the rhodium/bisphosphite ligand complex and starting material (A) with heating before step 1).

In a sixteenth embodiment, the aldehyde-functional organosilicon compound prepared by the process of the first embodiment or the second embodiment is an aldehyde-functional silane of formula (E1): $R^{Ald}_xSiR^4_{(4-x)}$, where each $R^{Ald}$ is an independently selected aldehyde group of 3 to 9 carbon atoms; each $R^4$ is independently selected from the group consisting of an alkyl group of 1 to 18 carbon atoms and an aryl group of 6 to 18 carbon atoms; and subscript x is 1 to 4.

In a seventeenth embodiment, the aldehyde-functional organosilicon compound prepared by the process of the first embodiment or the second embodiment is an aldehyde-functional polyorganosiloxane of unit formula (E2-1):

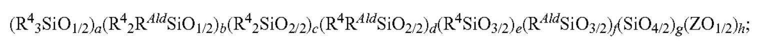

$$(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(SiO_{4/2})_g(ZO_{1/2})_h;$$

where each $R^{Ald}$ is an independently selected aldehyde group of 3 to 9 carbon atoms, and each $R^4$ is independently selected from the group consisting of an alkyl group of 1 to 18 carbon atoms and an aryl group of 6 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in formula (E2-1) and have values such that subscript a≥0, subscript b≥0, subscript c≥0, subscript d≥0, subscript e≥0, subscript f≥0, subscript g≥0; and subscript h has a value such that 0≤h/(e+f+g)≤1.5, 10,000≥(a+b+c+d+e+f+g)≥2, and a quantity (b+d+f)≥1.

In an eighteenth embodiment, in the process of the seventeenth embodiment, the aldehyde-functional polyorganosiloxane is cyclic and has a unit formula selected from the group consisting of: $(R^4R^{Ald}SiO_{2/2})_d$, where subscript d is 3 to 12; $(R^4_2SiO_{2/2})_c(R^4R^{Ald}SiO_{2/2})_d$, where c is >0 to 6 and d is 3 to 12; and a combination thereof.

In a nineteenth embodiment, in the process of the seventeenth embodiment, the aldehyde-functional polyorganosiloxane is linear and comprises unit formula (E3): $(R^4_3SiO_{1/2})_a(R^4_2R^{Ald}SiO_{1/2})_b(R^4_2SiO_{2/2})_c(R^4R^{Ald}SiO_{2/2})_d$, where a quantity (a+b)=2, a quantity (b+d)≥1, and a quantity (a+b+c+d)≥2.

In a twentieth embodiment, in the process of the seventeenth embodiment, the aldehyde-functional polyorganosiloxane is an aldehyde-functional polyorganosilicate resin comprising unit formula: $(R^4_3SiO_{1/2})_{mm}(R^4_2R^{Ald}SiO_{1/2})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo≥0, and 0.5≤(mm+nn)/oo≤4.

In a twenty-first embodiment, in the process of the seventeenth embodiment, the aldehyde-functional polyorganosiloxane is an aldehyde-functional silsesquioxane resin comprising unit formula:

$(R^4_3SiO_{1/2})_a(R^4_2R^{Ald}SiO_{1/2})_b(R^4_2SiO_{2/2})_c(R^4R^{Ald}SiO_{2/2})_d(R^4SiO_{3/2})_e(R^{Ald}SiO_{3/2})_f(ZO_{1/2})_h$;

where $f > 1$, $2 < (e + f) < 10{,}000$; $0 < (a + b)/(e + f) < 3$; $0 < (c + d)/(e + f) < 3$; and $0 < h/(e + f) < 1.5$;

In a twenty-second embodiment, in the process of the seventeenth embodiment, the aldehyde-functional polyorganosiloxane is branched and comprises unit formula: $R^{Ald}$-$SiR^{12}_3$, where each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that $0 \leq ii \leq 100$, with the proviso that at least two of $R^{12}$ are $—OSi(R^{14})_3$.

In a twenty-third embodiment, in the process of the seventeenth embodiment, subscript b=2, and a=c=d=e=f=h=0, and the aldehyde-functional organosilicon compound comprises

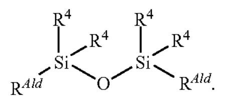

In a twenty-fourth embodiment, in the process of any one of the seventeenth to twenty-third embodiments, each $R^{Ald}$ is independently selected from the group consisting of propyl aldehyde, butyl aldehyde, and heptyl aldehyde.

In a twenty-fifth embodiment, in the process of any one of the seventeenth to twenty-fourth embodiments, each $R^4$ is independently selected from the group consisting of methyl and phenyl.

In a twenty-sixth embodiment, the process of any one of the first to twenty-fifth embodiments further comprises recovering the aldehyde-functional organosilicon compound before step 2).

In a twenty-seventh embodiment, in the process of any one of the first to twenty-sixth embodiments, where (F) the amine source comprises a primary amine of formula (F1): $R^{18}NH_2$, where $R^{18}$ is an alkyl group of 1 to 18 carbon atoms.

In a twenty-eighth embodiment, in the process of any one of the first to twenty seventh embodiments, where (F) the amine source comprises (F2) ammonia.

In a twenty-ninth embodiment, in the process of any one of the first to twenty-sixth embodiments, where (F) the amine source comprises (F3) a polyetheramine.

In a thirtieth embodiment, in the process of any one of the first to twenty-ninth embodiments, where (F) the amine source comprises (F4) a diamine.

In a thirty-first embodiment, in the process of any one of the first to thirtieth embodiments, the hydrogenation catalyst is a heterogeneous hydrogenation catalyst comprising a metal selected from the group consisting of Co, Cu, Fe, Ni, Ir, Pd, Pt, Rh, Ru, and a combination of two or more thereof.

In a thirty-second embodiment, in the process of the thirty-first embodiment, the heterogeneous hydrogenation catalyst comprises a metal selected from the group consisting of Co, Cu, Ni, Pd, Pt, Rh, Ru, and a combination of two or more thereof.

In a thirty-third embodiment, in the process of the thirty-second embodiment, the heterogeneous hydrogenation reaction catalyst comprises Co, Ni, or Rh.

In a thirty-fourth embodiment, in step 2) of the process of any one of the first to thirty-third embodiments, amount of the hydrogenation catalyst is 1 weight % to 50 weight % based on weight of the aldehyde-functional organosilicon compound.

In a thirtieth-fifth embodiment, in step 2) of the process of any one of the first to thirty-fourth embodiments, $H_2$ pressure is 10 psig (68.9 kPa) to 1500 psig (10342 kPa).

In a thirty-sixth embodiment, in step 2) of the process of the thirtieth-fifth embodiment, the $H_2$ pressure is 200 psig (1379 kPa) to 1200 psig (8274 kPa).

In a thirty-seventh embodiment, in step 2) of the process of any one of the first to thirty-sixth embodiments, temperature is 0° C. to 200° C.

In a thirty-eighth embodiment, in step 2) of the process of the thirty-seventh embodiment, the temperature is 50° C. to 150° C.

In a thirty-ninth embodiment, the process of any one of the first to thirty-eighth embodiments, further comprises pre-treating the hydrogenation catalyst before step 2).

In a fortieth embodiment, the process of any one of the first to thirty-ninth embodiments, further comprises 3) recovering the amino-functional organosilicon compound from the reaction product after step 2).

In a forty-first embodiment, in the process of the second embodiment, the amino-functional organosilicon compound comprises an amino-functional silane of formula: $R^N_xSiR^4_{(4-x)}$, where each $R^N$ is an independently selected amino-functional group of formula

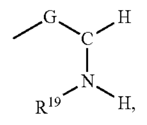

where G is a divalent hydrocarbon group free of aliphatic unsaturation that has 2 to 8 carbon atoms, and $R^{19}$ is selected from the group consisting of $R^{18}$, H, $DNH_2$, where D is a divalent hydrocarbyl group, and a polyether group; each $R^4$ is independently selected from the group consisting of an alkyl group of 1 to 18 carbon atoms and an aryl group of 6 to 18 carbon atoms; and subscript x is 1 to 4.

In a forty-second embodiment, in the process of the second embodiment, the amino-functional organosilicon compound comprises an amino-functional polyorganosiloxane of unit formula:

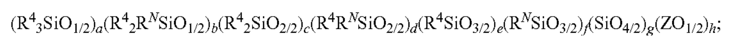

$(R^4_3SiO_{1/2})_a(R^4_2R^NSiO_{1/2})_b(R^4_2SiO_{2/2})_c(R^4R^NSiO_{2/2})_d(R^4SiO_{3/2})_e(R^NSiO_{3/2})_f(SiO_{4/2})_g(ZO_{1/2})_h$;

where each $R^N$ is an independently selected amino-functional group of formula

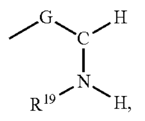

where G is a divalent hydrocarbon group free of aliphatic unsaturation that has 2 to 8 carbon atoms, and $R^{19}$ is selected from the group consisting of $R^{18}$, H, $DNH_2$, where D is a divalent hydrocarbyl group, and a polyether group; and each $R^4$ is independently selected from the group consisting of an alkyl group of 1 to 18 carbon atoms and an aryl group of 6 to 18 carbon atoms; each Z is independently selected from the group consisting of a hydrogen atom and $R^5$, where each $R^5$ is independently selected from the group consisting of alkyl groups of 1 to 18 carbon atoms and aryl groups of 6 to 18 carbon atoms; subscripts a, b, c, d, e, f, and g represent numbers of each unit in formula (E2-1) and have values such that subscript a≥0, subscript b≥0, subscript c≥0, subscript d≥0, subscript e≥0, subscript f≥0, subscript g≥0; and subscript h has a value such that $0 \le h/(e+f+g) \le 1.5$, $10{,}000 \ge (a+b+c+d+e+f+g) \ge 2$, and a quantity $(b+d+f) \ge 1$.

In a forty-third embodiment, in the process of the forty-second embodiment, the amino-functional polyorganosiloxane is cyclic and has a unit formula selected from the group consisting of $(R^4R^NSiO_{2/2})_d$, where subscript d is 3 to 12; $(R^4_2SiO_{2/2})_c(R^4R^NSiO_{2/2})_d$, where c is >0 to 6 and d is 3 to 12.

In a forty-fourth embodiment, in the process of the forty-second embodiment, the amino-functional polyorganosiloxane is linear and comprises unit formula: $(R^4_3SiO_{1/2})_a(R^4_2R^NSiO_{1/2})_b(R^4_2SiO_{2/2})_c(R^4R^NSiO_{2/2})_d$, where a quantity (a+b)=2, a quantity (b+d)≥1, and a quantity (a+b+c+d)≥2.

In a forty-fifth embodiment, in the process of the forty-second embodiment, the amino-functional polyorganosiloxane is an amino-functional polyorganosilicate resin comprising unit formula: $(R^4_3SiO_{1/2})_{mm}(R^4_2R^NSiO_{1/2})_{nn}(SiO_{4/2})_{oo}(ZO_{1/2})_h$, where subscripts mm, nn, and oo represent mole percentages of each unit in the polyorganosilicate resin; and subscripts mm, nn and oo have average values such that mm≥0, nn≥0, oo≥0, and $0.5 \le (mm+nn)/oo \le 4$.

In a forty-sixth embodiment, in the process of the forty-second embodiment, the amino-functional polyorganosiloxane is an amino-functional silsesquioxane resin comprising unit formula: $(R^4_3SiO_{1/2})_a(R^4_2R^NSiO_{1/2})_b(R^4_2SiO_{2/2})_c(R^4R^NSiO_{2/2})_d(R^4SiO_{3/2})_e(R^NSiO_{3/2})_f(ZO_{1/2})_h$; where f>1, 2<(e+f)<10,000; 0<(a+b)/(e+f)<3; 0<(c+d)/(e+f)<3; and 0<h/(e+f)<1.5.

In a forty-seventh embodiment, in the process of the forty-second embodiment the amino-functional organosilicon compound comprises

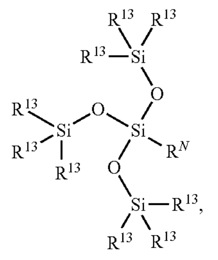

where RN is as described above and each R13 is a monovalent hydrocarbon group selected from an alkyl group of 1 to 18 carbon atoms and an aryl group of 6 to 18 carbon atoms.

In a forty-eighth embodiment, in the process of the forty-fourth embodiment, the amino-functional organosilicon compound comprises a linear amino-functional polydiorganosiloxane selected from the group consisting of: unit formula: $(R^4_2R^NSiO_{1/2})_2\ (R^4_2SiO_{2/2})_m(R^4R^NSiO_{2/2})_n$, unit formula: $(R^4_3SiO_{1/2})_2\ (R^4_2SiO_{2/2})_o(R^4R^NSiO_{22})_p$, or a combination thereof, where each $R^4$ and $R^N$ are as described above, subscript m is 0 or a positive number, subscript n is 0 or a positive number. Alternatively, subscript n may be 0 to 2000. Subscript o may be 0 or a positive number. Alternatively, subscript o may be 0 to 2000. Subscript p is at least 2. Alternatively subscript p may be 2 to 2000.

In a forty-ninth embodiment, in the process of the forty-eighth embodiment, the linear amino-functional polyorganosiloxane has formula:

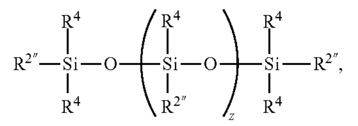

where each $R^{2''}$ is independently selected from the group consisting of $R^N$ and $R^4$, where $R^N$ and $R^4$ are as described above, and subscript z is 0 to 48.

In a fiftieth embodiment, in the process of the forty-ninth embodiment, the linear amino-functional polyorganosiloxane has formula:

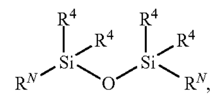

where $R^4$ and $R^N$ are as described above.

In a fifty-first embodiment, in the process of the forty-second embodiment, the amino-functional polyorganosiloxane is branched and has general formula: $R^NSiR^{12}_3$, where $R^N$ is as described above and each $R^{12}$ is selected from $R^{13}$ and $—OSi(R^{14})_3$; where each $R^{13}$ is a monovalent hydrocarbon group; where each $R^{14}$ is selected from $R^{13}$, $—OSi(R^{15})_3$, and $—[OSiR^{13}_2]_{ii}OSiR^{13}_3$; where each $R^{15}$ is selected from $R^{13}$, $—OSi(R^{16})_3$, and $—[OSiR^{13}_2]_{ii}OSiR^{13}_3$; where each $R^{16}$ is selected from $R^{13}$ and $—[OSiR^{13}_2]_{ii}OSiR^{13}_3$; and where subscript ii has a value such that 0≤ii≤100.

In a fifty-second embodiment, in the process of the fifty-first embodiment, the amino-functional polyorganosiloxane has a structure selected from the group consisting of:

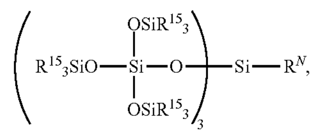

where $R^N$ and $R^{15}$ are as described above;

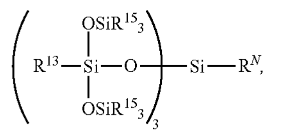

where $R^N$, $R^{13}$, and $R^{15}$ are as described above; and

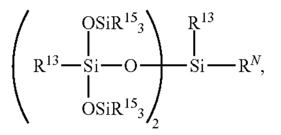

where $R^N$, $R^{13}$, and $R^{15}$ are as described above.

In a fifty-third embodiment, in the process of the fifty-second embodiment, the amino-functional polyorganosiloxane has a structure selected from the group consisting of:

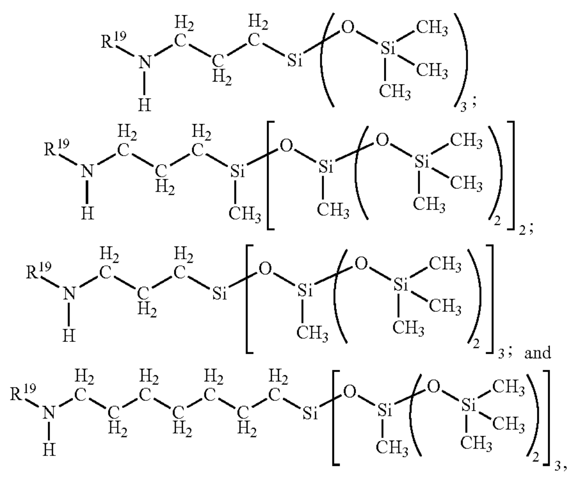

where $R^{19}$ is as described above.

In a fifty-fourth embodiment, in the process of the forty-second embodiment, the amino-functional organosilicon compound has unit formula: $(R^4{}_3SiO_{1/2})_q(R^4{}_2R^NSiO_{1/2})_r(R^4{}_2SiO_{2/2})_s(SiO_{4/2})_t$, where $R^4$ and $R^N$ are as described above, and subscripts q, r, s, and t have average values such that $2 \geq q \geq 0$, $4 \geq r \geq 0$, $995 \geq s \geq 4$, $t=1$, $(q+r)=4$, and $(q+r+s+t)$ has a value sufficient to impart a viscosity >170 mPa·s measured by rotational viscometry.

In a fifty-fifth embodiment, in the process of the fifty-fourth embodiment, the amino-functional organosilicon compound has unit formula $[R^NR^4{}_2Si—(O—SiR^4{}_2)_x—O]_{(4-w)}—Si—[O—(R^4{}_2SiO)_vSiR^4{}_3]_w$, where $R^N$ and $R^4$ are as described above; and subscripts v, w, and x have values such that $200 \geq v \geq 1$, $2 \geq w \geq 0$, and $200 \geq x \geq 1$.

In a fifty-sixth embodiment, in the process of the forty-second embodiment, the amino-functional organosilicon compound has unit formula: $(R^4{}_3SiO_{1/2})_{aa}(R^NR^4{}_2SiO_{1/2})_{bb}(R^4{}_2SiO_{2/2})_{cc}(R^NR^4SiO_{2/2})_{ee}(R^4SiO_{3/2})_{dd}$, where $R^4$ and $R^N$ are as described above, subscript $aa \geq 0$, subscript $bb > 0$, subscript cc is 15 to 995, subscript $dd > 0$, and subscript $ee \geq 0$.

In a fifty-seventh embodiment, in the process of any one of the forty-first embodiment to the fifty-sixth embodiment, each $R^N$ independently selected from the group consisting of: $—(C_3H_6)NH_2$, $—(C_4H_8)NH_2$, $—(C_2H_4)N(H)(C_2H_5)$, $—(C_3H_6)N(H)(C_2H_5)$, $—(C_4H_8)N(H)(C_2H_5)$, $—(C_2H_4)N(H)(C_3H_7)$, $—(C_3H_6)N(H)(C_3H_7)$, $—(C_4H_8)N(H)(C_3H_5)$, $—(C_2H_4)N(H)(C_4H_9)$, $—(C_3H_6)N(H)(C_4H_9)$, $—(C_4H_8)N(H)(C_4H_9)$, $—(C_2H_4)N(H)(C_2H_4O)_{jj}(C_3H_6O)_{kk}(H)$, $—(C_3H_6)N(H)(C_2H_4O)_{jj}(C_3H_6O)_{kk}(H)$, and $—(C_4H_8)N(H)(C_2H_4O)_{jj}(C_3H_6O)_{kk}(H)$, where subscripts $jj \geq 0$, $kk \geq 0$, and a quantity $(jj+kk)$ is a value sufficient to give $R^N$ a molecular weight of 600 g/mol to 3000 g/mol, alternatively 600 g/mol to 1000 g/mol.

In a fifty-eighth embodiment, in the process of any one of the forty-first embodiment to the fifty-seventh embodiment, where each $R^4$ is independently selected from the group consisting of methyl and phenyl.

The invention claimed is:

1. A process for preparing an amino-functional organosilicon compound, the process comprising:

I) combining, under conditions to catalyze reductive amination reaction, starting materials comprising an aldehyde-functional organosilicon compound, an amine source, a hydrogenation catalyst, hydrogen, and optionally a solvent, thereby forming a reaction product comprising the amino-functional organosilicon compound; where the aldehyde-functional organosilicon compound comprises

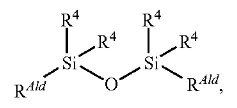

where each $R^{Ald}$ is an independently selected aldehyde group of 3 to 9 carbon atoms, and each $R^4$ is independently selected from the group consisting of an alkyl group of 1 to 18 carbon atoms and an aryl group of 6 to 18 carbon atoms.

2. The process of claim 1, where $R^{Ald}$ is a group covalently bonded to silicon having formula:

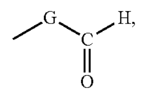

where G is a divalent hydrocarbon group free of aliphatic unsaturation that has 2 to 8 carbon atoms.

3. The process of claim 2, where each $R^{Ald}$ is independently selected from the group consisting of propyl aldehyde, butyl aldehyde, and heptyl aldehyde; and each $R^4$ is independently selected from the group consisting of methyl and phenyl.

4. The process of claim 2, where (F) the amine source is selected from the group consisting of:

(F1) a primary amine of formula: $R^{18}NH_2$, where $R^{18}$ is an alkyl group of 1 to 18 carbon atoms, (F2) ammonia, (F3) a polyetheramine, (F4) a diamine of formula $H_2N-D-NH_2$, where D is a divalent hydrocarbyl group, and (F5) a combination of two or more of (F1), (F2), (F3) and (F4).

5. The process of claim 2, wherein the amino-functional organosilicon compound has, per molecule, at least one amino-functional group covalently bonded to silicon, and the amino-functional group covalently bonded to silicon has formula:

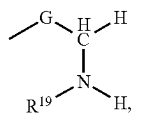

where G is the divalent hydrocarbon group free of aliphatic unsaturation that has 2 to 8 carbon atoms, and $R^{19}$ is selected from the group consisting of an alkyl group as described above, H, a group of formula $DNH_2$, where D is a divalent hydrocarbyl group, and a polyether group.

6. The process of claim 5, wherein G is a linear alkanediyl group of empirical formula $—C_rH_{2r}—$, where subscript r is 2 to 8.

7. The process of claim 2, wherein G is a linear alkanediyl group of empirical formula $—C_rH_{2r}—$, where subscript r is 2 to 8.

8. The process of claim 1, where each $R^4$ is independently selected from the group consisting of an alkyl group of 1 to 8 carbon atoms and an aryl group of 6 to 12 carbon atoms.

9. The process of claim 1, where each $R^{Ald}$ is independently selected from the group consisting of propyl aldehyde, butyl aldehyde, and heptyl aldehyde.

10. The process of claim 1, where each $R^4$ is independently selected from the group consisting of methyl and phenyl.

11. The process of claim 1, further comprising forming the aldehyde-functional organosilicon compound before step I) by a process comprising: combining, under conditions to catalyze hydroformylation reaction, starting materials comprising (A) a gas comprising hydrogen and carbon monoxide, (B) an alkenyl-functional organosilicon compound, and (C) a rhodium/bisphosphite ligand complex catalyst, where the bisphosphite ligand has formula

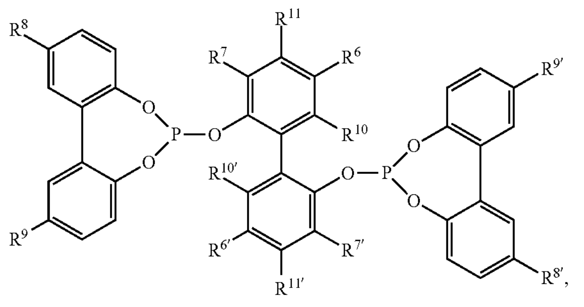

where $R^6$ and $R^{6'}$ are each independently selected from the group consisting of hydrogen, an alkyl group of 1 to 20 carbon atoms, a cyano group, a halogen group, and an alkoxy group of 1 to 20 carbon atoms;

$R^7$ and $R^{7'}$ are each independently selected from the group consisting of an alkyl group of 3 to 20 carbon atoms, and a group of formula $—SiR^{17}_3$, where each $R^{17}$ is an independently selected monovalent hydrocarbon group of 1 to 20 carbon atoms;

$R^8$, $R^{8'}$, $R^9$, and $R^{9'}$ are each independently selected from the group consisting of hydrogen, an alkyl group, a cyano group, a halogen group, and an alkoxy group, and $R^{10}R^{10'}$, $R^{11}$, and $R^{11'}$ are each independently selected from the group consisting of hydrogen or and alkyl group; thereby forming a hydroformylation reaction product comprising the aldehyde-functional organosilicon compound.

12. The process of claim 11, further comprising recovering the aldehyde-functional organosilicon compound before step I).

13. The process of claim 1, where the hydrogenation catalyst is a heterogeneous hydrogenation catalyst comprising a metal selected from the group consisting of Co, Cu, Fe, Ni, Ir, Pd, Pt, Rh, Ru, and a combination of two or more thereof.

14. The process of claim 1, where amount of the hydrogenation catalyst is <1 weight % to 50 weight %, based on weight of the aldehyde-functional organosilicon compound.

15. The process of claim 1, where in step I) one or both of conditions (i) and (ii) is satisfied, where condition (i) is that $H_2$ pressure is 10 psig (68.9 kPa) to 1500 psig (10,342 kPa), and condition (ii) is that temperature is 0° C. to 200° C.

16. The process of claim 1, further comprising pretreating the hydrogenation catalyst before step I).

17. The process of claim 1, further comprising: II) recovering the amino-functional organosilicon compound from the reaction product during and/or after step I).

18. The process of claim 1, wherein the amino-functional organosilicon compound has, per molecule, at least one amino-functional group covalently bonded to silicon, and the amino-functional group covalently bonded to silicon has formula:

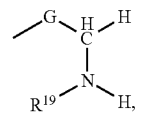

where G is the divalent hydrocarbon group free of aliphatic unsaturation that has 2, and $R^{19}$ is selected from the group consisting of an alkyl group as described above, H, a group of formula $DNH_2$, where D is a divalent hydrocarbyl group, and a polyether group.

19. The process of claim 1, where (F) the amine source is selected from the group consisting of:

(F1) a primary amine of formula: $R^{18}NH_2$, where $R^{18}$ is an alkyl group of 1 to 18 carbon atoms, (F2) ammonia, (F3) a polyetheramine, (F4) a diamine of formula $H_2N$-D-$NH_2$, where D is a divalent hydrocarbyl group, and (F5) a combination of two or more of (F1), (F2), (F3) and (F4).

* * * * *